United States Patent
Nagai et al.

(10) Patent No.: US 9,544,138 B2
(45) Date of Patent: Jan. 10, 2017

(54) AUTHENTICATOR, AUTHENTICATEE AND AUTHENTICATION METHOD

(75) Inventors: Yuji Nagai, Sagamihara (JP); Taku Kato, Kamakura (JP); Tatsuyuki Matsushita, Tokyo (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 0 days.

(21) Appl. No.: 13/985,431

(22) PCT Filed: Feb. 17, 2012

(86) PCT No.: PCT/JP2012/054500
§ 371 (c)(1),
(2), (4) Date: Nov. 7, 2013

(87) PCT Pub. No.: WO2012/172832
PCT Pub. Date: Dec. 20, 2012

(65) Prior Publication Data
US 2014/0289526 A1    Sep. 25, 2014

(30) Foreign Application Priority Data
Jun. 17, 2011    (JP) .................................. 2011-135644

(51) Int. Cl.
H04L 9/32    (2006.01)
H04L 9/08    (2006.01)
H04L 9/00    (2006.01)

(52) U.S. Cl.
CPC ............ H04L 9/085 (2013.01); H04L 9/0819 (2013.01); H04L 9/3242 (2013.01); H04L 9/3271 (2013.01)

(58) Field of Classification Search
CPC ....... H04L 9/085; H04L 9/3242; H04L 9/3271
(Continued)

(56) References Cited

U.S. PATENT DOCUMENTS 5,450,491 A * 9/1995 McNair ............ G06K 19/06028
  235/380
6,704,489 B1 * 3/2004 Kurauchi ............... H04N 5/765
  386/248

(Continued)

FOREIGN PATENT DOCUMENTS

| CN | 101882197 A | 11/2010 |
| EP | 1 061 514 | 12/2000 |
| JP | 2000 357213 | 12/2000 |

OTHER PUBLICATIONS

Gilbert, H. et al., "HB#: Increasing the Security and Efficiency of HB+", Advances in Cryptology a Eurocrypt (Lecture Notes in Computer Science), pp. 361 to 378, (Apr. 13, 2008), XP19088212.
(Continued)

Primary Examiner — Abu Sholeman
(74) Attorney, Agent, or Firm — Oblon, McClelland, Maier & Neustadt, L.L.P.

(57) ABSTRACT

According to one embodiment, an authentication method between an authenticatee which stores key information having a data structure composed of a key transition record, secret information XY of a matrix form, and secret information XYE which is created by encrypting the secret information XY, and an authenticator which authenticates the authenticatee, includes selecting, by the authenticator, a record corresponding to a device index of the authenticator from the key information which is received from the authenticatee, and decrypting the record by a device key, thereby taking out a key transition, and executing, by the authenticator, a decryption process on the secret information XYE, which is received from the authenticatee, by using the corresponding key transition, and sharing the secret information XY.

12 Claims, 39 Drawing Sheets

(58) Field of Classification Search
USPC ......... 713/168, 170, 171; 380/270, 283, 277
See application file for complete search history.

(56) References Cited

U.S. PATENT DOCUMENTS

| | | | |
|---|---|---|---|
| 7,065,648 B1 | 6/2006 | Kamibayashi et al. | |
| 2002/0164022 A1* | 11/2002 | Strasser et al. | 380/201 |
| 2003/0065947 A1* | 4/2003 | Song et al. | 713/201 |
| 2003/0188148 A1* | 10/2003 | Logalbo | H04K 1/00 713/150 |
| 2004/0086121 A1* | 5/2004 | Viggiano | H04L 9/3271 380/255 |
| 2006/0005049 A1* | 1/2006 | Randell | G06F 21/6209 713/193 |
| 2006/0161787 A1 | 7/2006 | Kikuchi | |
| 2006/0209689 A1* | 9/2006 | Nakano et al. | 370/230 |
| 2006/0294374 A1* | 12/2006 | Tsampalis | H04M 1/72547 713/166 |
| 2007/0092081 A1* | 4/2007 | Yokota | G11B 20/00086 380/277 |
| 2008/0013721 A1 | 1/2008 | Hwang | |
| 2008/0048035 A1* | 2/2008 | Chabanne | G06K 7/0008 235/451 |
| 2008/0130884 A1* | 6/2008 | Matsumoto | H04N 1/00244 380/200 |
| 2009/0080649 A1* | 3/2009 | Dellow | H04L 9/0637 380/44 |
| 2010/0042839 A1* | 2/2010 | Ho | H04L 9/3226 713/169 |
| 2010/0042842 A1 | 2/2010 | Huang et al. | |
| 2010/0122082 A1* | 5/2010 | Deng | H04L 63/126 713/159 |
| 2010/0153719 A1* | 6/2010 | Duc | H04L 9/3271 713/168 |
| 2010/0153731 A1* | 6/2010 | Duc | H04L 9/3271 713/175 |
| 2010/0161988 A1* | 6/2010 | Robshaw | H04L 9/3271 713/170 |
| 2010/0199090 A1 | 8/2010 | Berbain et al. | |
| 2010/0235626 A1* | 9/2010 | Kwon | H04L 9/083 713/156 |
| 2011/0007720 A1* | 1/2011 | Shimizu | H04W 74/02 370/336 |

OTHER PUBLICATIONS

Menezes, A. et al., "Handbook of Applied Cryptography Key Establishment Protocols", Handbook of Applied Cryptography (CRC Series on Discrete Mathematices and its Applications), CRC Press Series on Discrete Mathematics and its Applications, Chapter 12, pp. 489 to 541,(Jan. 1, 1997) XP-002304953.
Calmels, B. et al., "Low-Cost Cryptography for Privacy in RFID Systems", Smart Card Research and Advanced Applications Lecture Notes in Computer Science, LNCS, pp. 237 to 251, (Jan. 1, 2006), XP 19029959.
International Search Report Issued Mar. 22, 2013 in PCT/JP12/54500 Filed Feb. 17, 2012.
U.S. Appl. No. 14/001,437, filed Aug. 23, 2013, Nagai et al.
U.S. Appl. No. 14/001,577, filed Aug. 26, 2013, Nagai et al.
U.S. Appl. No. 14/001,609, filed Aug. 26, 2013, Nagai et al.
Combined Taiwanese Office Action and Search Report issued Aug. 20, 2014 in Patent Application No. 101106094 (with English language translation.
Office Action issued Aug. 25, 2015 in Chinese Patent Application No. 201280010836.9 (with English translation).
Chinese Office Action issued Feb. 24, 2016 in Chinese Patent Application No. 2011800671212 with English translation, 9 pages.
Korean Office Action dated Jul. 2, 2015, issued in Korean Patent Application No. 10-2013-7022688 (with English translation).
Korean Office Action dated Jul. 2, 2012, issued in Korean Patent Application No. 10-2013-7022688 (with English translation).
European Office Action issued Mar. 11, 2016 in Patent Application No. 12 715 449.0.

* cited by examiner

Comparative Example 1 (HB+Protocol)

Comparative Example 2 (Random HB#Protocol)

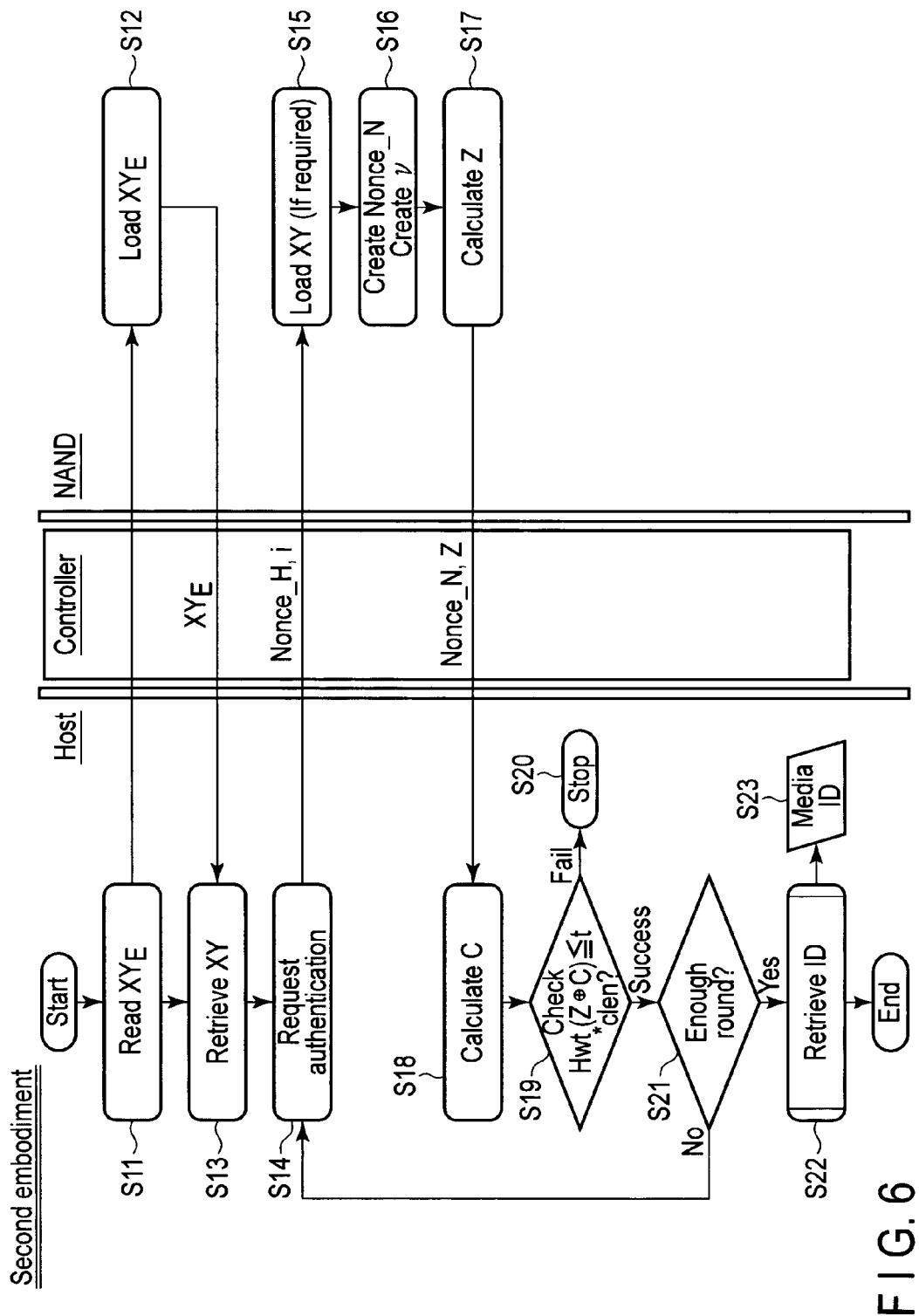
F I G. 6

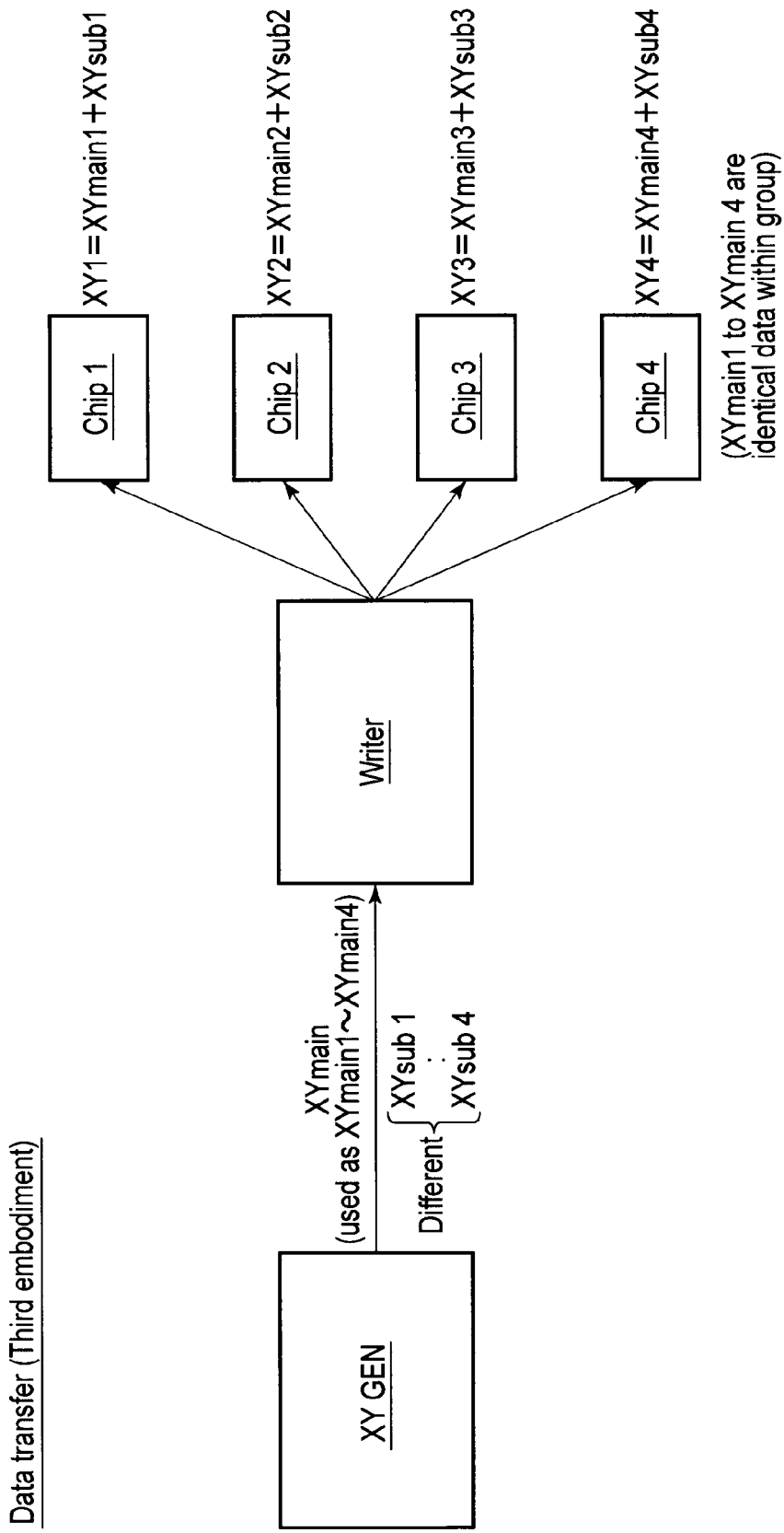
F I G. 9

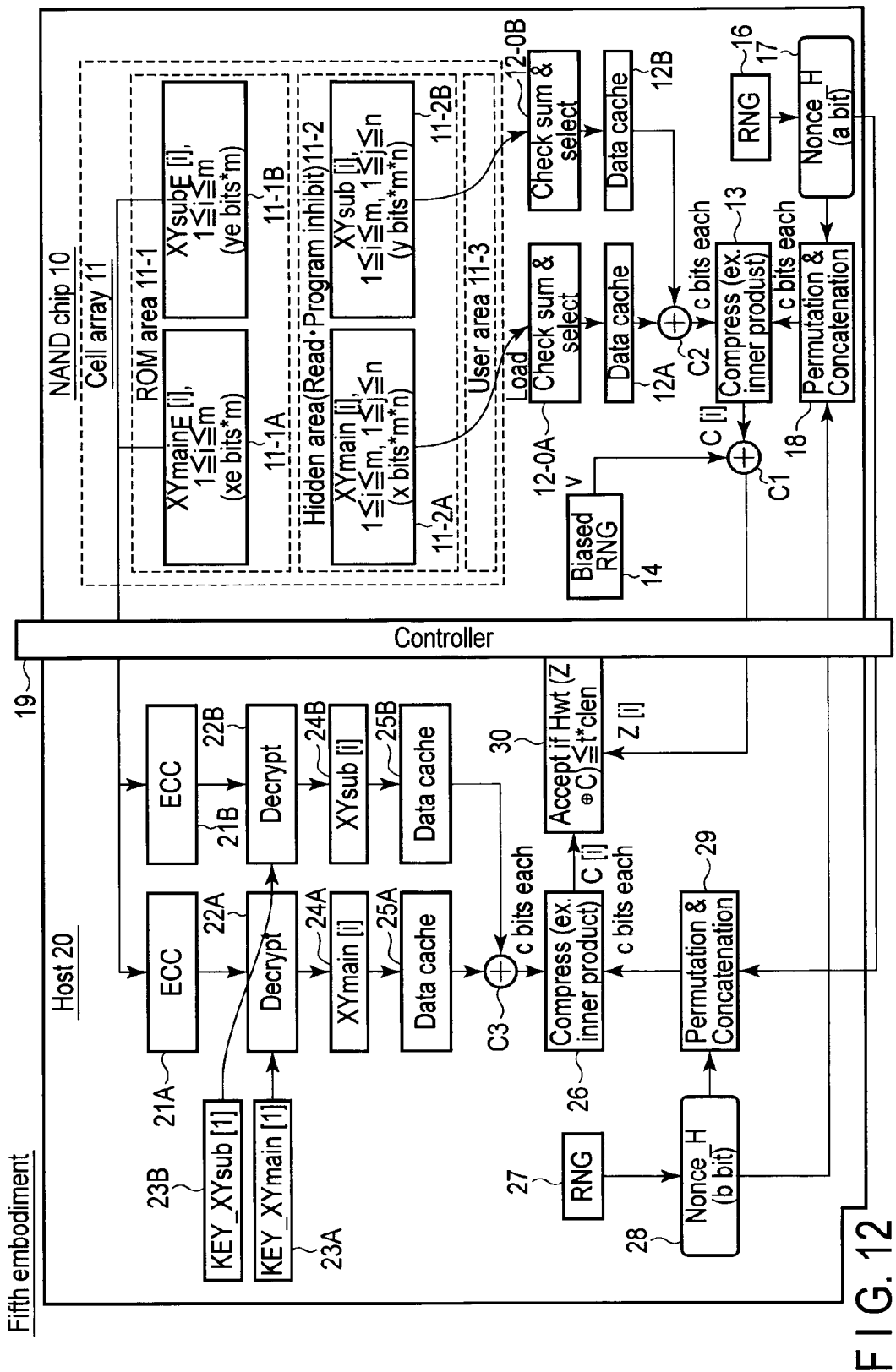
F I G. 12

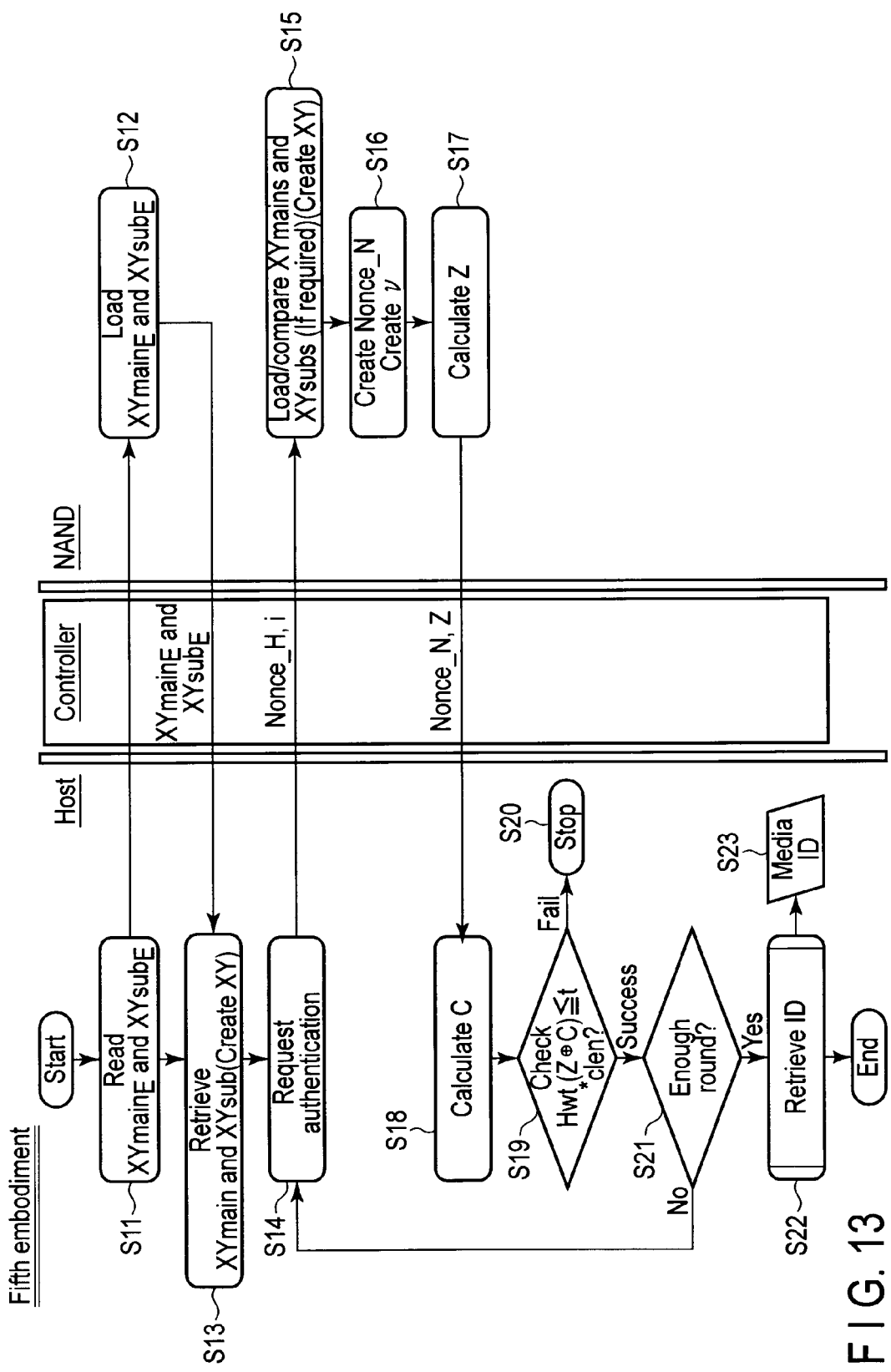
F I G. 13

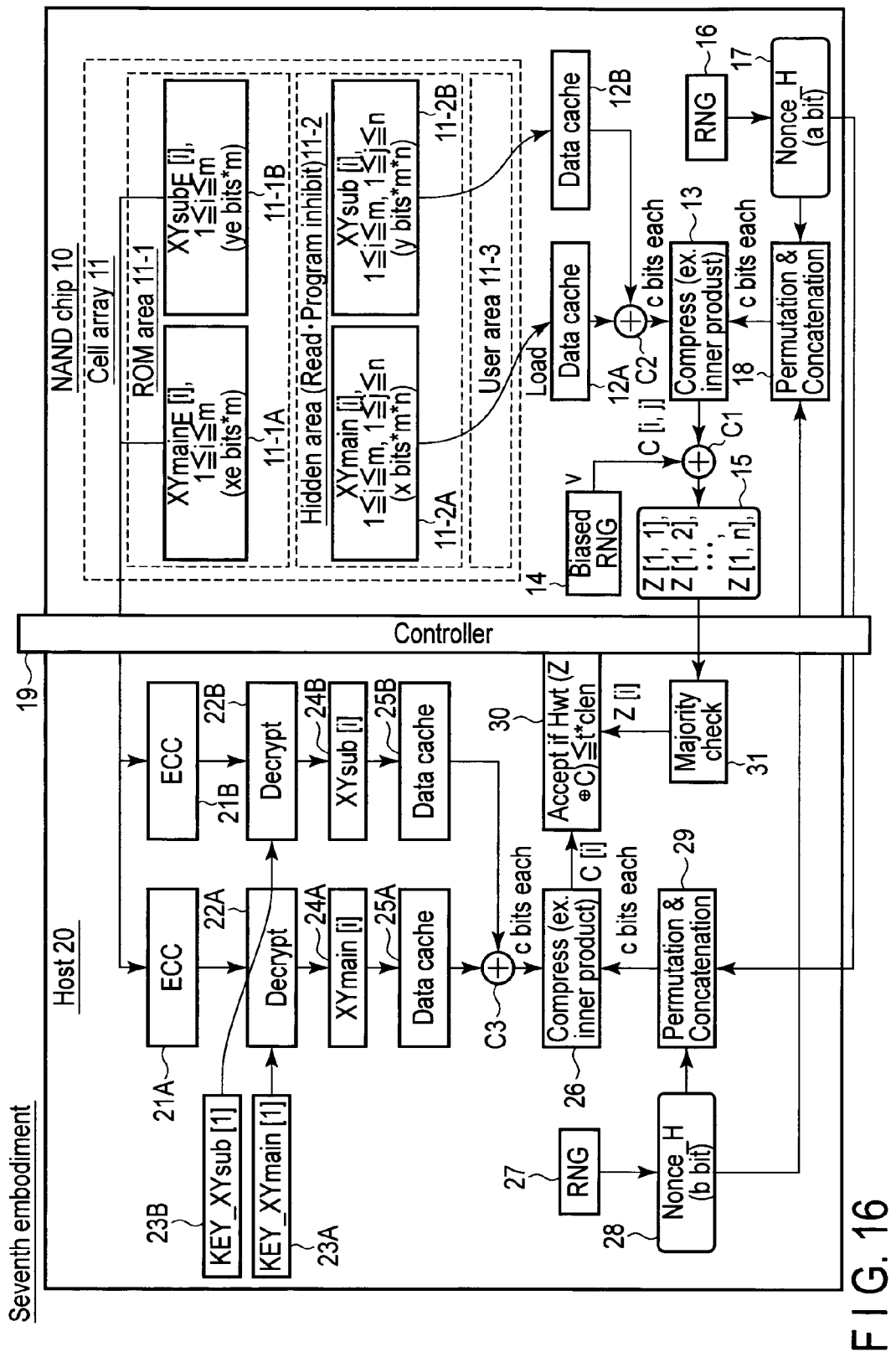
F I G. 16

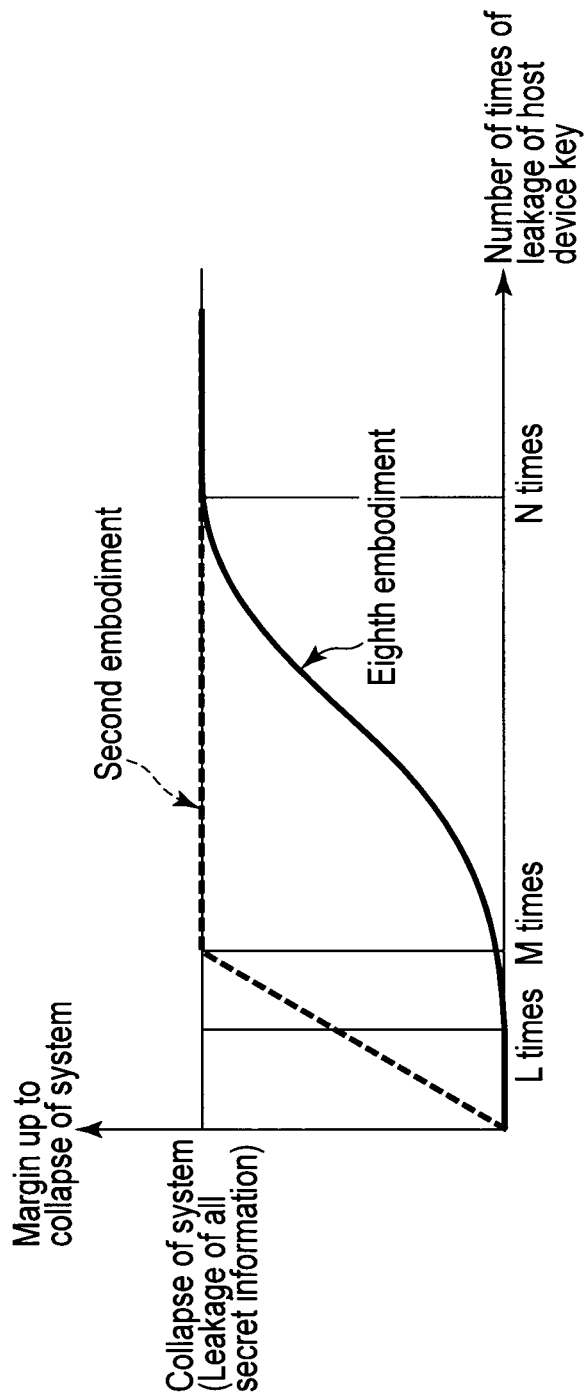
F I G. 22B

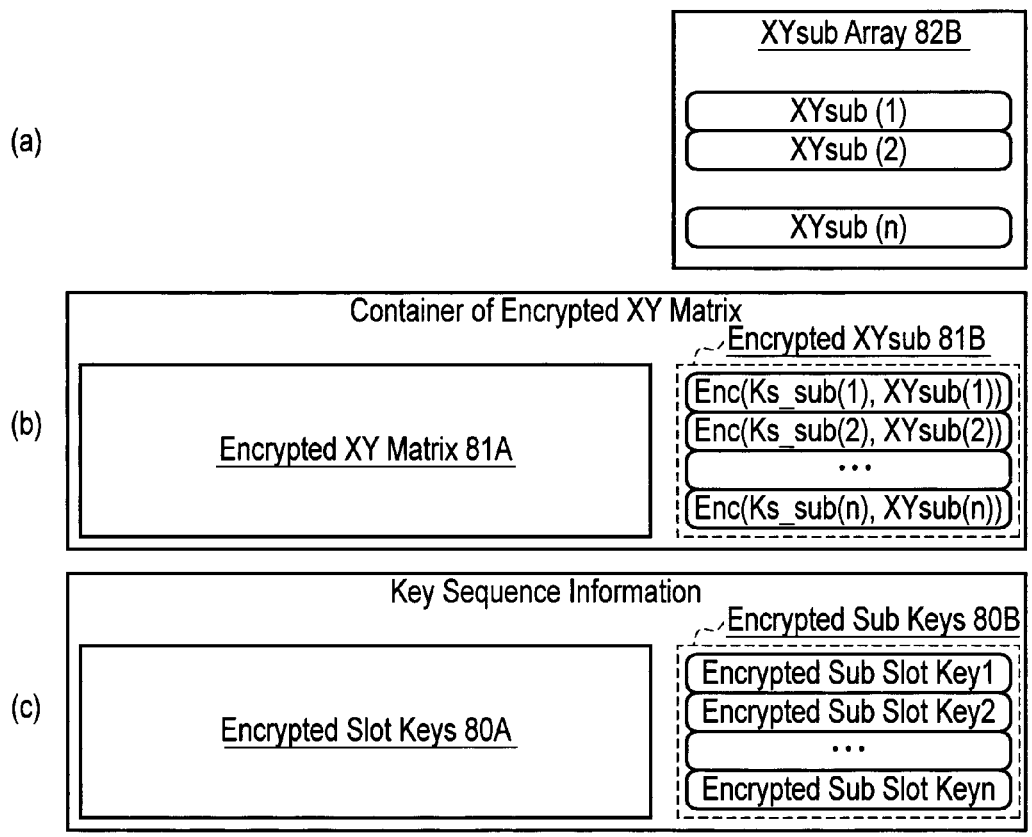
F I G. 25

One way function 91
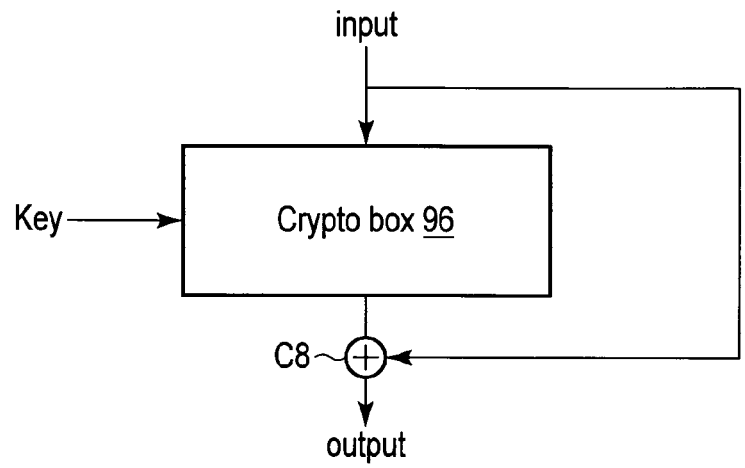
F I G. 29
Crypto box 96
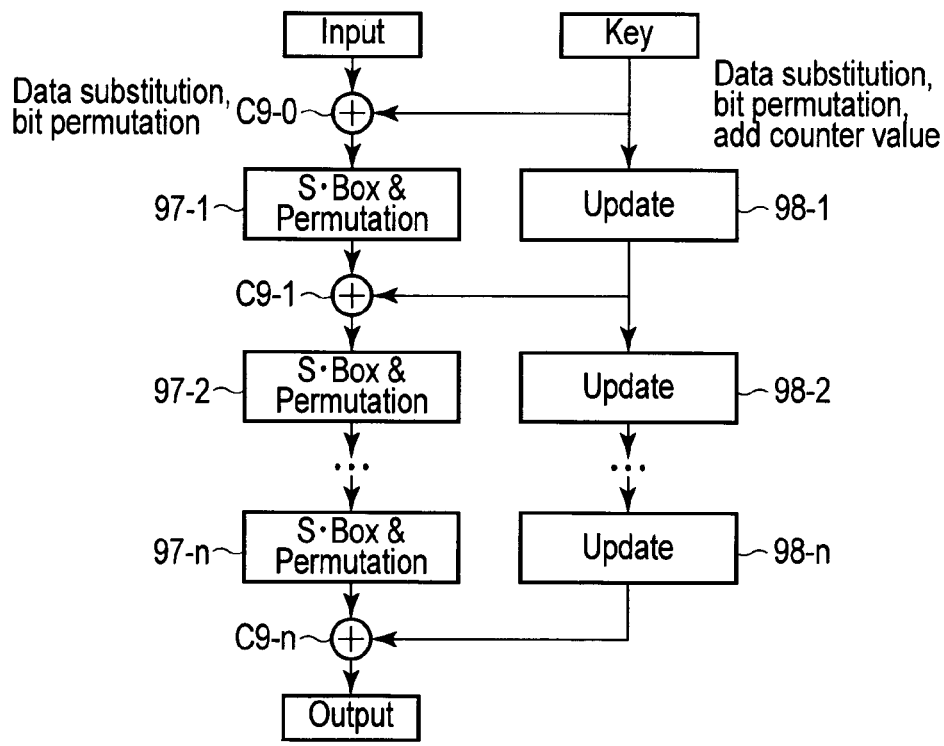
F I G. 30

Eleventh embodiment (Media ID retvieval process)

Twelfth embodiment (ID binding process)
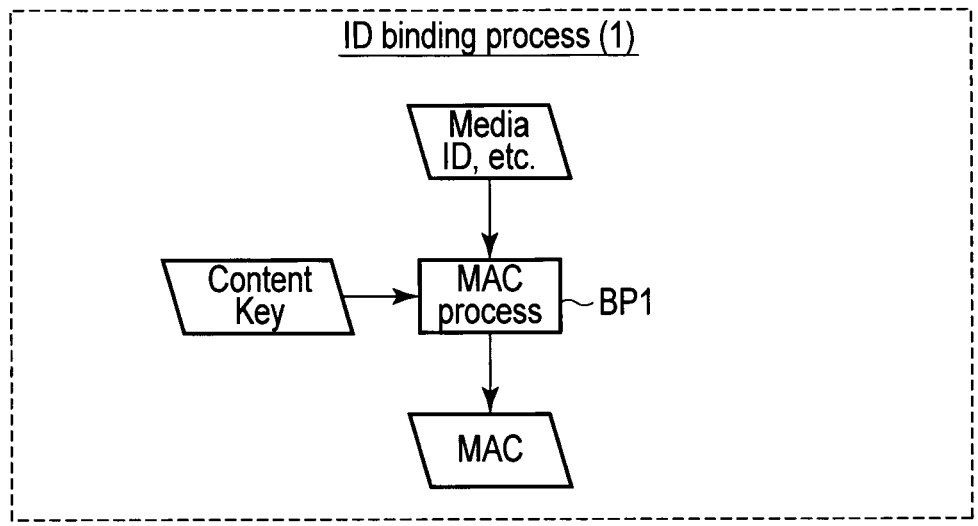
F I G. 36
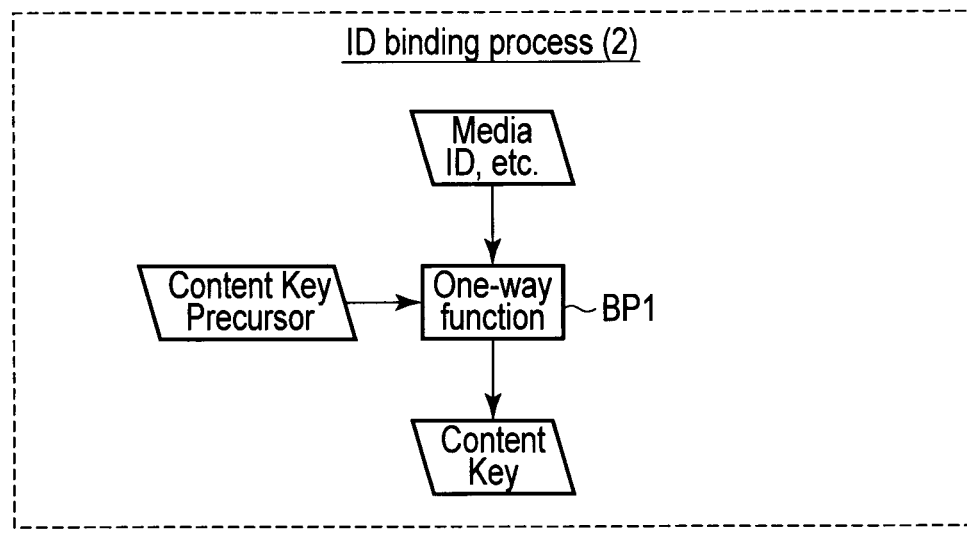
F I G. 37

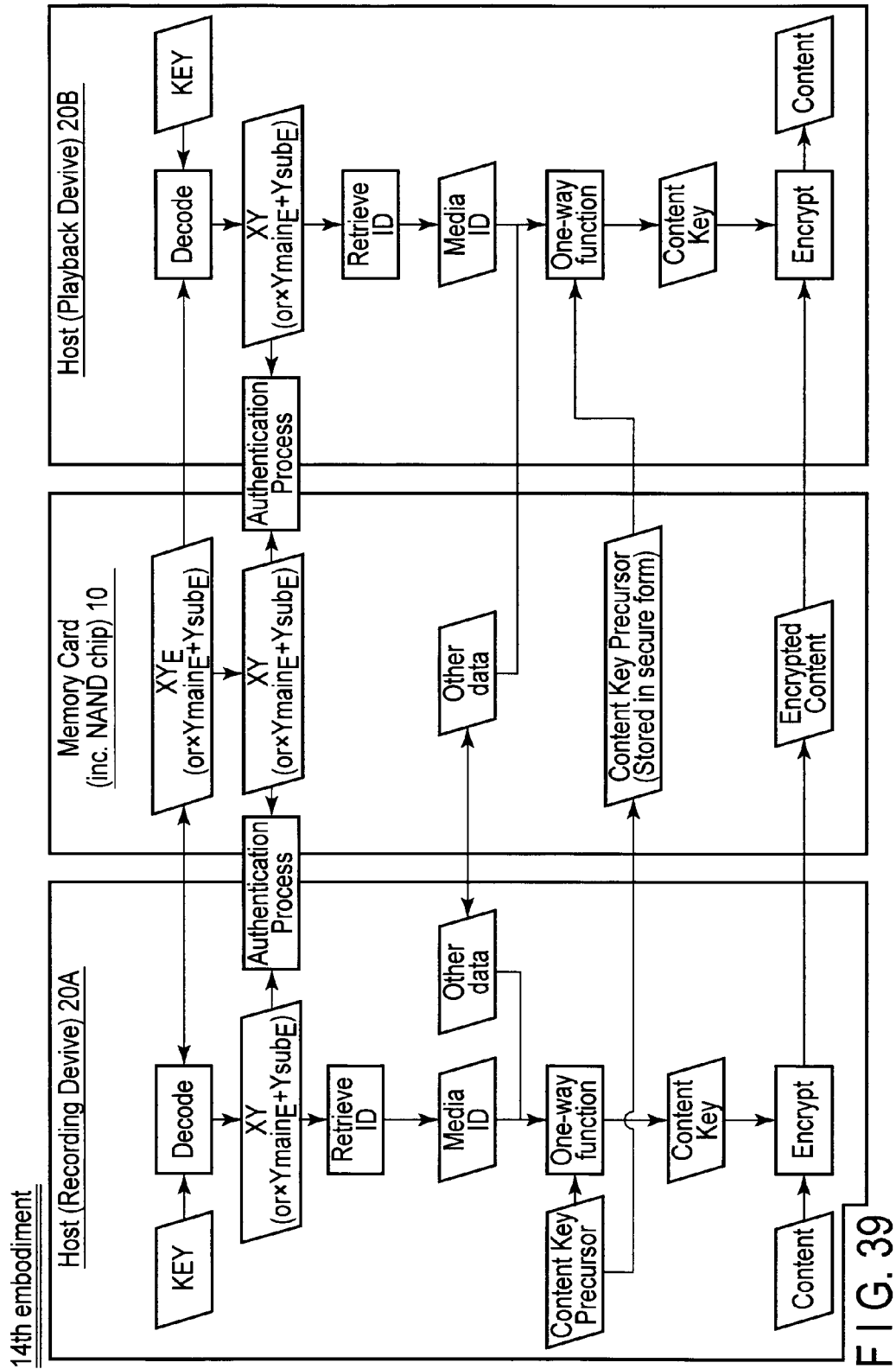
F I G. 39

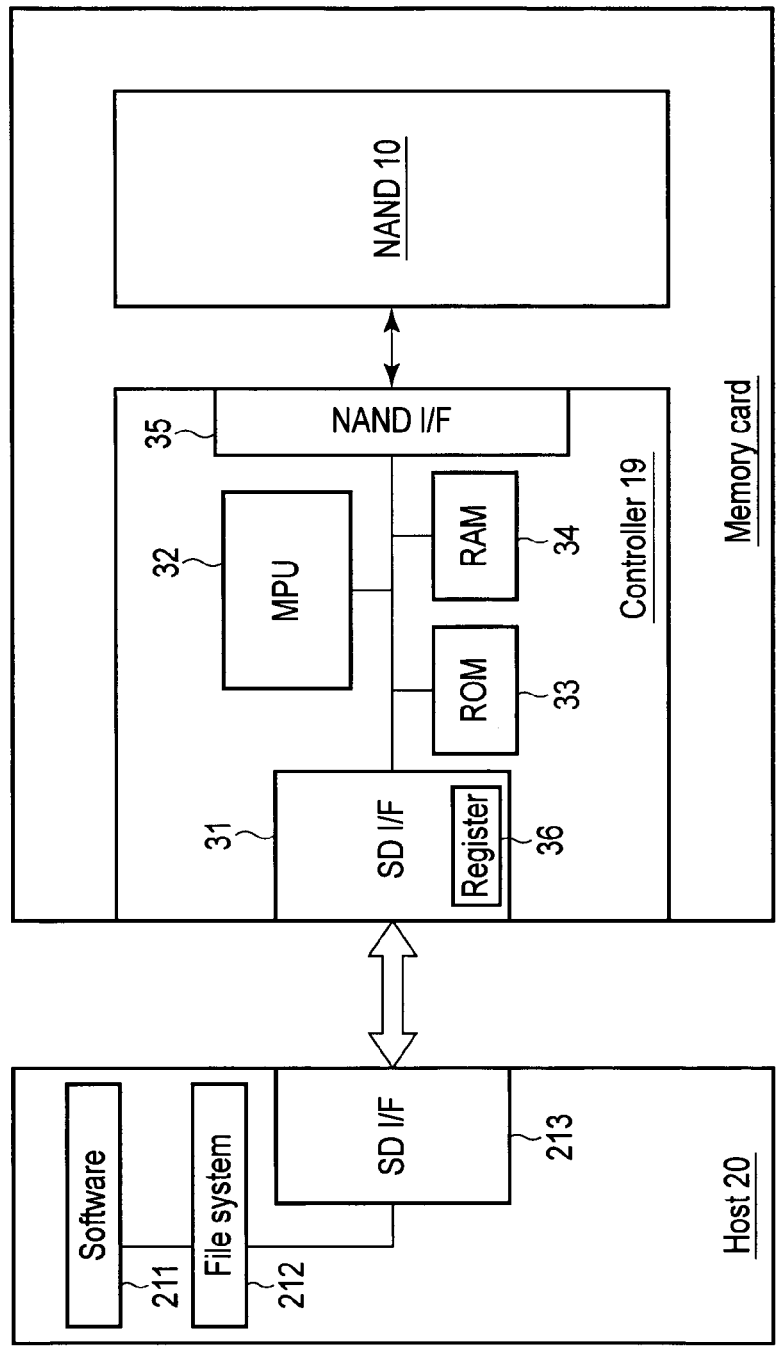
F I G. 40

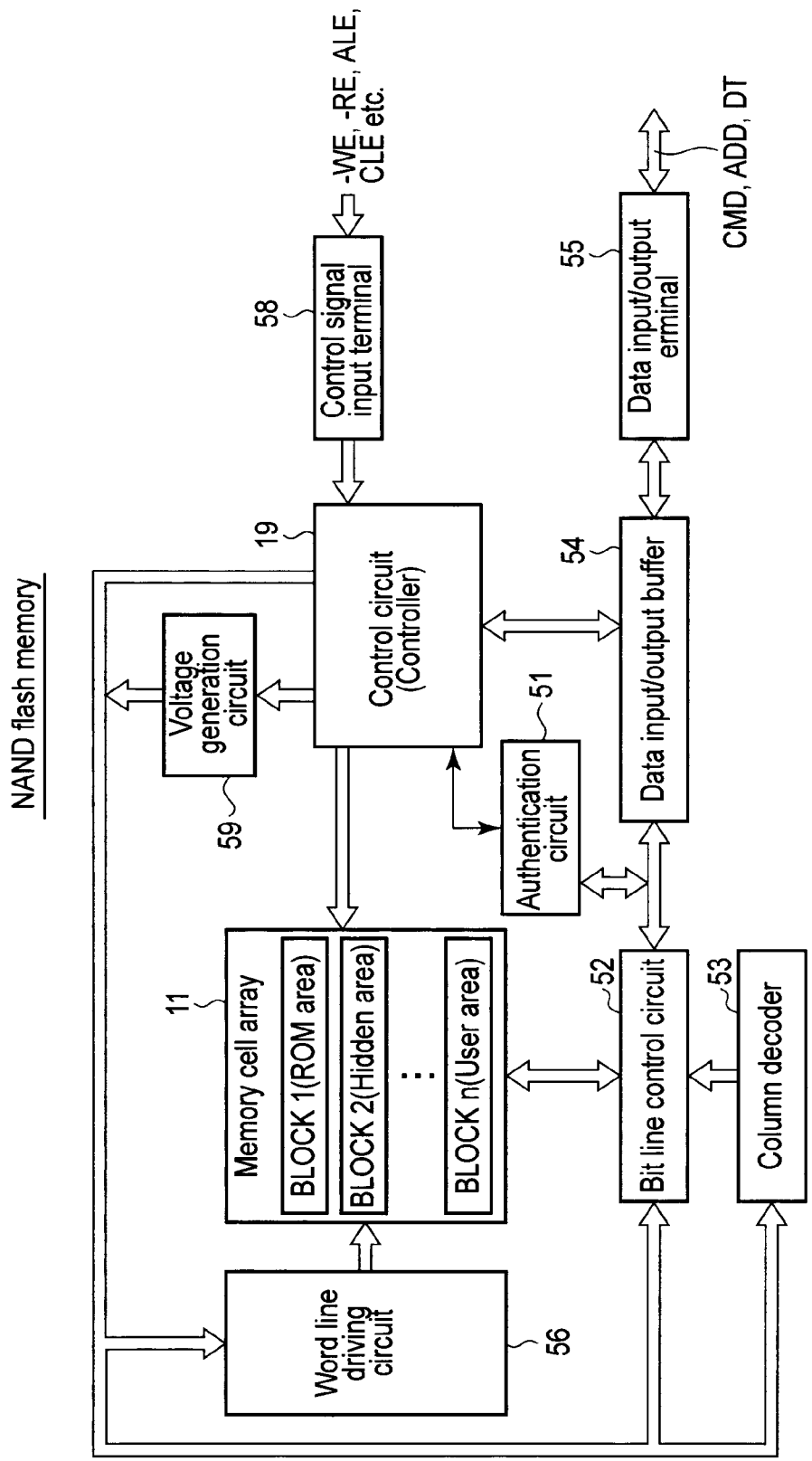
F I G. 41

AUTHENTICATOR, AUTHENTICATEE AND AUTHENTICATION METHOD

CROSS-REFERENCE TO RELATED APPLICATIONS

The present application is a U.S. national phase application under 35 U.S.C. §371 of international application PCT/JP2012/054500 (not published in English), filed Feb. 17, 2012, the entire contents of which are incorporated herein by reference.

This application is based upon and claims the benefit of priority from prior Japanese Patent Application No. 2011-135644, filed Jun. 17, 2011, the entire contents of which are incorporated herein by reference.

FIELD

Embodiments described herein relate generally to an authenticator, an authenticatee and an authentication method.

BACKGROUND

In general, in fields which require security, a method based on a secret, which is shared with an encryptor, is adopted as means for certifying one's own authenticity.

For example, in IC cards, etc., which are used for electronic settlement, an individualized ID and secret information are stored in an IC in the card, and the IC card has a cipher processing function for executing authentication based on the ID and secret information. In another example, there is means for certifying authenticity of an SD (trademark) card in copyright protection of contents.

In each of the above examples, it is necessary that an authenticatee include a secret key and an encryptor. However, the implementation of an encryptor requires a relatively large circuit scale. Thus, in an environment in which restrictions to the circuit scale are imposed at the same time, it is very difficult to certify one's own authenticity. A typical example, in which restrictions to the circuit scale are imposed, is RFID (Radio Frequency Identification). Thus, in recent years, there is a background that the need on implementation is increasing.

BRIEF DESCRIPTION OF THE DRAWINGS

FIG. 6 is a flow chart illustrating an authentication flow according to the second embodiment;

FIG. 9 is a block diagram showing data transfer of secret information in the third embodiment;

FIG. 12 is a block diagram showing a structure example according to a fifth embodiment;

FIG. 13 is a flow chart illustrating an authentication flow according to the fifth embodiment;

FIG. 16 is a block diagram showing a structure example according to a seventh embodiment;

FIG. 22B shows a relationship between time and secret tolerance in the cases of the eighth embodiment and the second embodiment;

FIG. 25 shows a structure example (2) of matrix data according to the ninth embodiment;

FIG. 29 is a block diagram showing a structure example of a one-way function in FIG. 28;

FIG. 30 is a block diagram showing a structure example of a crypto box in FIG. 29;

FIG. 36 is a block diagram illustrating an ID binding process (1) according to a twelfth embodiment;

FIG. 37 is a block diagram illustrating an ID binding process (2) according to the twelfth embodiment;

FIG. 39 is a block diagram showing a structure example according to a 14th embodiment;

FIG. 40 is a block diagram showing a structure example according to a 15th embodiment;

FIG. 41 is a block diagram showing a structure example of a NAND flash memory according to a 16th embodiment;

DETAILED DESCRIPTION

In general, according to one embodiment, an authentication method between an authenticatee which stores key information having a data structure composed of a key transition record, secret information XY of a matrix form, and secret information $XY_E$ which is created by encrypting the secret information XY, and an authenticator which authenticates the authenticatee, includes selecting, by the authenticator, a record corresponding to a device index of the authenticator from the key information which is received from the authenticatee, and decrypting the record by a device key, thereby taking out a key transition; and executing, by the authenticator, a decryption process on the secret information $XY_E$, which is received from the authenticatee, by using the corresponding key transition, and sharing the secret information XY.

[Comparative Example 1 (An Example of HB+Protocol)]

Figure 1:
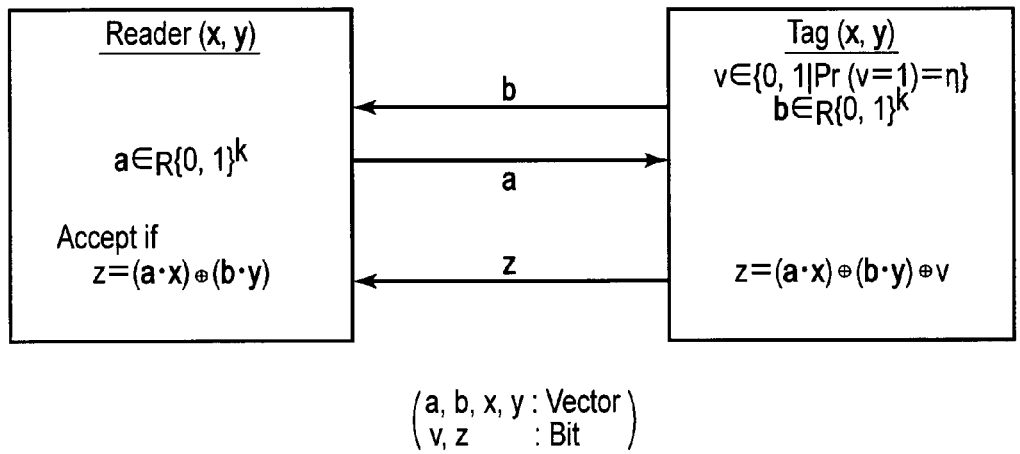
FIG. 1 is a block diagram showing a protocol according to Comparative Example 1.

To begin with, referring to FIG. 1, Comparative Example 1 is described. Comparative Example 1 relates to an example of HB+Protocol.

The HB+Protocol is an improved protocol of HB Protocol which is a lightweight authentication protocol proposed by Hopper and Blum in the year of 2000. The HB protocol is based on the fact that identification of parity values with noise is difficult (LPN: Learning Parity with Noise), and the security against a passive attack has been proved. However, the HB protocol has a vulnerability to an active attack, such as a disguise of a reader (Reader). In order to solve this problem, the HB+Protocol was proposed by Juels, et al. in 2005.

The outline of the HB+Protocol is as shown in FIG. 1. In FIG. 1, a, b, x and y are vectors, and v and z are bits.

As shown in the Figure, in the HB+Protocol, a tag (Tag), which is an authenticatee (to-be-authenticated component), and a reader (Reader), which is an authenticator (authenticating component), share secret information vectors x and y.

The tag delivers a nonce random number vector b to the reader.

Then, the reader delivers a nonce random number a to the tag.

Subsequently, the tag calculates an inner product (a·x) between the random number a and secret information vector x, and an inner product (b·y) between the random number b and secret information vector y. Further, the tag creates a variable v which becomes 1 with a probability of η. Then, the tag adds the inner product (a·x), the inner product (b·y) and variable v, and calculates z=ax⊕ by⊕ v. In this case, ax means the inner product (a·x), and ⊕ means an exclusive logical sum.

Then, the tag transmits the calculated z to the reader.

Subsequently, the reader compares the received z and ax⊕ by, which is calculated by itself, and checks agreement/disagreement. The series of the above processes may be referred to as "1 round".

When the process of 1 round is repeated a plural number of times (e.g. several-ten to several-ten-thousand times), and when the above-described probability of disagreement lowers below a predetermined t, it is regarded that the tag holds secret information, and authentication is successfully executed.

In the meantime, ax⊕ by is the inner product of the secret information x, y and the binding vector a, b. Thus, if the binding vector xy of x, y is secret information and the binding vector of a, b is Concat(a, b), ax⊕ by may be expressed as Concat(a, b)xy.

[Comparative Example 2 (An Example of Random HB#Protocol)]

Figure 2:
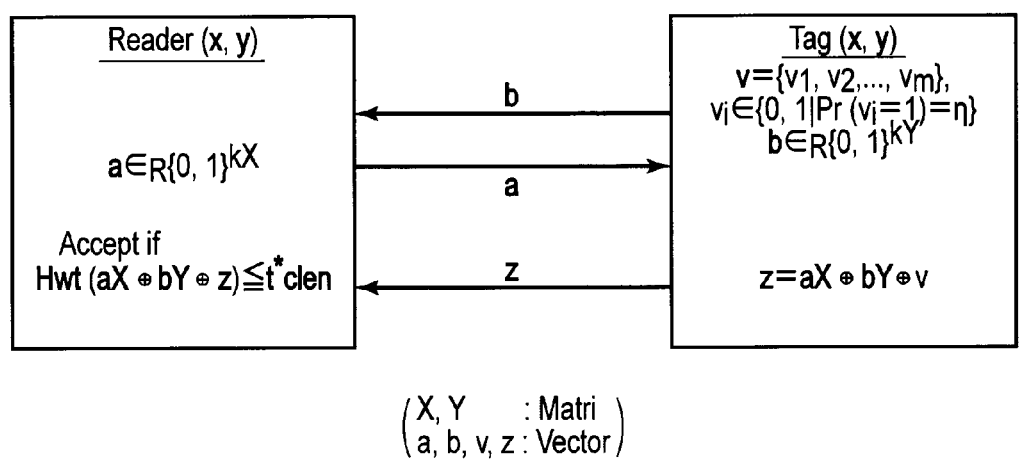
FIG. 2 is a block diagram showing a protocol according to Comparative Example 2.

Next, referring to FIG. 2, Comparative Example 2 is described. Comparative Example 2 relates to an example of Random HB#Protocol. The Random HB#Protocol is a protocol which is a further improvement of the HB+Protocol shown in the above-described Comparative Example 1.

Although the above-described HB+Protocol provides solutions to the passive attack and active attack, there is a tendency that the HB+Protocol has a vulnerability to a man-in-the-middle attack. In order to resolve this issue, the Random HB#Protocol was proposed by Gilbert, et al., as an improved protocol of HB+Protocol.

The outline of the Random HB#Protocol is as shown in FIG. 2. In FIG. 2, X and Y are matrices, and a, b, z, and v are vectors.

As shown in FIG. 2, in the Random HB#Protocol, a tag (Tag) and a reader (Reader) share secret information matrices X and Y.

To begin with, the tag delivers a nonce random number vector b to the reader.

Then, the reader delivers a nonce random number a to the tag.

Subsequently, the tag calculates an inner product (aX) between the random number a and secret information matrix X and an inner product (bY) between the random number b and secret information vector Y. In this case, since X and Y are matrices and a and b are vectors, each internal product result is a vector. Further, the tag creates a variable v which becomes 1 with a probability of η. Then, the tag adds the above-described value, and calculates z=aX⊕ bY⊕ v. In this case, z is a vector.

Then, the tag transmits the calculated z to the reader.

Subsequently, the reader executes bit addition between the received z and aX⊕ bY calculated by itself, that is, calculates a Hamming weight Hwt(aX⊕ bY⊕ z) of aX⊕ bY⊕ z by using a result of an exclusive OR operation. When the Hamming weight Hwt(aX⊕ bY⊕ z) lowers below a predetermined value t*clen, it is regarded that the tag holds secret information, and authentication is successfully executed. In this case, η≤t<0.5, and clen is a bit length of aX⊕ bY.

In the meantime, aX⊕ bY is the inner product between the binding matrix of the secret information pieces X and Y and the binding vector of a and b. Thus, if the binding matrix XY of X and Y is secret information and the binding vector of a and b is Concat(a, b), aX⊕ bY may be expressed as Concat(a, b)XY.

<Points of Improvement on Implementation>

In the protocols of the above-described Comparative Examples 1 and 2, however, for example, when the protocols are to be implemented on a NAND flash memory, etc., the following points (I) to (IV) of improvement are thinkable.

(I) Sharing Means of Secret Information Pieces X and Y

As described above, in the above-described Comparative Examples 1 and 2, the reader and the tag need to share the secret information X, Y. However, Examples 1 and 2 fail to preset concrete sharing methods for sharing the secret information X, Y.

Thus, in the case where all readers and tags share the same X, Y in advance, if X, Y is once exposed, the entire system would be fatally affected. On the other hand, in the case where different information X, Y is applied to each tag, the reader side is requested to access, e.g. a database which stores X and Y which are applied to all tags or totally manages X and Y. As a result, a load on the reader side increases.

As related prior art, Jpn. Pat. Appln. KOKAI Publication No. 2000-357213 proposes a method of mutual authentication between a recording device which records duplicate content in a recording medium having an arithmetic processing function, and the recording medium. The recording medium stores at least first information which depends on the recording medium, and second information which depends on the recording medium and is to be shared with the recording device at a time of executing mutual authentication with the recording device. Based on the first information obtained from the recording medium, the recording device generates authentication information which is used when mutual authentication with the recording medium is executed. Mutual authentication between the recording device and the recording medium is executed by using the generated authentication information and the second information.

(II) Means for Efficiently Recording Secret Information Pieces X and Y in Component P In the above-described HB+Protocol and Random HB#Protocol, a commensurate secret information amount, i.e., a commensurate data size of X, Y, is necessary in order to make it difficult to identify the above-described LPN problem with a practical calculation amount. If X, Y is common to all tags, hardwired log implementation is possible. However, when X, Y is varied from tag to tag, the tag needs to have a sufficient memory capacity in order to hold X, Y. At the same time, it is necessary to individually record the data in the tag fabrication, and the recording time is reflected on the fabrication time.

As a result, the cost of the tag increases due to the increase in memory capacity and the increase in recording time.

(III) Means for Protection Against Damage of Secret Information Pieces X and Y Stored in Component P In the case where the component P stores X, Y in an internal memory, when X, Y is used for authentication, the data completeness of X, Y is required. However, the prior art is silent on this. In order to ensure the data completeness, such a method is thinkable that X, Y, to which an error correction code is added, is stored in the internal memory of the tag, and a correction process is executed at the time of authentication. However, in general, inexpensive memories do not always have a correction function. When the memory does not have the correction function, the correction function needs to be provided as a component in the tag, other than the memory.

As a result, the cost of the tag increases.

(IV) Secret Information Update Means at Time of Exposure of Secret Information Pieces X and Y The above-described Random HB#Protocol is recognized as having the resistance to the passive attack, active attack and main-in-the-middle attack under predetermined conditions. However, in recent years, the vulnerability to a generalized man-in-the-middle attack has been reported, and the possibility of exposure of X, Y cannot be excluded. Although a commensurate attack cost is required for exposure of X, Y, if X, Y is once exposed, the fabrication of falsified tags using the X, Y becomes possible. Thus, means for updating secret information is desirable in order to transition to new X, Y even when X, Y has been exposed.

Taking the above into account, embodiments are described below with reference to the drawings. The reader and tag of RFID have been described above by way of example. However, the same requirements apply to a memory chip, such as a NAND flash memory, in which the circuit area is directly related to the cost. Thus, in the embodiments below, examples are described in which a host device (Host) which authenticates a NAND flash memory is used as a reader (Reader) functioning as an authenticator, and a NAND flash memory (NAND chip) is used as a tag (Tag) functioning as an authenticatee. However, the embodiments are not limited to these examples. For example, the embodiments are applicable to various implementation modes, such as a NOR flash memory, a resistive random access memory (ReRAM), a magnetoresistive random access memory (MRAM), a phase change random access memory (PRAM), a ferroelectric random access memory (FeRAM), a storage device with an arithmetic function and a memory, such as a hard disk drive or a solid-state drive, a component requiring authentication such as an RFID or IC card, and a system comprising a computer including a general-purpose arithmetic element and a general-purpose memory, and software. In the description below, common parts are denoted by like reference numerals throughout the drawings.

[First Embodiment]

Next, a description is given of an authenticator, an authenticatee and an authentication method according to a first embodiment.

<1. Structure Example (Memory System)>

Figure 3:
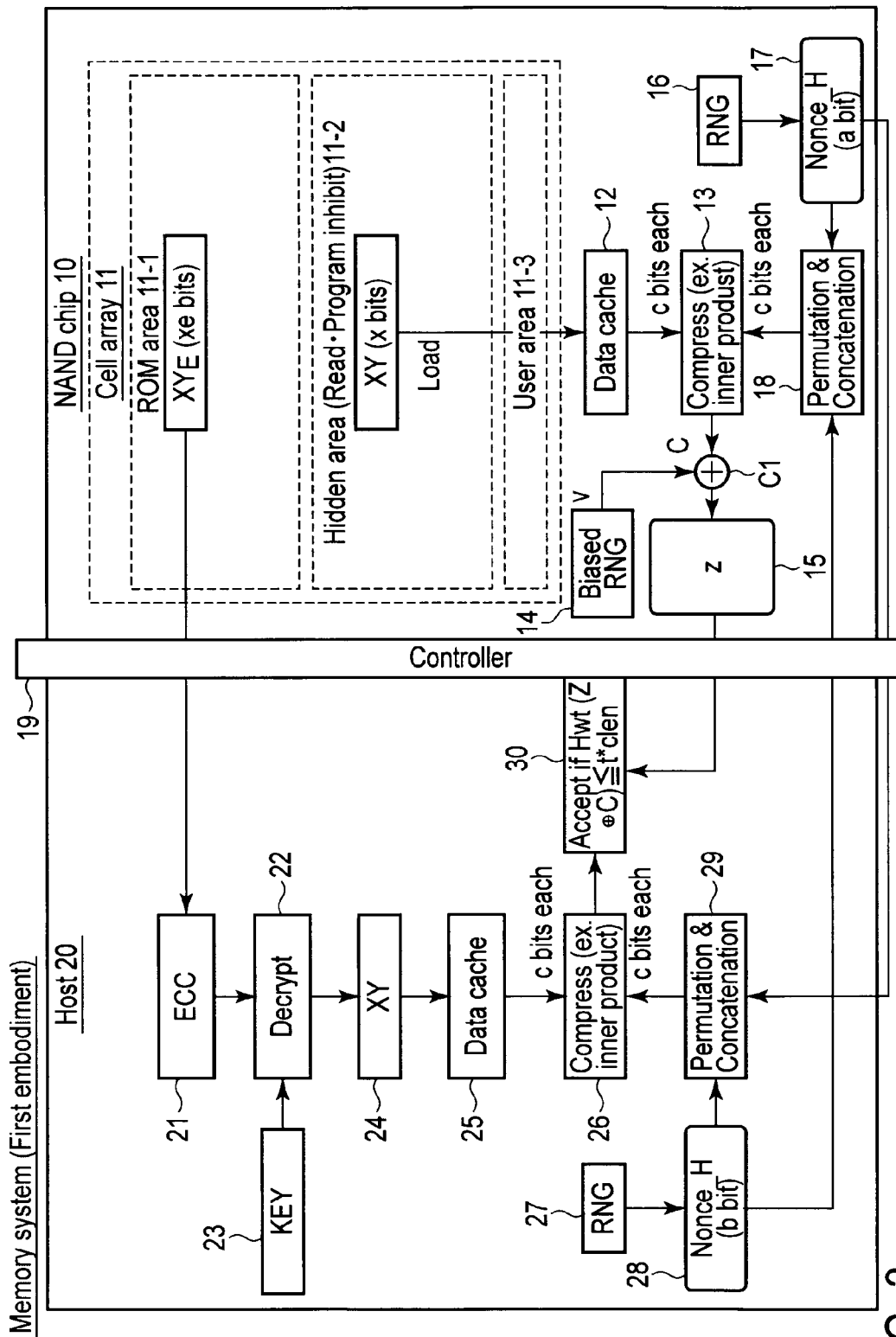
FIG. 3 is a block diagram showing a structure example according to a first embodiment.

To begin with, referring to FIG. 3, a structure example according to the first embodiment is described.

A memory system shown in FIG. 3 includes a NAND flash memory 10 which is an authenticatee, a host device 20 which is an authenticator, and a controller 19 which mediates between both. As shown in FIG. 3, the host device 20 accesses the NAND flash memory 10 via a device called "controller 19", which has a function of accessing the NAND flash memory 10.

A fabrication process of a semiconductor product is described. The fabrication process of a semiconductor product is mainly divided into a pre-process of forming a circuit on a substrate wafer, and a post-process of dicing the wafer into pieces and performing wiring and resin package sealing. In this case, the controller 19 is variously configured, for example, such that the controller 19 is included in the NAND flash memory 10 in the pre-process, the controller 19 is not included in the pre-process but is included in the same package in the post-process, or the controller 19 is formed as a chip which is different from the NAND flash memory 10. In the Figures including FIG. 3, the case is described, by way of example, in which the controller 19 is formed as a chip different from the NAND flash memory 10. However, the present embodiment is applicable to any of the above cases. In the description below, unless otherwise specified, the controller mediates, in many cases, in the transactions of data and instructions between the host device 20 and NAND flash memory 10, but a description of this will be omitted. Structure examples of the NAND flash memory 10 and controller 19 will be described later.

The respective components and data processing, illustrated in FIG. 3, will be described below. As shown in the Figure, a method of sharing secret information X, Y and a structure in the case of applying this method to the NAND flash memory 10 are illustrated.

1-1. NAND Flash Memory

The NAND flash memory 10 is an authenticatee. The NAND flash memory 10 according to this example includes a cell array 11, a data cache 12 which is disposed in a peripheral area of the cell array 11, a compression arithmetic circuit 13, a biased RNG 14, an output module 15, a random number generator 16, a permutation & concatenation circuit 18, and a bit-by-bit addition circuit C1.

In the cell array (Cell array) 11, a plurality of memory cells are arranged in a matrix at intersections between bit lines and word lines (not shown). The memory cell includes, in the named order on a semiconductor substrate, a tunnel insulation film, a floating gate, an interlayer insulation film, and a control gate connected to the word line. Current paths of memory cells in the bit line direction are connected in series, thereby constituting a cell unit. The cell unit is selected by a select transistor which is connected to the bit line and a source line. A plurality of memory cells in the word line direction constitute 1 page (Page) which is a unit of data read and data write. In addition, a plurality of pages constitute a block (Block) which is a unit of data erase.

The cell array (Cell array) 11 includes a ROM area 11-1, a hidden area 11-2 and a user area 11-3.

The ROM area (ROM area) 11-1 is an area in which data record is prohibited and data read is permitted. In the ROM area 11-1 according to this example, data $XY_E$ (xe bits), which is obtained by encrypting secret information XY and further adding a correction code to the encrypted secret information, is recorded. For the encryption, use may be made of an encryptor of, e.g. AES (Advanced Encryption Standard), which is a symmetric key cipher. As the encryption mode, use may be made of CTR (Counter), CBC (Cipher block chain), etc. In addition, use may be made of ECDSA (elliptic curve cipher) or RSA, which is an asymmetric cipher. Besides, as the error correction code, use may be made of a BCH code, a Reed Solomon code, LDPC (Low density parity check) code, etc. In this manner, the present example is applicable to any encryption method and any correction code. In this case, $XY_E$ is expressed as data which is obtained by encrypting secret information XY and further adding a correction code to the encrypted secret information. In addition, (xe bits) represents a bit number.

The hidden area (Hidden area) 11-2 is an area in which the outside of the NAND flash memory 10 is prohibited from data record, and in which data read is prohibited (Read Program inhibit). In the hidden area 11-2 according to this example, data XY corresponding to X, Y for use in the authentication is recorded.

The user area (User area) 11-3 is an area in which data record and data read can be freely executed. In the user area 11-3, for example, image data such as photos, and moving picture data are recorded.

The above-described ROM area, hidden area and user area may be realized by making physical structures different, or may be realized by logical control within the NAND flash memory, with the physical structure being the same. In this case, the logical control is, for example, such a method that the respective areas are provided with identifiers which control access from the outside of the NAND flash memory, these identifiers are stored, and access control is executed by the identifiers when the NAND flash memory has received access to the areas from the outside.

In addition, each of the memory cells constituting the cell array (Cell array) 11 may be a memory cell which stores a plurality of bits (MLC: Multi Level Cell) or a memory cell which stores 1 bit (SLC: Single Level Cell). Further, the ROM area and hidden area may be configured to be used by the SLC, and the user area may be configured to be used by the MLC. At this time, the physical structure of the cell array may be different between the SLC area and the MLC area, or only partial bits of the memory cell, which is usable as the MCL, may be utilized as a pseudo-SLC area.

The data cache (Data cache) 12 temporarily stores data which has been read out from the cell array 11.

The biased RNG (Biased RNG) 14 generates a random number v which becomes 1 with a predetermined probability η. In the meantime, the random number generator, which is described below, may be used as an input source of the biased RNG. In this case, a random number corresponding to the probability η can be generated by executing an arithmetic operation, such as AND or OR, on a plurality of random number sequences which are output from the random number generator.

The random number generator (RNG: Random Number Generator) 16 generates a random number Nonce_N (a bit) which is used in authentication.

The permutation & concatenation circuit (Permutation & Concatenation) 18 generates a random number Nonce (c bits) which is constituted from a random number Nonce_H that is input from the host device 20, and a random number Nonce_N that is input from the memory 10, by using XY which is shared by both. In this case, a means a bit length of Nonce_N, b means a bit length of Nonce_H, and c means a bit length which is input per 1 process of the compression arithmetic circuit. Specifically, an individual random number Nonce, which is output from the permutation & concatenation circuit (Permutation & Concatenation), is data for 1 process of the compression arithmetic circuit, and total bits of Nonce_N and Nonce_H may be used for 1 process or parts thereof may be used selectively.

The compression arithmetic circuit (Compress (ex. inner product)) 13 executes a predetermined arithmetic operation, such as an inner product arithmetic operation, with respect to the output XY (c bit each) of the data cache 12 and the output (c bits) of the permutation & concatenation circuit 18, and outputs data C.

The bit-by-bit addition circuit C1 outputs, to the output module 15, Z=C+v, which is obtained by adding v that has been generated by the biased RNG to the output bit of the compression arithmetic circuit 13. As described above, the bit addition means an exclusive logical sum. Specifically, the bit-by-bit addition circuit outputs an exclusive logical sum of bits of 2 input data.

The output module 15 outputs the result (Z=C+v) of the bit-by-bit addition circuit C1 to the host device 20 via the controller 19.

The structural components, such as the data cache 12, other than the cell array 11, may also be disposed in the memory controller 19.

1-2. Host

The host (Host) 20 according to the present example includes a correction process module 21, a decrypt module 22, a key holding module 23, a data temporary storage module 25, a compression arithmetic circuit 26, a random number generator 27, a permutation & concatenation circuit 29, and a determination module 30.

The correction process module (ECC) 21 executes an error correction process (ECC) on the data $XY_E$ which has been read out from the ROM area 11-1 of the NAND flash memory 10.

The decrypt module (Decrypt) 22 decrypts, after the read-out data $XY_E$ has been subjected to the error correction process, the data $XY_E$ by a key (KEY) which is held in the key holding module 23, thereby obtaining XY.

The data temporary storage module (Data cache) 25 temporarily stores the decrypted XY. Thereby, the host device 20 and NAND flash memory 20 can share secret information XY.

The compression arithmetic circuit (Compress (ex. inner product)) 26 executes a predetermined arithmetic operation, such as an inner product arithmetic operation, with respect to the output (c bit each) of the data cache 25 and the output (c bits) of the permutation & concatenation circuit 29, and outputs data C.

The random number generator (RNG) 27 generates a random number Nonce_H (b bit) of the host.

The permutation & concatenation circuit (Permutation & Concatenation) 29 generates a random number Nonce (c bits) which is constituted from a random number Nonce_H that is input from the host 20, and a random number Nonce_N that is input from the memory 10, by using XY which is shared by both.

The determination module (Accept if Hwt(Z⊕ C)≤t*clen) 30 calculates a Hamming weight Hwt(Z⊕ C), as described above, with respect to the output C of the compression arithmetic module 26 and the output Z of the output module 15. When the Hamming weight Hwt(Z⊕ C) becomes lower than the predetermined value t*clen, the determination module 30 regards that the secret information is held, and determines the success of authentication. It is assumed that $\eta \le t < 0.5$, and clen is the bit length of $Z \oplus C$.

In this manner, the host 20, excluding the biased RNG process 27, confirms the authenticity of the NAND flash memory 10 that is the authenticatee, by the determination module 30 comparing C and Z which have been obtained by the same process.

Meanwhile, the same process by the above-described structure may be executed a plural number of times, and thereby the authenticity may be finally confirmed. For example, in the present Figure, the case in which C is plural bits is illustrated by way of example, and the comparison determination method employs, in the determination, the Hamming weight in the addition bit sequence of Z and C. If C is a single bit, the above-described process needs to be executed a plural number of times, like the above-described HB+Protocol. In this case, like the HB+Protocol, it should suffice if the ratio of disagreement between Z and C is checked based on the probability of occurrence of an error variable.

1-3. Modification

Aside from the above, the structure of this embodiment may be modified, where necessary, as will be described below.

The compression process may correspond to the inner product calculation according to Comparative Examples 1 and 2 shown in FIG. 1 and FIG. 2, but may not necessarily correspond to the inner product calculation. For example, in the compression process, data based on XY and data based on Nonce_H and Nonce_N may be input to the arithmetic device which is composed of an LFSR (Linear Feedback Shift Register), and a part or all of the register values in the LFSR after the input may be used as a compression result. Alternatively, a CRC arithmetic device may be used as the LFSR. Further, a hash function may be used as a function which is used for the compression process. The hash function may be, or may not be, based on an encryptor. No matter which arithmetic method is used, the method proposed in this embodiment is applicable. There is no difference in belonging to the LPN problem that is the basis of security. The compression process may be lossless compression or lossy compression. The compression process means a process of outputting data which is, at least, smaller than input data, and depends on the input data.

A description is given of a process of sending Nonce which is generated based on Nonce_H and Nonce_N. Nonce is data which is generated by binding Nonce_H and Nonce_N in a predetermined order, and is then sent. The binding/sending method may be a simple forward-feed data binding/sending method, or an interleave data binding/sending method in which mutual data is alternately inserted. Data may be sent a plural number of times by the above-described method. In any case, Nonce is data which is generated from at least a part of Nonce_N and Nonce_H, and is data with c bit length. It is assumed that the data length of Nonce_N is a, the data length of Nonce_H is b, and the total data length of both is d. If c=d and data is not sent a plural number of times, the output from the compression calculation module is 1 bit. If c=d and data is sent a plural number of times, the output from the compression calculation module is such that 1 bit is sent a plural number of times. If c<d and data is sent a plural number of times, the output from the compression calculation module is such that 1 bit is sent a plural number of times.

On the other hand, as regards XY with respect to which compression with Nonce is calculated, data in XY is sent to the compression calculation module in units of c bit. The bit size x of XY data is equal to c or an integer number of times of c. When the bit size x is equal to c, the output of the compression calculation module is 1 bit. When the bit size x of XY data is an integer number of times of c, the output of the compression calculation module is such that 1 bit is output a plural number of times. Typical combinations are as follows:

In case of c=d=x, the output of the compression calculation module is 1 bit,

In case of c=d<x, the output of the compression calculation module is a plural number of times of 1 bit, and In case of c<d, and c<x, the output of the compression calculation module is a plural number of times of 1 bit. In the meantime, the above example relates to the case in which the compression calculation module compresses 2 inputs to 1 bit. In the case where the compression calculation module compresses 2 inputs to plural bits, the output value itself per one time becomes plural bits.

<2. Authentication Flow>

Figure 4:
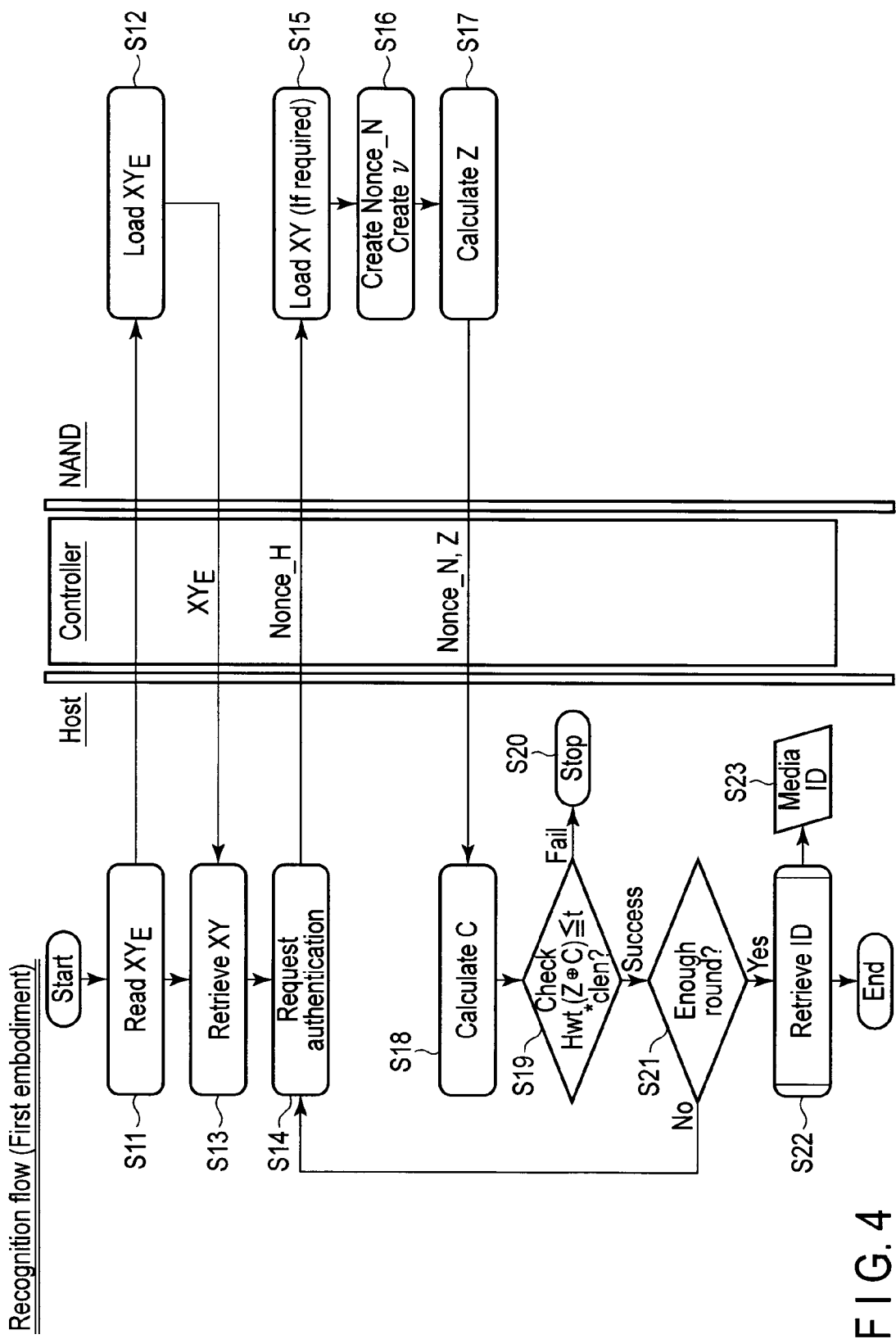
FIG. 4 is a flow chart illustrating an authentication flow according to the first embodiment.

Next, referring to FIG. 4, a description is given of an authentication flow of the memory system having the structure shown in FIG. 3.

If authentication is started (Start), the host device 10, in step S11, sends a read instruction (Read $XY_E$) of $XY_E$ to the NAND flash memory 10.

Then, in step S12, the NAND flash memory 10 loads $XY_E$ (load $XY_E$) from the cell array 11-1 according to the read instruction, and sends this to the host device 20.

Subsequently, in step S13, the host device 20 executes the above-described decrypt process on the received $XY_E$, and retrieves XY (Retrieve XY).

Then, in step S14, the host device 20 sends an authentication request (Request authentication) to the NAND flash memory 10. In this case, the authentication request may include Nonce_H.

Thereafter, in step S15, the NAND flash memory 10 receives Nonce_H, and loads XY (Load XY (if required)).

Then, in step S16, the NAND flash memory 10 creates Nonce_N and v (Create Nonce_N, Create v).

Subsequently, in step S17, the NAND flash memory 10 adds the generated v, as described above, and calculates Z. The NAND flash memory 10 sends Nonce_N and Z to the host 20.

Then, in step S18, after receiving Nonce_N and Z, the host 20 executes a predetermined arithmetic operation such as an inner product arithmetic operation, and calculates data C.

Subsequently, in step S19, the host device 20 calculates a Hamming weight Hwt(Z⊕ C) with respect to the sequence of bit-by-bit XOR values of Z and C, and executes a determination process to determine whether the Hamming weight Hwt(Z⊕ C) is lower than a predetermined value t*Clen (Check Hwt(Z⊕ C)≤t*Clen). As described above, t is a value based on an error addition probability (or a probability of occurrence of 1 in data) η an error bit or an error vector which was used by the NAND flash memory 10 at the time of calculating Z, and it is assumed that η≤t<0.5. In addition, it is assumed that Glen is the bit length of C.

Subsequently, in step S20, when the determination result in step S19 fails to become lower than the predetermined value (Fail), the host 20 determines failure and stops the operation.

Then, in step S21, when the determination result in step S19 is lower than the predetermined value (Success), the host 20 determines whether a predetermined round number has been reached (Enough round). The round number, in this context, refers to a series of processes from the authentication request process to the determination process. If the round number is not reached (No), the authentication request process (S14~) is repeated.

Subsequently, in step S22, when the round number is reached (Yes), the host device 10 regards that the authentication has been successfully executed, and executes, where necessary, a process of calculating Media ID, based on the XY. The calculation process of Media ID and the method of using Media ID (S23 and the following) will be described later.

By the above-described operation, the authentication flow according to the first embodiment is finished (End).

In the meantime, it is necessary to use different parameters of Nonce_N, Nonce_H and v between the respective rounds. In addition, when the NAND flash memory 10 has received an authentication request, if XY at the time of the previous authentication request remains loaded in the Data Cache, it is possible to omit the loading of XY from the cell array, and to use the values in the Data Cache. In addition, after step S17, the XY in the Data Cache may be erased. In particular, in the case where the NAND flash memory 10 provides to the outside the function of accessing the Data Cache, it is useful, in terms of security, to erase the secret information XY in the Data Cache at a stage when the data Z that is necessary for authentication has been calculated.

<3. Advantageous Effects>

According to the structure and the authentication method relating to the first embodiment, the above points (I) to (IV) can be improved, and at least the following advantageous effect (1) can be obtained.

(1) Different secret information XY can be shared between the authenticator and the authenticatee while the secret state of the secret information XY is maintained, and authentication can be executed by a light amount of calculation based on the shared secret information.

The NAND flash memory 10 according to the present embodiment stores the secret information XY in the hidden area 11-2 that is the record prohibition/read prohibition area, and stores $XY_E$, which is obtained by encrypting the secret information XY and adding the correction code to the encrypted secret information, in the ROM area 11-1 that is the record prohibition/read permission area. Further, the host device 20 has the function of reading out the $XY_E$ and executing the error correction process 21 and decryption process 22, and can share the secret information XY between the NAND flash memory 10 and host device 20 by the key 23 that is used for decryption. Thus, the authenticator and authenticatee can execute authentication by the shared secret information XY (S11 to S23).

In addition, the NAND flash memory 10 and the host device 20 include the RNG 16, 17 which creates nonce random numbers, the permutation & concatenation module 18, 29, the compression calculation module 13, 26, the bit-by-bit addition module C1, 26 of nonce random numbers, and the output module 15. Furthermore, the NAND flash memory 10 includes the biased RNG 14. The host 20 includes the determination module 30 which compares the Z that is output from the NAND flash memory 10 and the C that is calculated within the host device, thereby executing authentication.

As described above, in the first embodiment, since the secret information XY is stored in the hidden area 11-2 that is the record prohibition/read prohibition area and the data Z is generated by using this information, the secrecy can be secured. Moreover, the $XY_E$, which is obtained by encrypting the secret information XY and adding the correction code to the encrypted secret information, is stored in the ROM area 11-1 that is the record prohibition/read permission area. The host 20 subjects the $XY_E$, which is read out therefrom, to the error correction process 21 and the decryption process 22 using the key 23, thereby sharing the XY. Thus, different secret information XY can be shared between the authenticator and the authenticatee while the secret state of the secret information XY is maintained.

Therefore, according to the structure and the authentication method relating to the first embodiment, there is the advantage that different secret information XY can be shared between the authenticator and the authenticatee while the secret state of the secret information XY is maintained, and authentication can be executed by a light amount of calculation based on the shared secret information.

[Second Embodiment]

Figure 5:
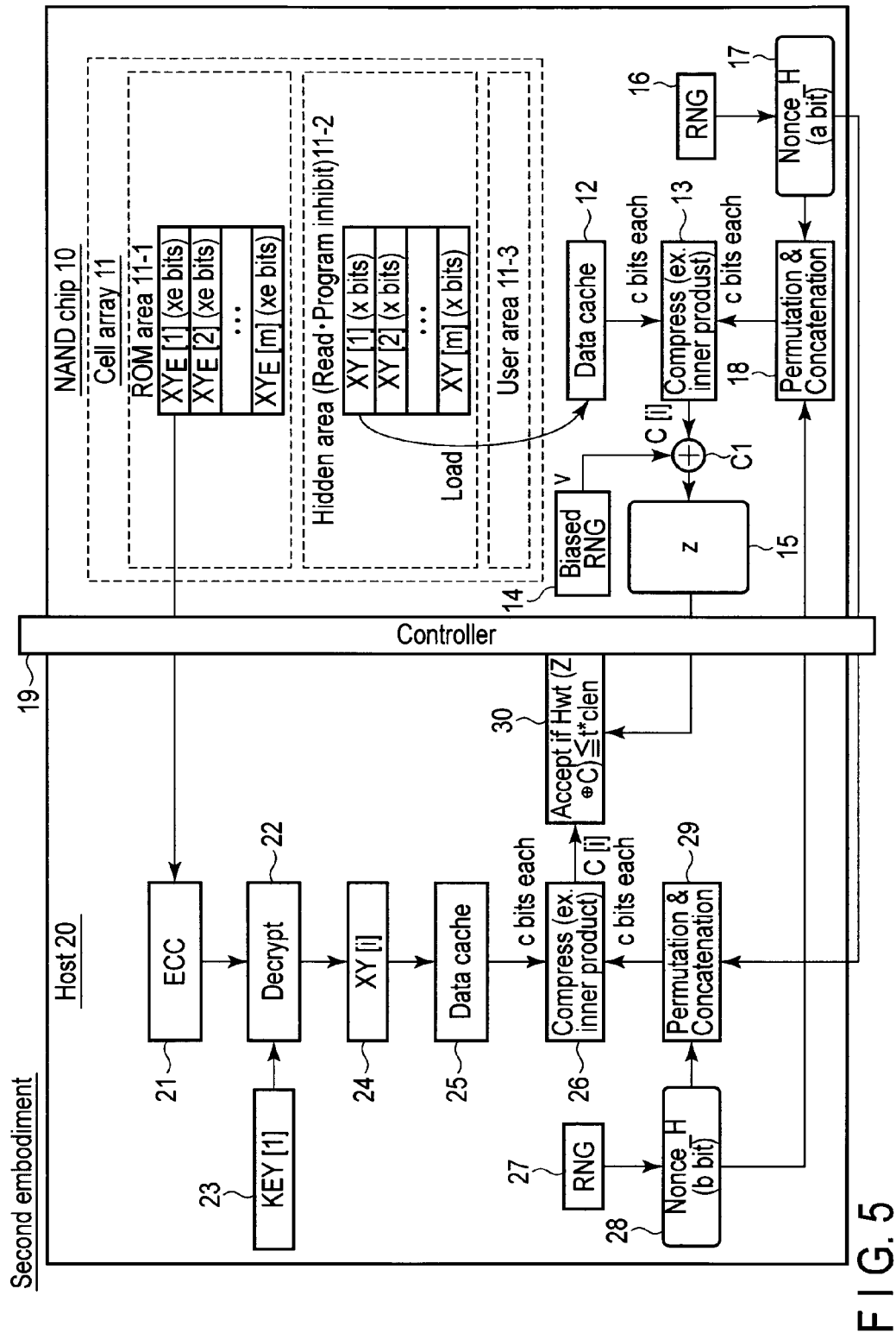
FIG. 5 is a block diagram showing a structure example according to a second embodiment.

Next, referring to FIG. 5 and FIG. 6, a description is given of an authenticator/authenticatee and an authentication method according to a second embodiment. In the description below, a description of parts overlapping the first embodiment is omitted.

<Structure Example (Memory System)>

Referring to FIG. 5, a structure example of the second embodiment is described.

As shown in FIG. 5, the structure example of the second embodiment differs from the first embodiment in that the NAND flash memory 10 stores a plurality of pieces of $XY_E$ and a plurality of pieces of XY in the ROM area 11-1 and hidden area 11-2, respectively. In this example, when i and j are different, XY[i]≠XY[j], and $XY_E$[i]≠$XY_E$[j].

In this manner, by storing sets of plural $XY_E$ and plural XY, it is possible to provide means for updating secret information when secret information pieces X and Y are exposed. If one set of XY and $XY_E$ is exposed by a man-in-the-middle attack or the like, and a falsified device is fabricated by misappropriating the exposed XY and $XY_E$, it is possible, in the present embodiment, to update the KEY[1]23 that is held by the host device 20 (e.g. KEY[1]⇒ updated KEY[2]). In this manner, by using a set other than the set of exposed XY and $XY_E$, it becomes possible to eliminate falsified devices. As regards the KEY that is used for encryption of each XY[i], when i is different, it is preferable to use different KEY.

In the other respects, the second embodiment is substantially the same as the first embodiment, so a detailed description is omitted.

<Authentication Flow>

Next, referring to FIG. 6, the authentication operation according to the second embodiment is described.

In the second embodiment, since the plural XY and plural $XY_E$ are recorded in the NAND flash memory 10, the host device 20 selects the XY that is to be used, thereby executing authentication.

Thus, in the second embodiment, in step S14, when the host 20 requests authentication (Request authentication), the host device 20 sends a parameter i, which designates the XY that is to be used, together with the random number Nonce_H, to the NAND flash memory 10. In this respect, the second embodiment differs from the first embodiment.

In the other respects, the second embodiment is substantially the same as the first embodiment, so a detailed description is omitted.

<Advantageous Effects>

According to the authenticator/authenticatee and the authentication method relating to the second embodiment, the above points (I) to (IV) can be improved, and at least the above-described advantageous effect (1) can be obtained.

Furthermore, the second embodiment differs from the first embodiment in that the NAND flash memory 10 stores a plurality of pieces of $XY_E$ and a plurality of pieces of XY in the ROM area 11-1 and hidden area 11-2, respectively.

In this manner, by storing sets of plural $XY_E$ and plural XY, it is possible to provide means for updating secret information when secret information pieces X and Y are exposed. If one set of XY and $XY_E$ is exposed by a man-in-the-middle attack or the like, and a falsified device is fabricated by misappropriating the exposed XY and $XY_E$, it is possible, in the present embodiment, to update the KEY[1]23 that is held by the host 20 (e.g. KEY[1]⇒ updated KEY[2]).

Thus, in the authentication flow of the second embodiment, in step S14, when the host device 20 requests authentication (Request authentication), the host device 20 sends a parameter i, which designates the XY that is to be used, together with the random number Nonce_H, to the NAND flash memory 10.

In the second embodiment, as described above, the NAND flash memory 10 has plural XY and plural $XY_E$, has the function of selectively sending $XY_E$ by an instruction from the host device, and selectively sets the XY that is used for authentication by an instruction from the host device. In addition, the host device has the function of selectively reading out the $XY_E$ which corresponds to the key that is held by the host device itself, has the function of decrypting the $XY_E$, and has the function of updating the key that is held by itself under a predetermined condition.

As a result, by using a set other than the set of exposed XY and $XY_E$, it becomes possible to advantageously eliminate falsified devices.

[Third Embodiment]

Figure 7:
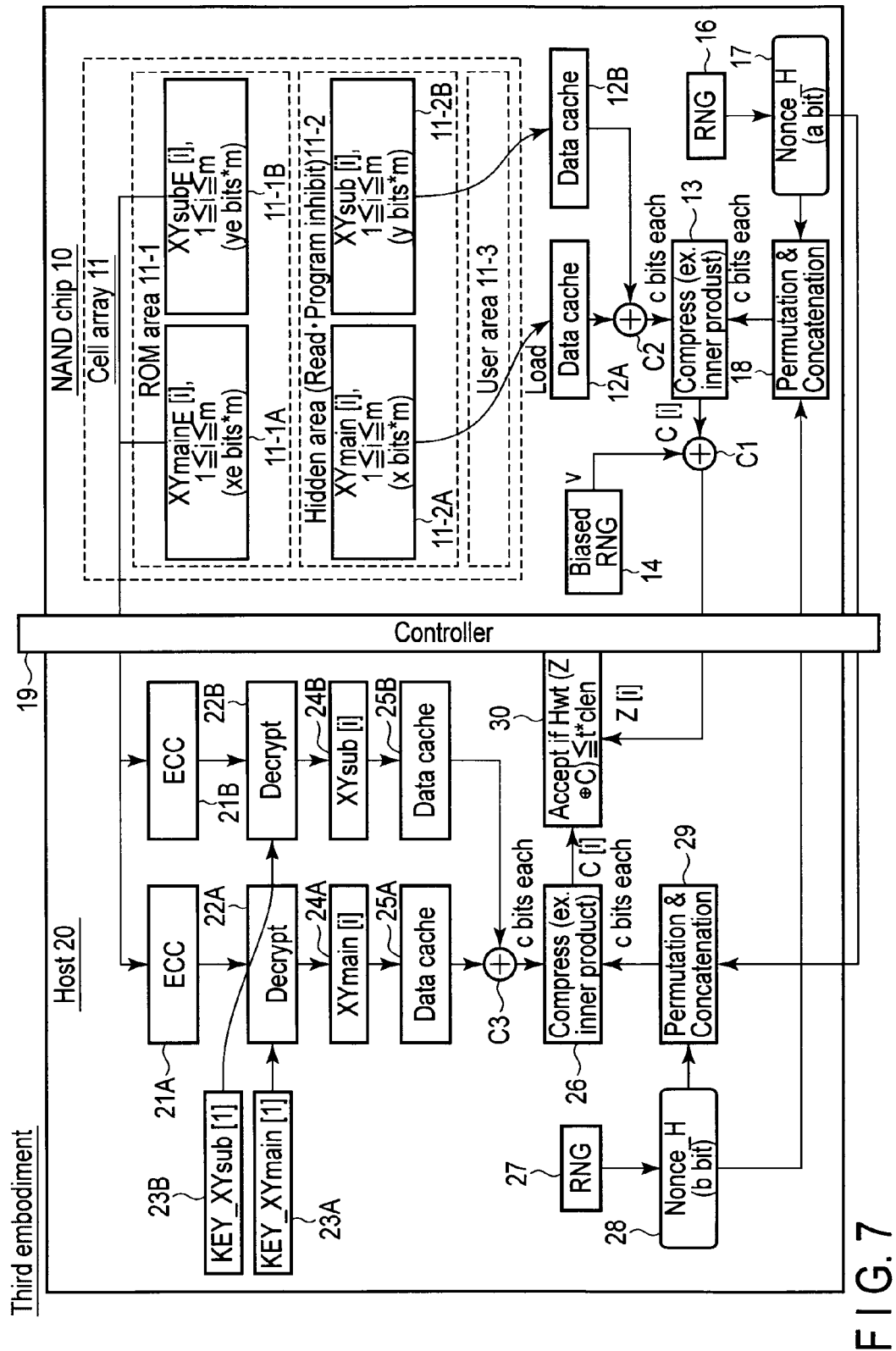
FIG. 7 is a block diagram showing a structure example according to a third embodiment.
Figure 8:
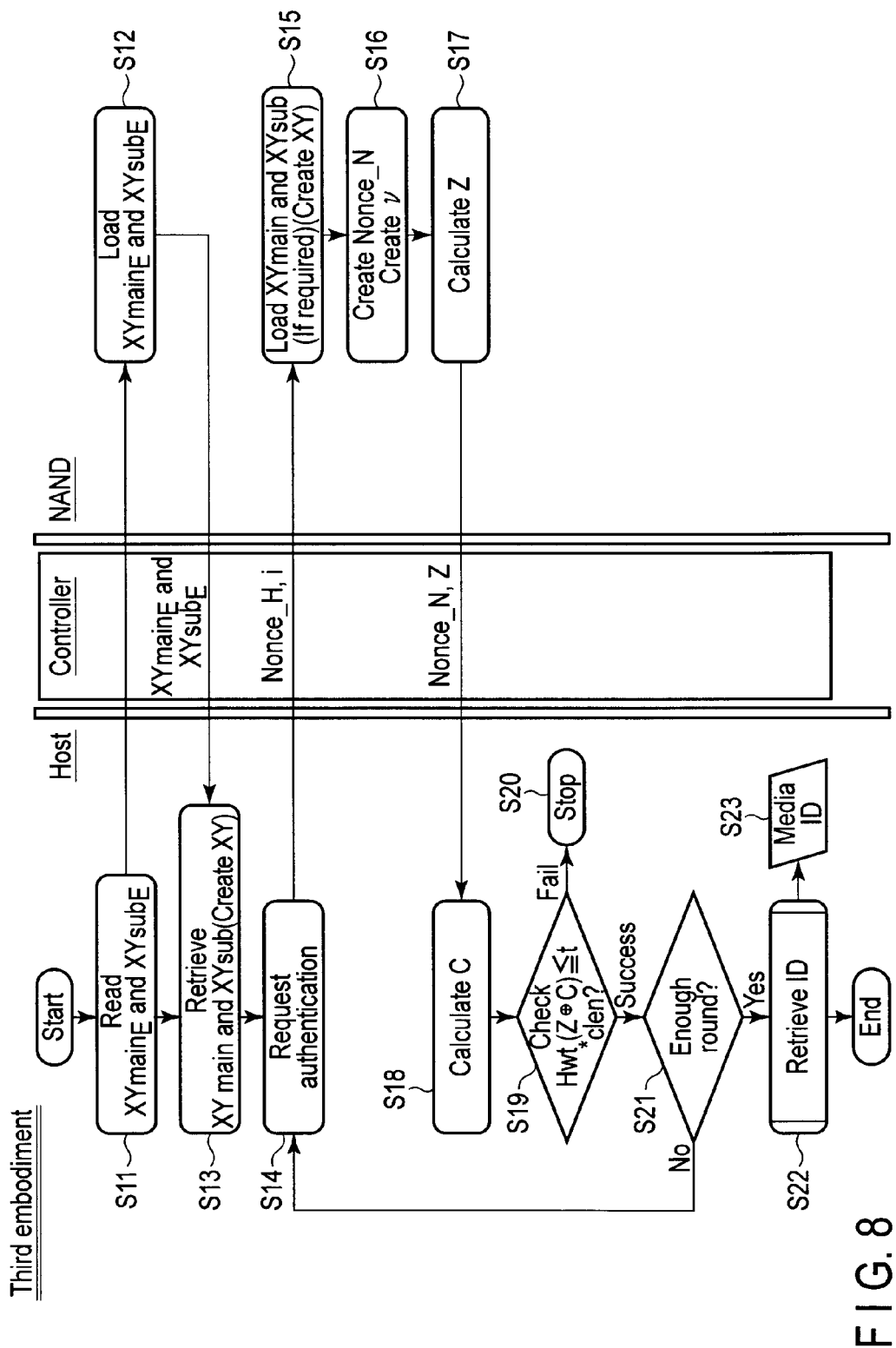
FIG. 8 is a flow chart illustrating an authentication flow according to the third embodiment.

Next, referring to FIG. 7 to FIG. 9, a description is given of an authenticator/authenticatee and an authentication method according to a third embodiment.

<Structure Example (Memory System)>

Referring to FIG. 7, a structure example of the third embodiment is described.

As shown in FIG. 7, the third embodiment differs from the second embodiment in that the NAND flash memory 10 stores a plurality of pieces of $XYsub_E$ and a plurality of pieces of XYsub in a ROM area 11-1B and hidden area 11-2B, respectively. In this example, when i and j are different, $XYsub[i] \ne XYsub[j]$, and $XYsub_E[i] \ne XYsub_E[j]$. $XYsub_E$ is data which is obtained by encrypting XYsub and then adding a correction code thereto.

The XYsub, like XY, is recorded in the record prohibition/read prohibition area (hidden area) 11-2B, and $XYsub_E$, like $XY_E$, is stored in the record prohibition/read permission area (ROM area) 11-1B.

The data size of XYmain is greater than that of XYsub (data size: XYmain>XYsub). In addition, the data composed of XYmain and XYsub corresponds to the above-described secret information XY.

In the third embodiment, as described above, since the set of XYsub[i] and $XYsub_E[i]$ is further included in addition to the set of XY, the third embodiment is advantageous in that the secret information X and Y can efficiently be recorded. The details will be described later.

Furthermore, the NAND flash memory 10 includes a data cache 12B for storing the XYsub, and a bit-by-bit addition module C2 for adding XYmain and XYsub on a bit-by-bit basis. The output value of the bit-by-bit addition module C2 corresponds to the above-described XY value that is used for authentication. In this example, since the bit length is different between XYmain and XYsub, repetitive data of XYsub is applied to the bit addition C2.

For example, as shown in the Figure, the bit addition is thinkable as the predetermined arithmetic operation. When the data size of XYmain is an integer number of times of the data size of XYsub, such a configuration is thinkable that the XYmain is successively sent from the Data cache which stores the data of XYmain, and XYsub is successively and repeatedly sent from the Data cache which stores the data of XYsub. The Data cache which stores XYsub may be thought to be a ring buffer. Aside from the bit-by-bit addition, the bound value of XYmain and XYsub may be used as XY, or the interleave bound value of XYmain and XYsub may be used as XY. Besides, XYmain and XYsub may be input to the LFSR and the value of a predetermined register of the LFSR may be used as XY. In short, in the present embodiment, although the bit-by-bit addition module is used, it is possible to apply any of arithmetic methods using the data, which is composed of two inputs, as XY.

Similarly, the host device 20 further includes a correction process module 21B, a decrypt module 22B, a key holding module 23B, a data storage module 25B, and an addition module C3, which are adaptive to the read-out $XYsub_E$. By the above structure, the host device 20 similarly executes an error correction process, and executes decryption by the corresponding KEY_XYsub, thereby obtaining XYsub. Thus, the secret information XYmain and XYsub can be shared between the host device and the NAND flash memory. Although the KEY_XYmain and KEY_XYsub are depicted as different objects in the Figure, these may actually be the same. As regards the KEY_XYsub that is used for encryption of each XYsub[i], when i is different, it is preferable to use different KEY_XYsub. Besides, the host device 20 and memory 10 execute the authentication process, based on the XY value which is obtained by executing a predetermined arithmetic operation by using XYmain and XYsub.

<Authentication Flow>

Next, referring to FIG. 8, the authentication operation according to the third embodiment is described.

In the third embodiment, XYsub, in addition to XYmain, is recorded in the NAND flash memory 10, and XYmain$_E$ and XYsub$_E$, which are obtained by encrypting them, are also recorded.

Thus, as shown in the Figure, in the corresponding step S13, the host 10 further reads out XYmain$_E$ and XYsub$_E$, decrypts them, and creates secret information XY based on the secret information XYmain and XYsub (Create XY). Subsequently, the host device 20 executes similar authentication by using the information which is derived from the secret information XYmain and XYsub.

Similarly, on the NAND flash memory 10 side, in step S15, secret information XY is created based on the read-out secret information XYmain and XYsub (Create XY). In this respect, the third embodiment differs from the second embodiment.

<Advantageous Effects>

According to the authenticator/authenticatee and the authentication method relating to the third embodiment, the above points (I) to (IV) can be improved, and at least the above-described advantageous effect (1) can be obtained. Further, in the third embodiment, the following advantageous effect (2) can be obtained.

(2) Secret information X, Y can efficiently be recorded, and the recording time can advantageously be shortened.

In the third embodiment, the NAND flash memory 10 has plural XYsub and plural XYsub$_E$, selectively sends XYsub$_E$ by an instruction from the host device 20, selectively sets XYsub that is used for authentication by an instruction from the host device 20, and executes authentication by the value which is derived by a predetermined arithmetic operation of the selected XYsub and XY.

In addition, the host device has the function of selectively reading out the XYsub$_E$ which corresponds to the key 23B that is held by the host device itself, has the function 22B of decrypting the XYsub$_E$, and has the function of updating the key 23B that is held by itself under a predetermined condition, and executes the authentication 30 by the value which is derived by a predetermined arithmetic operation of the selected XYsub and XYmain.

As described above, since the set of XYsub[i] and XYsub$_E$[i] is further included in addition to the set of XYmain, there is the advantage that the secret information X and Y can be efficiently recorded.

To be more specific, for example, this is illustrated in FIG. 9. As shown in FIG. 9, in the fabrication process of the NAND flash memory, a plurality of sets of XYmain, XYmain$_E$, XYsub and XYsub$_E$ are generated by an XY generator (XY GEN), and are written in a plurality of NAND flash memories (in this example, Chip 1 to Chip 4) by a writer (Writer).

In this example, the data of XYmain and XYmain$_E$ may be identical data in a group (e.g. lot) comprising plural chips Chip 1 to Chip 4. On the other hand, the XYsub and XYsub$_E$ need to be different data (XYsub1 to XYsub4, and XYsub$_E$1 to XYsub$_E$4) between the chips Chip 1 to Chip 4.

As described above, in the third embodiment, in the data write operation, the XYmain and XYmain$_E$, the data amount of which is large, are made common between the plural chips Chip 1 to Chip 4. Thereby, the process of data write in the memory can be optimized and the data can be efficiently recorded.

If the XYmain and XYmain$_E$ are structured by hardwired configuration, the actually recorded data are the XYsub and XYsub$_E$, the data amount of which is small, and the recording time can be shortened. If the XYmain and XYmain$_E$ are recorded on the cells, since these are identical in the group, it is possible to shorten the time for transferring record data to a data recording device in the NAND flash memory. As has been described above, since the increase in recording time becomes the increase in cost, the third embodiment has a great merit that the manufacturing cost can be reduced.

[Fourth Embodiment (An Example of Multiple Recording)]

Figure 10:
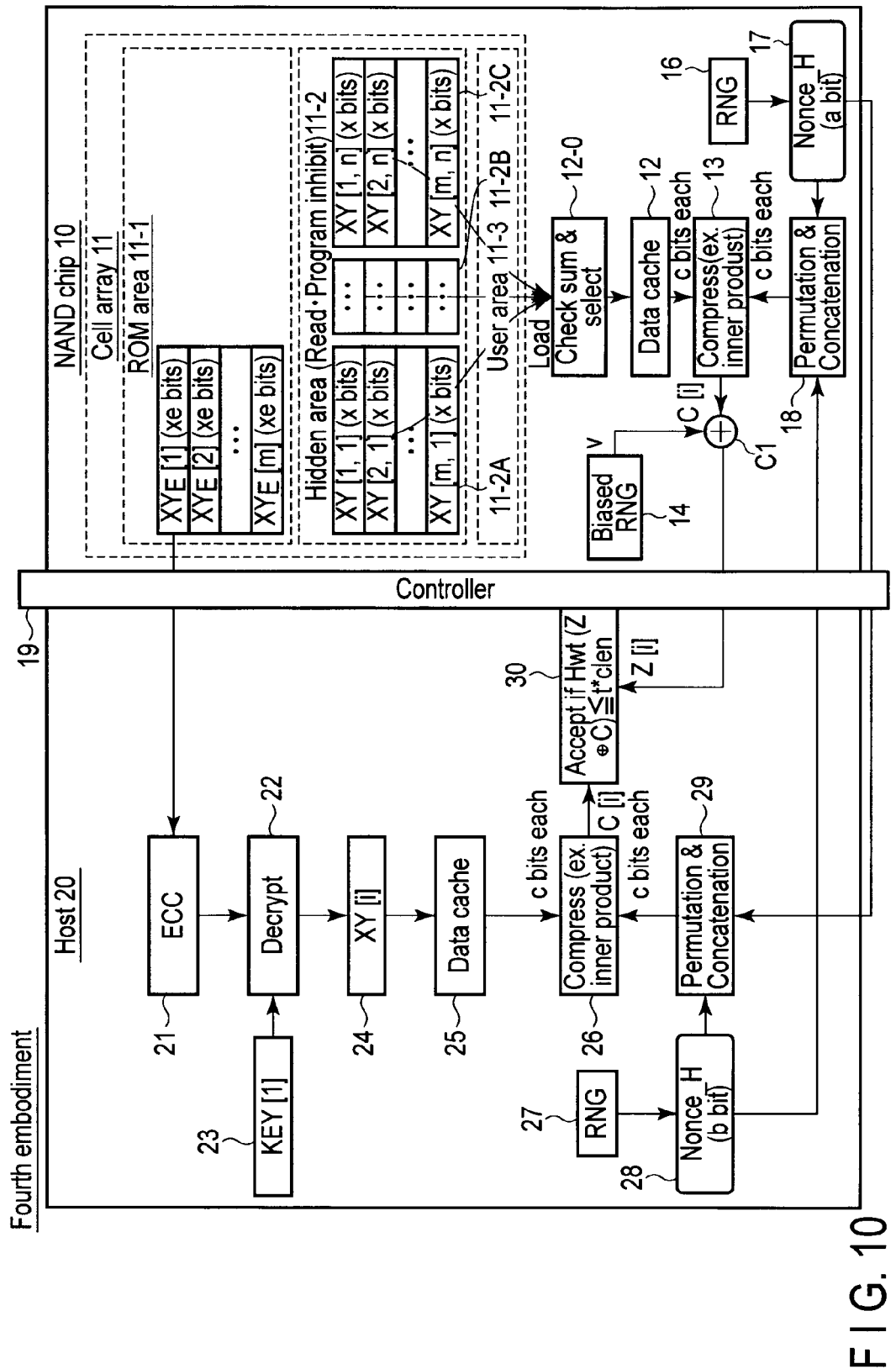
FIG. 10 is a block diagram showing a structure example according to a fourth embodiment.
Figure 11:
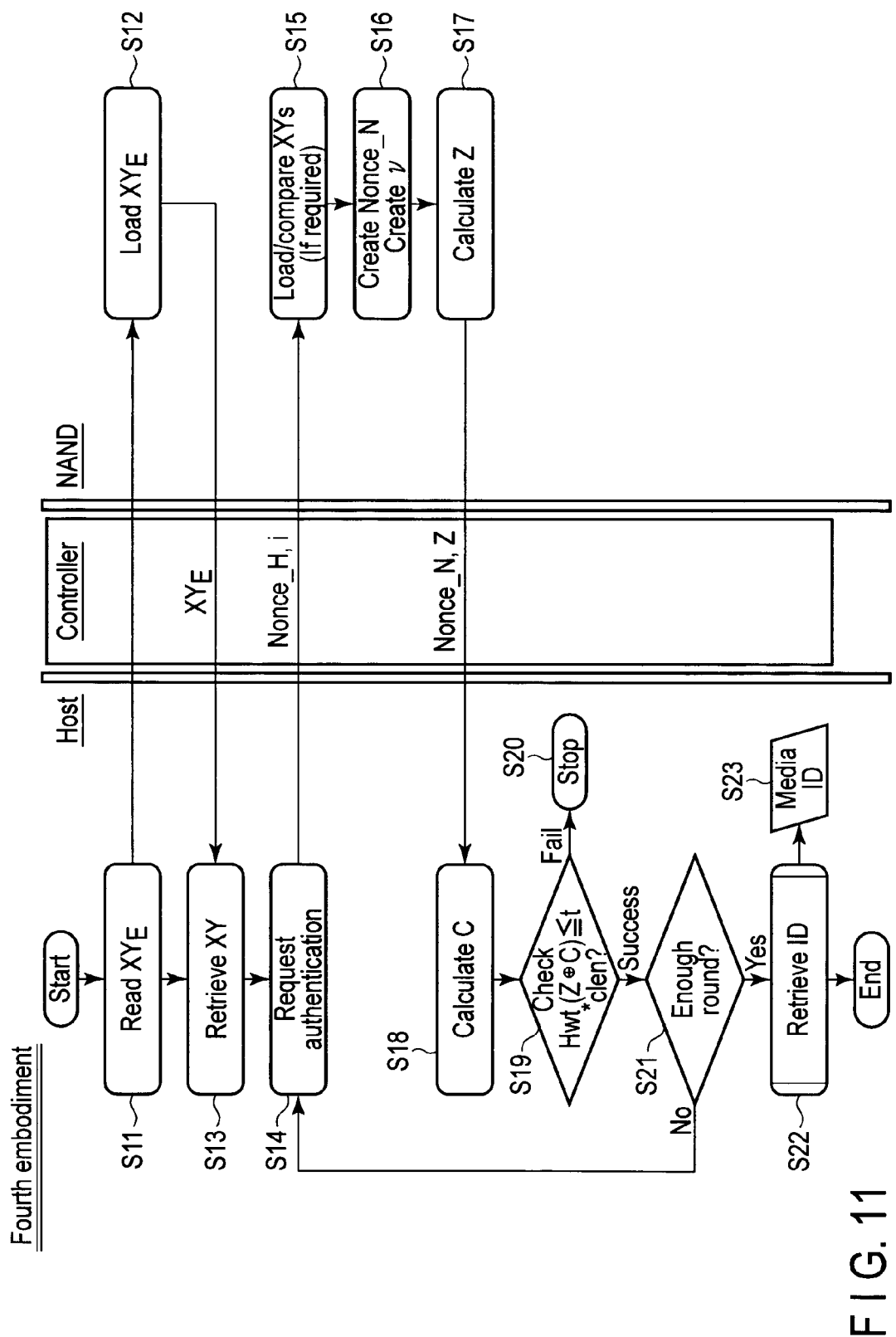
FIG. 11 is a flow chart illustrating an authentication flow according to the fourth embodiment.

Next, referring to FIG. 10 and FIG. 11, a description is given of an authenticator/authenticatee and an authentication method according to a fourth embodiment.

<Structure Example (Memory System)>

Referring to FIG. 10, a structure example of the fourth embodiment is described.

The fourth embodiment differs from the second embodiment in that information pieces 11-2A, 11-2B and 11-2C, which are created by multiply duplicating a plurality of XY[i], are further included in the hidden area 11-2 of the memory 10.

Specifically, the data, which are obtained by duplicating XY[i] in the second embodiment, are indicated by XY[i, 1], XY[i, 2], ..., XY[i, n] in FIG. 10, and XY[i, 1]=XY[i, 2]=, ..., =XY[i, n], where $1 \leq i \leq m$. In addition, XY[1, j]$\neq$XY[2, j]$\neq$, ..., $\neq$XY[m, j], where $1 \leq j \leq n$.

In this example, while ECC is added to XY$_E$, ECC is not added to XY. Thus, when an error is included in the data that has been read out of the cell in the NAND flash memory, it can be thought that the completeness of the XY, which is used for authentication by the NAND flash memory, is lost. However, as in the present embodiment, since the information pieces 11-2A, 11-2B and 11-2C, which are created by duplicating the plural XY[i], are further included, a check sum & select module 12-0 can detect whether the error is included or not, by data comparison between the duplicate data.

Thus, the memory of the present embodiment differs from that of the second embodiment in that this embodiment further includes the check sum & select module (Check sum & select) 12-0 for adapting to the information pieces 11-2A, 11-2B and 11-2C which are created by duplicating the XY[i].

In FIG. 10, a data set of at least two XYs, which are loaded from the cell 11-2, is compared by the same predetermined method as described above, and it is checked whether an error is included or not. If an error is included or if an error cannot be eliminated, a different data set of at least two XYs is loaded once again, and a similar check is executed. This is repeated until no error is included or until a data set, from which an error can be eliminated, is found. When such a data set is found, this is used for authentication. As an example of the predetermined method, such a method is thinkable that two XYs are loaded, and an XOR value is calculated on a bit-by-bit basis, and then a check is executed as to whether all XOR values are 0. Alternatively, such a method is thinkable that three or more XYs are loaded, and XY, from which an error has been eliminated on a bit-by-bit basis by a majority check, is obtained. In addition, although all duplicate data of XY are identical data in this Figure, it is thinkable to adopt such a method that data, which have such a complementary relationship that the polarity of odd-numbered data and the polarity of even-numbered data in the duplicate data are reversed, are formed and recorded in advance. In this case, two XYs having the complementary relationship are loaded, and the XOR value is calculated on a bit-by-bit basis, and then a check is executed as to whether all XOR values are 1.

<Authentication Flow>

Next, referring to FIG. 11, the authentication operation according to the fourth embodiment is described.

As shown in FIG. 11, in the fourth embodiment, a plurality of XYs are multiply recorded in the hidden area 11-2 of the NAND flash memory 10.

Thus, in step S15, the NAND flash memory 10 reads out at least two XYs, compares them, and executes authentication by using the XY which includes no error (Load/compare XYs).

<Advantageous Effects>

According to the authenticator/authenticatee and the authentication method relating to the fourth embodiment, the above points (I) to (IV) can be improved, and at least the above-described advantageous effect (1) can be obtained.

Furthermore, according to the fourth embodiment, information pieces 11-2A, 11-2B and 11-2C, which are created by multiply duplicating a plurality of XY[i], are further included in the hidden area 11-2 of the memory 10.

In this case, while ECC is added to $XY_E$, ECC is not added to XY. Thus, when an error is included in the data that has been read out of the cell in the NAND flash memory, it can be thought that the completeness of the XY, which is used for authentication by the NAND flash memory, is lost.

However, according to the fourth embodiment, since the information pieces 11-2A, 11-2B and 11-2C, which are created by duplicating the plurality of XY[i], are further included, the check sum & select module 12-0 can detect whether the error is included or not, by the data comparison between the duplicate data. As a result, even in the case where an error is included in the data that has been read out of the cell in the memory 10, it is possible to advantageously prevent the completeness of the XY, which is used for authentication by the memory 10, from being lost.

[Fifth Embodiment]

Next, referring to FIG. 12 and FIG. 13, a description is given of an authenticator/authenticatee and an authentication method according to a fifth embodiment.

<Structure Example (Memory System)>

Referring to FIG. 12, a structure example of the fifth embodiment is described. The structure example of the fifth embodiment is an example relating to a combination of the third and fourth embodiments.

As shown in FIG. 12, the NAND flash memory 10 of the fifth embodiment differs from that of the fourth embodiment in that duplicate data XYsub[i, j] and $XYsub_E$[i, j] of XYsub and $XYsub_E$ are also recorded in the hidden area 11-2.

In addition, this embodiment further includes a check sum & select module 12-0B and a data cache 12B for adapting to the above.

<Authentication Flow>

Next, referring to FIG. 13, the authentication operation according to the fifth embodiment is described.

In the fifth embodiment, XYsubs are also multiply recorded in the NAND flash memory 10 (XYsub[i, j] and $XYsub_E$[i, j]).

Thus, in step S15, the NAND flash memory 10 further reads out at least two XYsubs, compares them, and executes authentication by using XYsub including no error (Load/compare XYs and XYsubs).

<Advantageous Effects>

According to the authenticator/authenticatee and the authentication method relating to the fifth embodiment, the above points (I) to (IV) can be improved, and at least the above-described advantageous effect (1) can be obtained.

Furthermore, according to the fifth embodiment, the NAND flash memory 10 also records the duplicate data XYsub[i, j] and $XYsub_E$[i, j] of XYsub and $XYsub_E$ in the hidden area 11-2.

Where necessary, the structure and method of the present embodiment are applicable.

[Sixth Embodiment]

Figure 14:
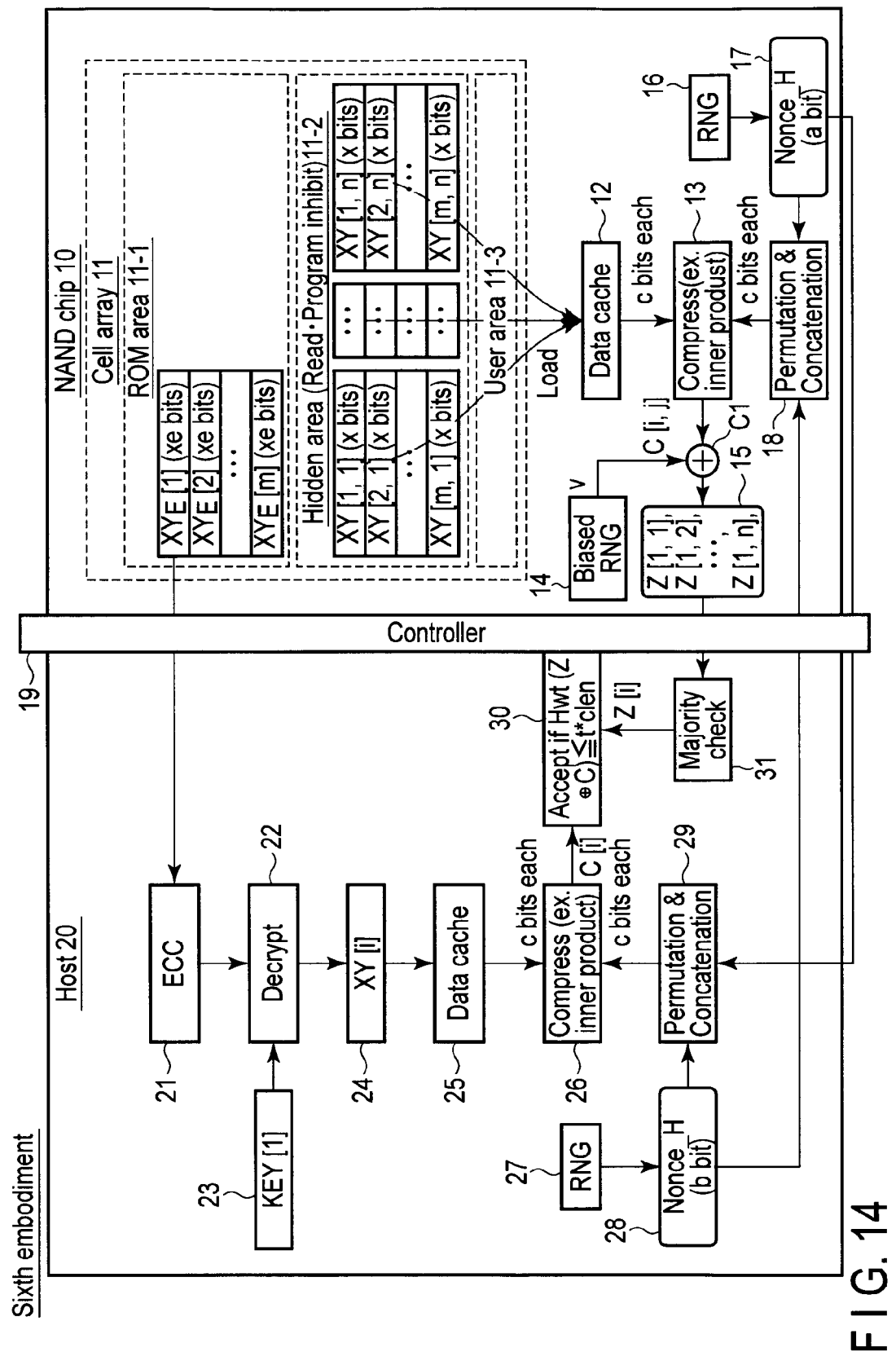
FIG. 14 is a block diagram showing a structure example according to a sixth embodiment.
Figure 15:
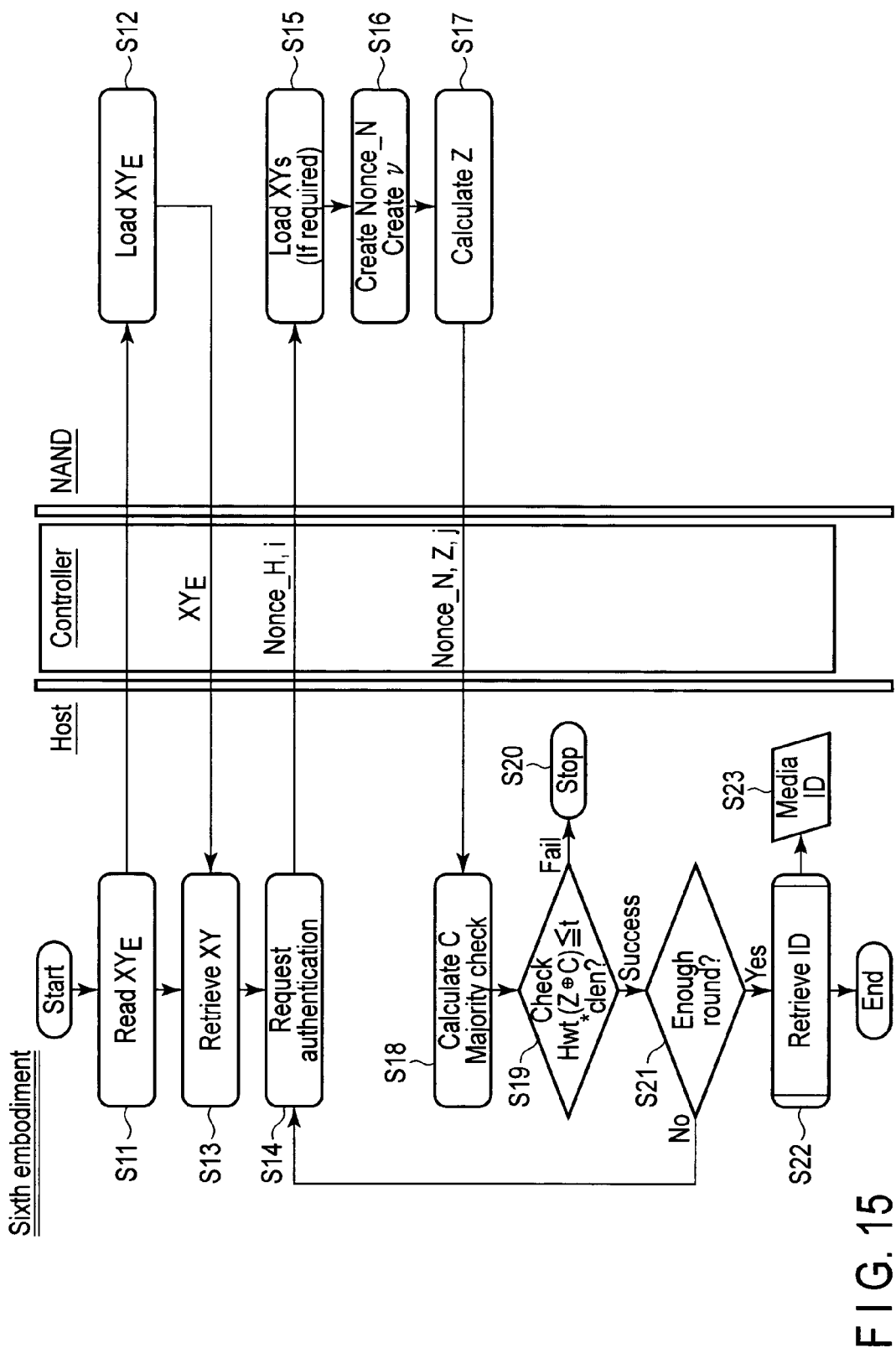
FIG. 15 is a flow chart illustrating an authentication flow according to the sixth embodiment.

Next, referring to FIG. 14 and FIG. 15, a description is given of an authenticator/authenticatee and an authentication method according to a sixth embodiment.

<Structure Example (Memory System)>

Referring to FIG. 14, a structure example of the sixth embodiment is described.

Also in the sixth embodiment, the NAND flash memory 10 includes information which is created by duplicating a plurality of pieces of XY[i]. Specifically, the data, which are created by duplicating XY[i] in the second embodiment, are indicated by XY[i, 1], XY[i, 2], . . . , XY[i, n] in FIG. 14, and XY[i, 1]=XY[i, 2]=, . . . , =XY[i, n], where $1 \leq i \leq m$. In addition, XY[1, j]≠XY[2, j]≠, . . . , ≠XY[m, j], where $1 \leq j \leq n$.

In this example, the duplication of XY data is the same as in the fourth embodiment. However, in the sixth embodiment, the comparison process of duplicate data is not executed on the NAND flash memory 10 side. Instead, the comparison process is executed in the host 20. In this respect, the sixth embodiment differs from the fourth embodiment. In addition, the sixth embodiment differs from the fourth embodiment in that the host 20 includes a majority check module (Majority check) 31.

Specifically, in accordance with i which is designated by the host device 20, the NAND flash memory 10 loads at least two of XY[i, 1], XY[i, 2], . . . , XY[i, n], and executes the above-described authentication process with respect to each XY. In this case, the identical Nonce_N and identical Nonce_H are used for each XY, and also the identical v that is created by the biased RNG is applied.

The transmission module 15 of the NAND flash memory 10 calculates a plurality of Z (Z[i, 1], Z[i, 2], . . . , Z[i, n]) with respect to plural XYs under the same conditions of the other parameters, and sends them to the host device 20.

After receiving the plurality of Z (Z[i, 1], Z[i, 2], . . . , Z[i, n]), the host device executes a majority check by the majority check module 31 and obtains a single Z. In this case, when each Z is composed of a plurality of bit elements, and when the output of the compression calculation module is composed of plural bits, the majority check is executed on a bit-by-bit basis.

After obtaining Z from which an error has been eliminated by the majority check, the host device executes the same determination process 30 as described above, thereby authenticating the NAND flash memory 10.

<Authentication Flow>

Next, referring to FIG. 15, the authentication operation according to the sixth embodiment is described.

In the sixth embodiment, the NAND flash memory 10 calculates a plurality of Z's by using the XYs which are multiply recorded in the NAND flash memory 10, and sends the Z's. The host device executes the majority check on the plural Z's, thereby obtaining a single Z and executing authentication.

Thus, in step S17, the NAND flash memory 10 transmits the calculated plural Z's and j's to the host 20.

Subsequently, in step S18, the host 20 executes a majority check (Majority check) of the plural Z's, which is the difference from the fourth embodiment.

<Advantageous Effects>

According to the authenticator/authenticatee and the authentication method relating to the sixth embodiment, the above points (I) to (IV) can be improved, and at least the above-described advantageous effect (1) can be obtained.

Furthermore, in the sixth embodiment, the NAND flash memory 10 further includes the information which is created by duplicating a plurality of XY[i]. In addition, the host 20 includes the majority check module (Majority check) 31.

Therefore, the load of the comparison process in the NAND flash memory 10, in which the calculation resources are restricted, can be reduced, and the host 20 with sufficient calculation resources can be relied upon to execute the comparison process (majority process) 31. As a result, advantageously, the increase in cost of the NAND flash memory 10 can be suppressed, and an error can be eliminated.

[Seventh Embodiment]

Figure 17:
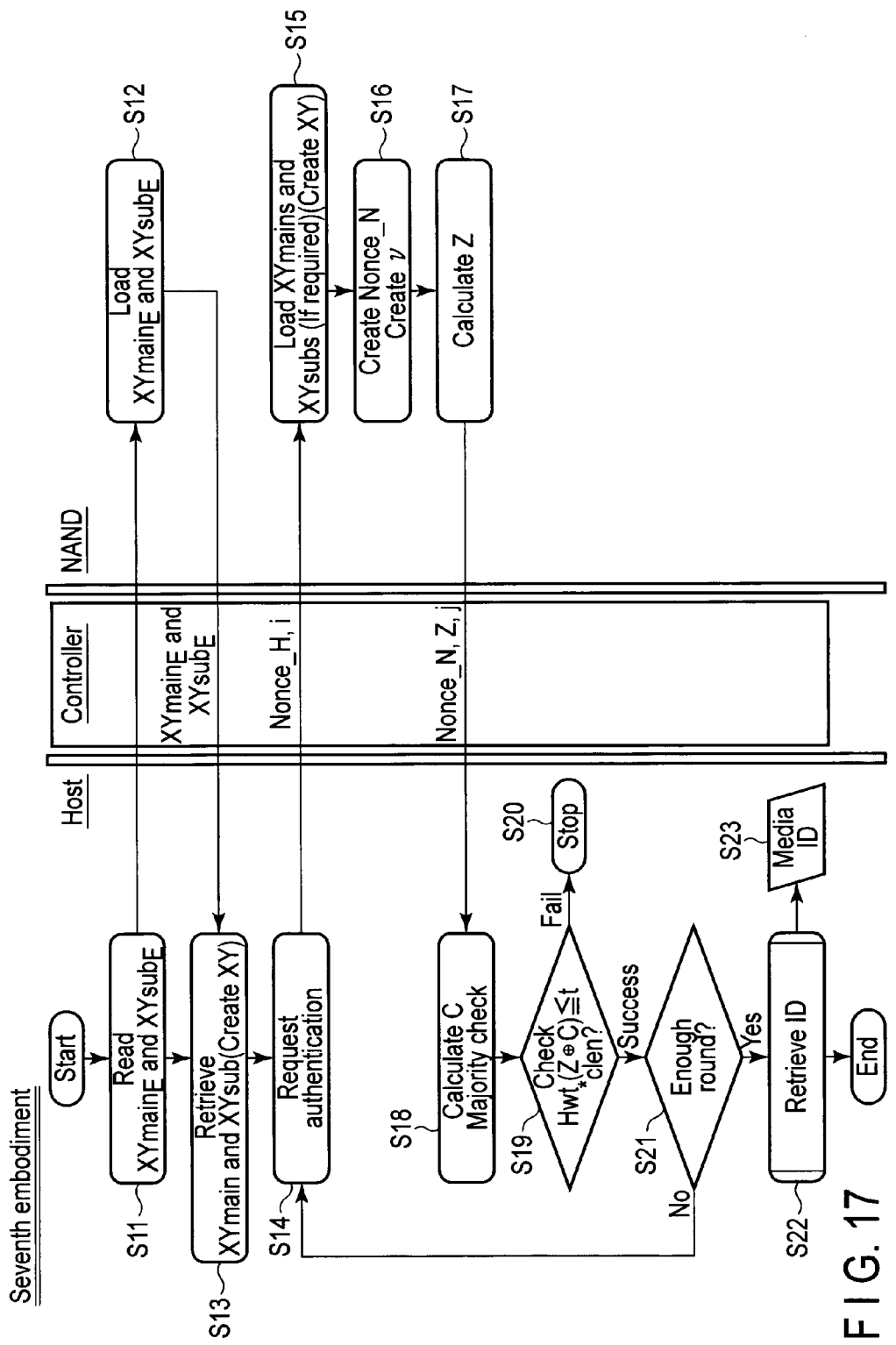
FIG. 17 is a flow chart illustrating an authentication flow according to the seventh embodiment.

Next, referring to FIG. 16 to FIG. 17, a description is given of an authenticator/authenticatee and an authentication method according to a seventh embodiment.

<Structure Example (Memory System)>

Referring to FIG. 16, a structure example of the seventh embodiment is described. The seventh embodiment relates to an example of a combination of the third and sixth embodiments.

As shown in FIG. 16, the NAND flash memory 10 also stores duplicate data 11-2B and 11-1B of XYsub and $XYsub_E$. Like the above-described sixth embodiment, authentication data Z for plural XYs are calculated and sent to the host 20 by the calculation module 15, and a majority check 31 is executed in the host device 20.

<Authentication Flow>

Next, referring to FIG. 17, the authentication operation according to the seventh embodiment is described.

In the seventh embodiment, the NAND flash memory 10 calculates a plurality of Z's by using the XYmain and XYsub, which are multiply recorded in the NAND flash memory 10, and sends the Z's. The host device executes the majority check on the plural Z's, thereby obtaining a single Z and executing authentication.

Thus, in step S11, the host device 20 issues a read-out request (Read $XYmain_E$ and $XYsub_E$) of the multiply recorded XYmain and XYsub.

Subsequently, in step S12, the NAND flash memory 10 reads out the multiply recorded XYmain and XYsub (Load $XYmain_E$ and $XYsub_E$), and sends the XYmain and XYsub to the host 20 ($XYmain_E$ and $XYsub_E$).

<Advantageous Effects>

According to the authenticator/authenticatee and the authentication method relating to the seventh embodiment, the above points (I) to (IV) can be improved, and at least the advantageous effect (1) can be obtained.

Furthermore, according to the seventh embodiment, the NAND flash memory 10 also records the duplicate data 11-2B and 11-1B of XYsub and $XYsub_E$. Like the above-described sixth embodiment, the authentication data Z for plural XYs are calculated and sent to the host 20 by the calculation module 15, and the majority check 31 is executed in the host 20.

In this manner, where necessary, the present embodiment is applicable.

[Eighth Embodiment]

Next, referring to FIG. 18 to FIG. 22, a description is given of an authenticator/authenticatee and an authentication method according to an eighth embodiment.

<Structure Example (Memory System)>

Figure 18:
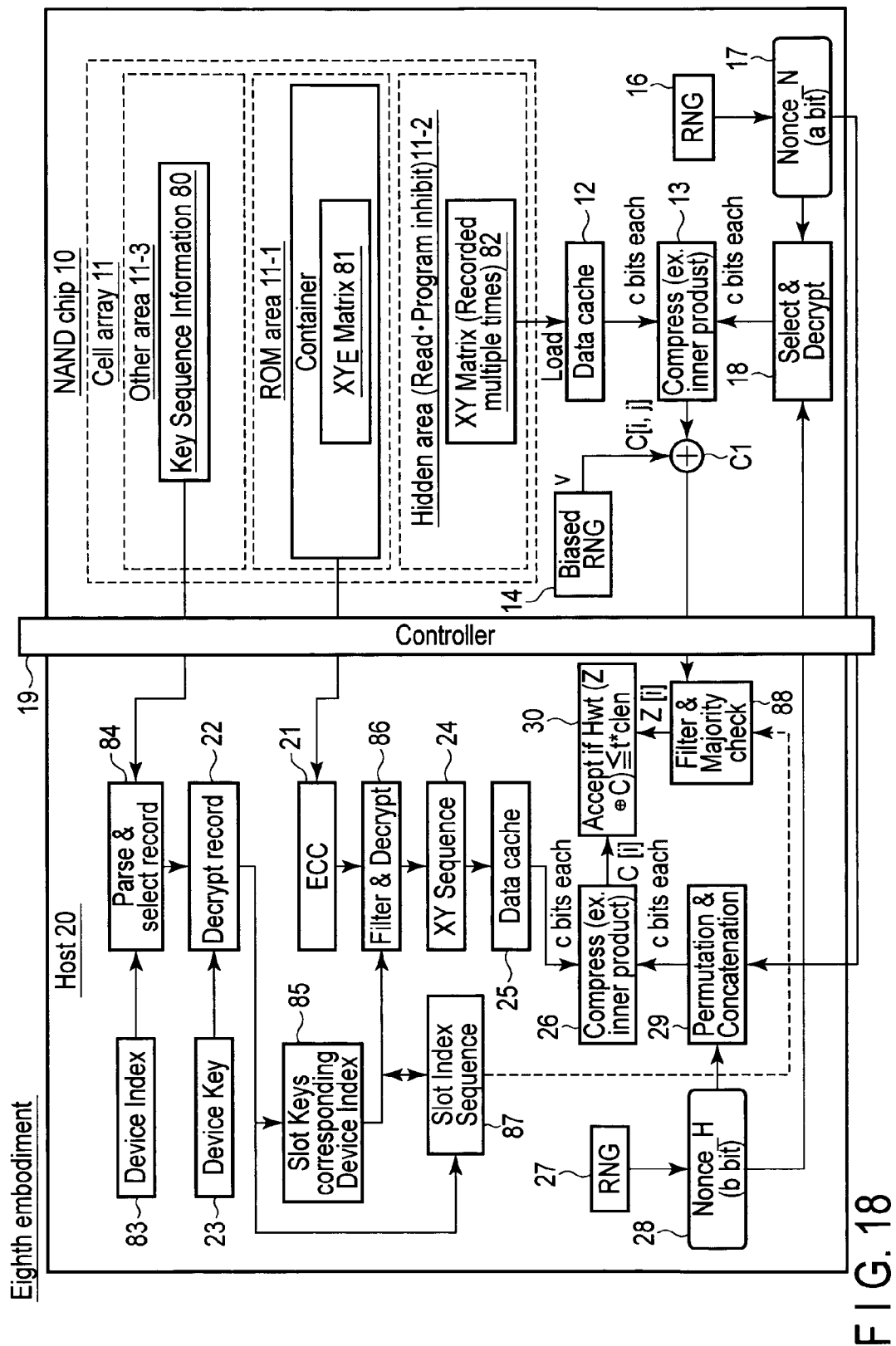
FIG. 18 is a block diagram showing a structure example according to an eighth embodiment.

Referring to FIG. 18, a structure example of the eighth embodiment is described. The eighth embodiment provides a method of making different a combination of XY values which are used in individual host devices 20 in the sixth embodiment.

As shown in FIG. 18, the eighth embodiment differs from the sixth embodiment in that the NAND flash memory 10 stores key information (Key sequence Information) 80, which has a data structure composed of key transition records, in a user area (Other area) 11-3. The key information (Key sequence information) 80 is not necessarily stored in the user area 11-3. The key information (Key sequence information) 80 may be stored in the ROM area 11-1, or an area in which at least one of data write and data erase is prohibited.

A Container, which is recorded in the ROM area 11-1, is configured to store a plurality of $XY_E$, as in the sixth embodiment. However, unlike the sixth embodiment, the plurality of $XY_E$ has a data structure of a matrix form, and the method of use in the host device 20 is different. Thus, in the description below, the plurality of $XY_E$ is referred to as "$XY_E$Matrix 81". Although it is assumed that the data structure is the matrix data structure, the actual data arrangement in the cell array 11 does not need to have the matrix structure. The same applies to XY Matrix 82 which is described below.

In addition, XY data, which are recorded in the hidden area 11-2, are configured to store a plurality of XYs, as in the sixth embodiment. However, unlike the sixth embodiment, the plurality of XYs has a data structure of a matrix form, and the method of use in the host device 20 is different. Thus, in the description below, the plurality of XYs is referred to as "XY Matrix 82". The XY Matrix 82 is multiply recorded (Recorded multiple times), where necessary. The purpose of multiple recording is to ensure the reliability of data, as described above, and the same applies to the method of use. The multiply recorded XY Matrix 82 may be arranged in different pages, or in different blocks.

The present embodiment differs from the foregoing embodiments in that the host device 20 includes a parse & select module 84, a filter & decrypt module 86 and a filter & majority check module 88 in order to treat the key information (Key Sequence Information) 80, and the host device 20 obtains slot keys (Slot Keys corresponding Device Index) 85 and a slot index sequence (Slot Index Sequence) 87 by using a device index 83 and a device key (Device Key) 23.

The device index (Device Index) 83 is an index for selecting a data record corresponding to the host device 20, from the key information (Key Sequence Information) 80 which is read out of the NAND flash memory 10. In the host device 20, the location of storage of the device index (Device Index) 83 is an arbitrary one, but it is required that the device index (Device Index) 83 be stored at a location which is not easily exposed.

The parse & select module 84 selects a data record corresponding to the own device index (Device Index) 83, from the key information (Key Sequence Information) 80 that is read out of the NAND flash memory 10. The selected data record is output to the decrypt module 22 and is decrypted with use of the device key (Device Key) 23. In the host device 20, the location of storage of the device key (Device Key) 23 is an arbitrary one, but it is required that the device key (Device Key) 23 be stored at a location which is not easily exposed.

The slot keys (Slot Keys corresponding Device Index) 85 are included in the data which is obtained by decrypting the data record corresponding to the device index (Device Index) 83 by the device key (Device Key) 23. The slot keys (Slot Keys corresponding Device Index) 85 are slot key data corresponding to the device index 83.

The slot index sequence (Slot Index Sequence) 87 is included in the data which is obtained by decrypting the data record corresponding to the device index (Device Index) 83 by the device key (Device Key) 23, like the slot keys (Slot Keys corresponding Device Index) 85. The slot index sequence (Slot Index Sequence) 87 is the index data corresponding to the respective slot keys (Slot Keys corresponding Device Index) 85.

The filter & decrypt module 86 selects an element corresponding to the slot index sequence (Slot Index Sequence) 87, from the $XY_E$Matrix 81 which has been read out of the NAND flash memory 10 and has been subjected to an ECC process, and decrypts the element by using the slot keys (Slot Keys corresponding Device Index) 85. Thereby, the host device 20 acquires secret information XY Sequence 24.

The filter & majority check module 88 selects, from calculation results received from the NAND flash memory 10, a calculation result z[i] corresponding to the slot index sequence (Slot Index Sequence) 87 in the data record.

The determination module 30 executes a determination process by using the generated data C and the calculation result z[i] selected by the filter & majority check module 88.

<Re: Data Structure>

Figure 19:
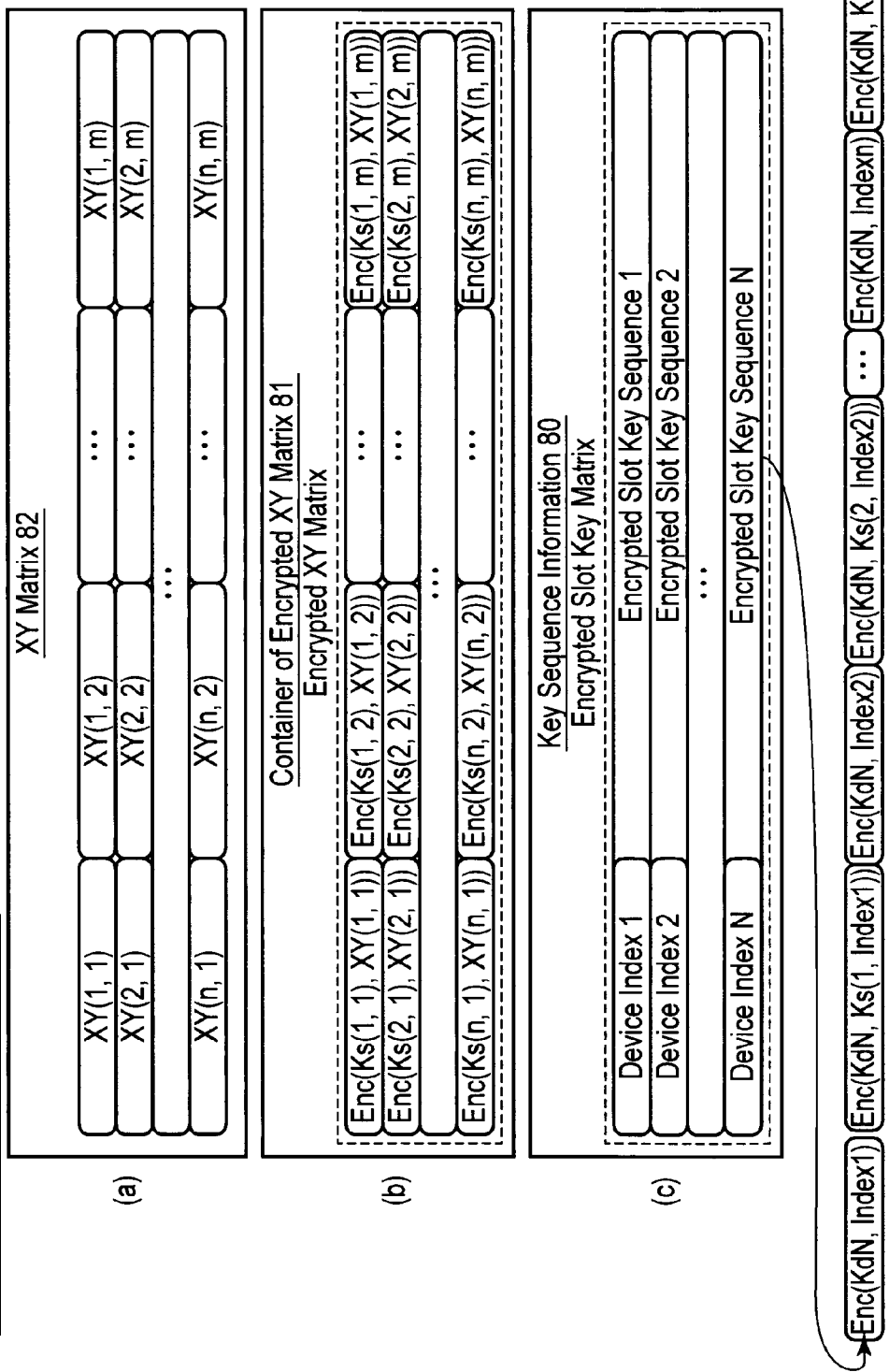
FIG. 19 shows a structure example of matrix data according to the eighth embodiment.

Referring to FIG. 19, a description is given of the data structures of the key information (Key Sequence Information) 80, $XY_E$Matrix 81 and XY Matrix 82.

To begin with, the XY Matrix 82 shown in part (a) of FIG. 19, which is recorded in the hidden area 11-2, is described. The XY Matrix 82 is composed of a plurality of XY data (XY(1,1)-XY(n,m)) which are numbered for predetermined data units. In the example illustrated, the XY Matrix 82 has an arrangement structure of 16×16, and each element constitutes single XY data. If single XY data is composed of 64 bytes, the XY Matrix 82 is composed of 64×16×16 bytes.

Next, the $XY_E$Matrix 81, which is held in the Container, is described. The Container is composed of a plurality of encrypted XY data (Enc(Ks(1,1), XY(1,1))–Enc(Ks(n,m), XY(n,m))), which are obtained by encrypting the respective elements of the XY Matrix. Like the XY Matrix 82, the $XY_E$Matrix 81 has an arrangement structure of 16×16, and each element constitutes single $XY_E$ data. In addition, the respective elements are encrypted by different keys. The key, which is used for encryption, is referred to as "slot key (Slot Key (Ks))", and a slot key (Slot Key (Ks)), to which the same number (Index) is allocated, is used for encryption of the XY data to which the same number (Index) is allocated. Specifically, each element $XY_E(i,j)$ in the $XY_E$Matrix 81 has a relationship of $XY_E(i,j)=Enc(Ks(i,j), XY(i,j))$.

Next, the key information (Key Sequence Information) 80, shown in part (c) of FIG. 19, is described. The key information (Key Sequence Information) 80 is composed of a plurality of data records corresponding to the device key (Device Key(Kd)) 23 and device index (Device Index) 83, which are possessed by the host device 20. Each data record includes data corresponding to the device index (Device Index) 83, and an encrypted slot key sequence (Encrypted Slot Key Sequence) which has been encrypted by the device key (Device Key(Kd)) 23 corresponding to the device index (Device Index) 83.

The encrypted slot key sequence (Encrypted Slot Key Sequence) is composed of data Enc(Kd, Index) which is obtained by encrypting the slot index (Slot Index) by the device key (Device Key (Kd)) 23, and data Enc(Kd, Ks) which is obtained by encrypting the slot key (Slot Key(Ks)) corresponding to the slot index by the device key (Device Key(Kd)) 23. In this example, such configuration is adopted that one slot index (Slot Index) and slot key (Slot key(Ks)) are selected from each row of the $XY_E$Matrix 81.

In the XY Matrix 82, the size of single XY data is an arbitrary one, and is not limited to the above-described 64 bytes. Accordingly, the size of the entire XY Matrix 82 is an arbitrary one, and the XY Matrix 82 may be stored, according to the size thereof, in the same page on the cell array 11, or in plural pages, or in the same block, or in plural blocks. Similarly, the $XY_E$Matrix 81 may be stored, according to the size thereof, in the same page on the cell array 11, or in plural pages, or in the same block, or in plural blocks.

<Concrete Example of Secret Information Sharing Method>

Figure 20:
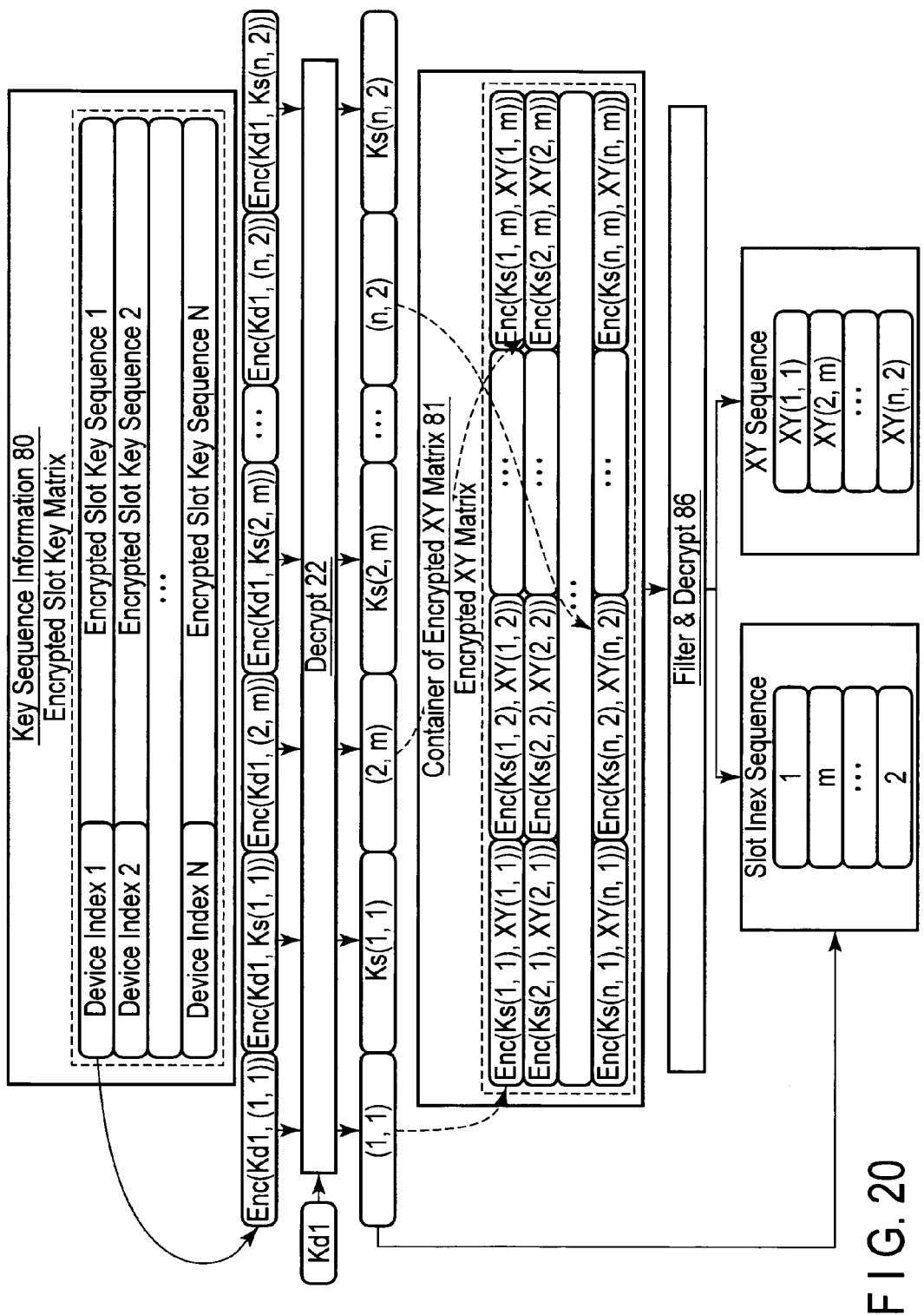
FIG. 20 illustrates a method of using the matrix data according to the eighth embodiment.

Next, referring to FIG. 20, a description is given of a concrete example of a method of sharing secret information by making use of the key information (Key Sequence Information) 80. The host device 20 selects a data record corresponding to the device index (Device Index) 83 possessed by the host device 20 itself, from the key information (Key Sequence Information) 80 which has been read out from the NAND flash memory 10. In this example, an encrypted data record (Encrypted Slot Key Sequence 1), which corresponds to the device index (Device index 1), is selected from the read-out key information (Key Sequence Information) 80.

Subsequently, the decryption module 22 decrypts the selected data record by using the device key (Kd1) 23. As a result, Sequences ((1, m, . . . , 2):(XY(1,1), XY(2,m), . . . , XY(n,2)), which are sequences of the slot index (Slot Index) and slot key (Slot Key(Ks)), are obtained. Sequence (1, m, . . . , 2), which is indicative of the transition of the slot index (Slot Index), becomes a slot index sequence (Slot Index Sequence) 87.

Then, as indicated by a broken line in FIG. 20, the filter & decrypt module 86 selects elements corresponding to the slot index sequence (Slot Index Sequence) 87 from each row of the $XY_E$Matrix 81 which is transmitted from the NAND flash memory 10, and decrypts the elements by the slot key (Slot Key(Ks)) corresponding to the slot index (Slot Index), thereby obtaining the XY Sequence 24.

Subsequently, based on the obtained XY Sequence 24, the filter & majority check module 88 in the host device 20 checks Z which is returned from the NAND flash memory 10. In this check, the NAND flash memory 10 returns not only Z which corresponds to the XY Sequence 24 obtained by the host device 20, but also Z which corresponds to all the elements in the XY Matrix 82. Thus, the filter & majority check module 88 filters and selects only Z which corresponds to the XY Sequence 24 obtained by the own device and the slot index sequence (Slot Index Sequence) 87, and executes an authentication process on only this Z by the determination module 30.

<Re: Method of Distributing Key Information (Key Sequence Information) 80>

Figure 21:
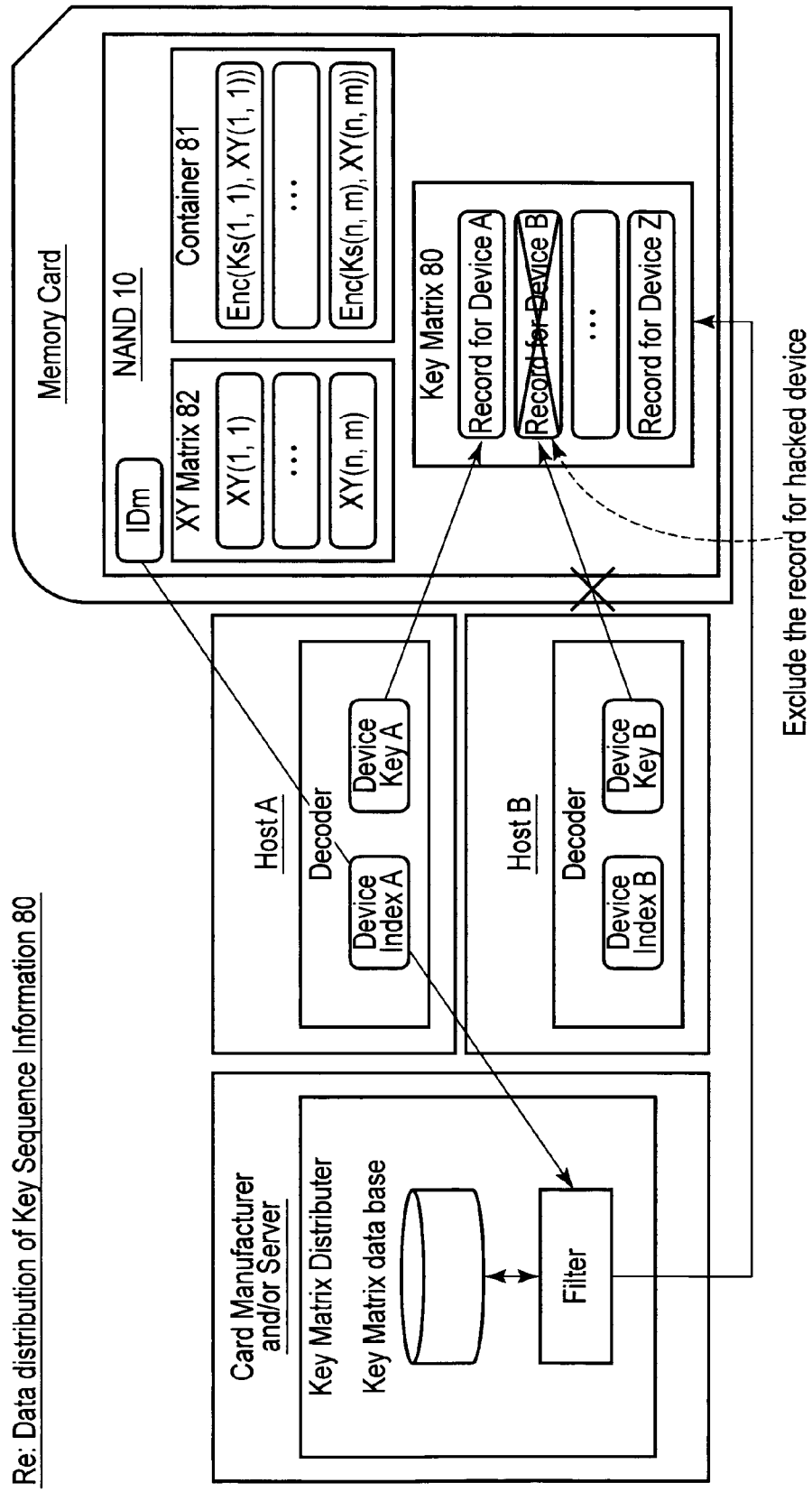
FIG. 21 illustrates an example of data delivery of Key Sequence Information according to the eighth embodiment.

Next, referring to FIG. 21, a description is given of a method of distributing key information (Key Sequence Information 80). At the time of manufacture of the NAND flash memory 10, XY Matrix 82 and $XY_E$Matrix 81 are recorded in the NAND flash memory 10. In this case, the "time of manufacture" has a broad sense. The XY Matrix 82 and $XY_E$Matrix 81 may be written in parallel in all chips which are in the state of a wafer in a pre-process, or may be written in each diced, packaged chip in a post-process. The key information (Key Sequence Information) 80, which corresponds to the XY Matrix 82 and $XY_E$Matrix 81 may be recorded at the same time as the XY Matrix 82 and $XY_E$Matrix 81, or may be recorded at a different timing.

For example, a card manufacturer, which purchases the NAND flash memory 10 and manufactures a memory card, may write the key information (Key Sequence Information) 80 in the NAND flash memory 10, or a server (Key Matrix Distributor), which distributes the key information (Key Sequence Information) 80, may write the key information (Key Sequence Information) 80 in the NAND flash memory 10 via a network.

In any case, IDm, which is bound to the XY Matrix 82 and $XY_E$ Matrix 81, is recorded in the NAND flash memory 10. The card manufacturer or the server selects Key Sequence Information 80 corresponding to the IDm from the database (Key Matrix database), and writes the Key Sequence Information 80 in the NAND flash memory 10. In this case, the IDm is the identifier of the NAND flash memory 10, and is information which is bound to the Key Sequence Information 80. Although the manufacture of the NAND flash memory 10 and the manufacture of the memory card are conducted by an identical company, the same as described above applies to the case in which the location of manufacture of the NAND flash memory 10 is different from the location of manufacture of the memory card.

When no crack occurs in the host device, the key information (Key Sequence Information) 80 includes data records of all host devices. On the other hand, when a crack has occurred in the host device, for example, when a crack has occurred in a host device B (Host B), the key information (Key Sequence Information) 80 is distributed in such a form that the record for this host device is not included in the key information (Key Sequence Information) 80 (Exclude the recorded hacked device B). Thereby, it is possible to prevent further leakage of the XY Sequence from the cracked host device (Host B).

In the above example, host devices (devices) have been described as units, between which the XY Sequence is made different. In actual implementation, however, such a unit may be a group of a plurality of devices, for example, a device group of devices with the same model number, a device group of devices manufactured by the same manufacturer, a device group categorized by a device implementation method (hardware implementation, software implementation, or hardware and software implementation), a device group categorized by users of devices (general users, business users, or processors in servers), or a combination of the above.

<Authentication Flow>

Figure 22A:
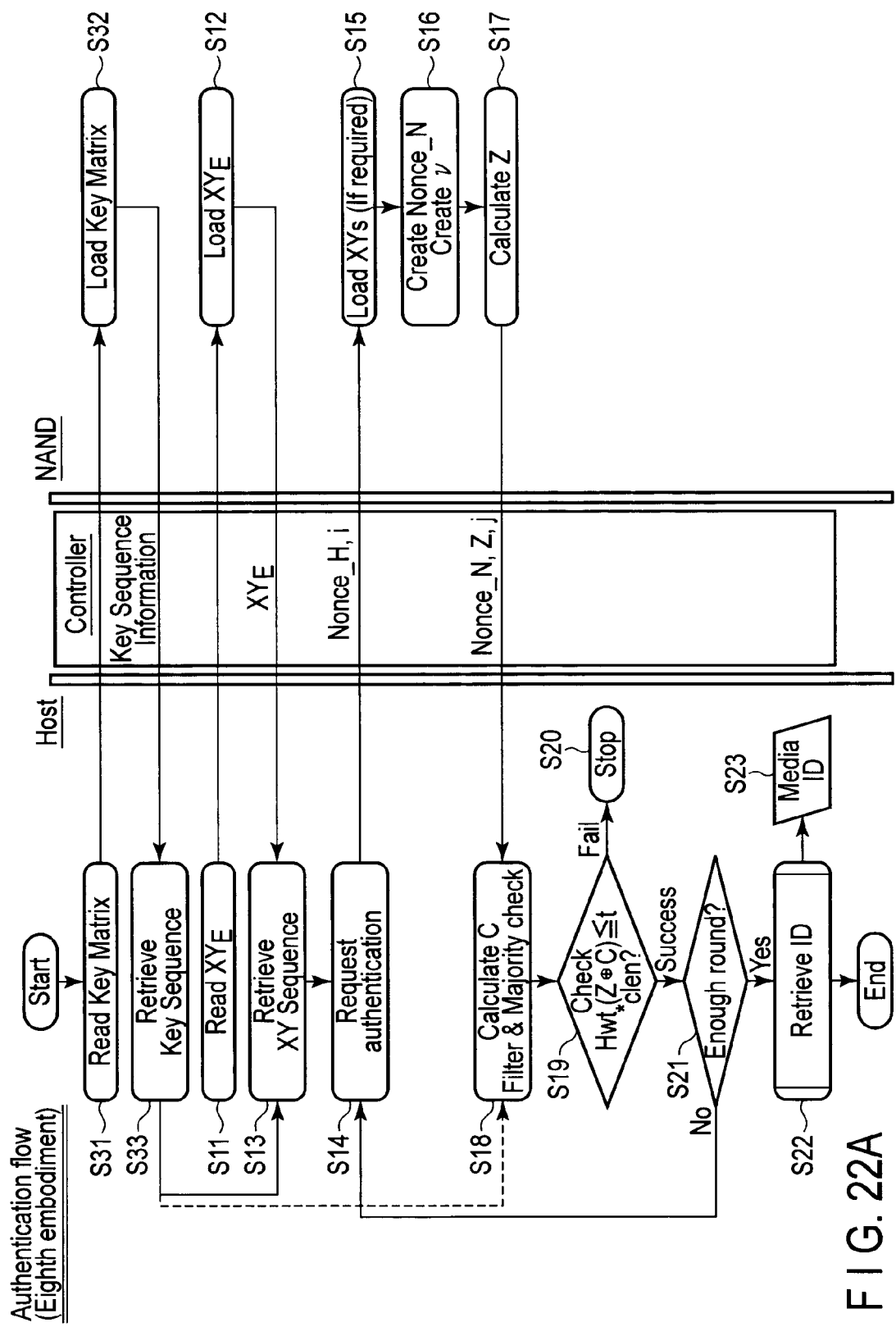
FIG. 22A is a flow chart illustrating an authentication flow according to the eighth embodiment.

Next, referring to FIG. 22A, the authentication operation according to the eighth embodiment is described.

In the eighth embodiment, the host device 20 reads out the key information (Key Sequence Information) 80 which is recorded in the NAND flash memory 10, selects the data record corresponding to its own device index (Device Index), and then decrypts this record by the device key (Device Key), thereby obtaining the slot keys (Slot Keys) and slot index (Slot Indexes).

If authentication is started (Start), the host device 20, in step S31, sends a read instruction (Read Key Sequence Information) of key information (Key Sequence Information) 80 to the NAND flash memory 10. In the illustrated example, since the controller mediates between the host device 20 and the NAND flash memory 10, the command system of an instruction which is sent to the controller from the host device 20 and the command system of an instruction which is actually sent to the NAND flash memory from the controller may be different or identical.

Then, in step S32, according to the read instruction, the NAND flash memory 10 loads the key information (Key Sequence Information) 80 from the user area 11-3 (Load Key Sequence Information), and sends the key information (Key Sequence Information) 80 to the host device 20. The read instruction may include, or may not include, an address at which the key information (Key Sequence Information) 80 is recorded. When the read instruction does not include this address, the NAND flash memory generates a predetermined internal address by itself, and acquires the key information (Key Sequence Information) 80.

Subsequently, in step S33, the host device 20 selects, from the sent key information (Key Sequence Information) 80, the data record corresponding to the own device index (Device Index), and then decrypts this record by the device key (Device Key), thereby taking out the slot keys (Slot Keys) and slot index (Slot Indexes) (Retrieve Key Sequence).

Then, in step S11, the host device 20 sends a read instruction (Read $XY_E$) of $XY_E$ Matrix 81 to the NAND flash memory 10. The read instruction (Read $XY_E$) may be a command which is different from the read instruction (Read Key Sequence Information), or both may be distinguished by inputting different addresses with use of the same command.

Subsequently, in step S12, according to the read instruction, the NAND flash memory 10 loads $XY_E$ Matrix 81 from the ROM area 11-1 (Load $XY_E$), and sends the $XY_E$ Matrix 81 to the host device 20.

Then, in step S13, the host device 20 decrypts the $XY_E$ elements corresponding to the slot index (Slot Indexes) by the corresponding slot key (Slot Key), and obtains the XY Sequence 24.

Subsequently, in step S14, the host device 20 sends an authentication request to the NAND flash memory 10, together with the Index number (i) of XY Matrix 80 and a random number (Nonce_H) (Request authentication). The Index number is a slot index, or a number corresponding to a row or a column of the XY Matrix.

Then, in steps S15 to S17, the NAND flash memory 10 calculates a plurality of Z's by using the XY corresponding to the Index number of the XY Matrix 80, with use of the XY Matrix 80 which is recorded in the hidden area 11-2, and sends the Z's, together with the random number (Nonce_N), to the host device 20.

Subsequently, in steps S18 to S23, the host device 20 obtains single Z by filtering the read-out data according to the slot index sequence (Slot Index Sequence) which is possessed by the host device 20 itself, and executes similar authentication.

<Advantageous Effects>

According to the authenticator/authenticatee and the authentication method relating to the eighth embodiment, the above points (I) to (IV) can be improved, and at least the following advantageous effects can be obtained.

In the eighth embodiment, the NAND flash memory 10 includes the key information (Key sequence Information) 80 which has a data structure composed of key transition records which are used in the host device 20. The NAND flash memory 10 includes the secret information XY Matrix 82 of the matrix data structure and the $XY_E$ Matrix 81 which is created by encrypting the secret information XY Matrix 82, in a manner to correspond to the key information (Key sequence Information) 80.

Therefore, first, since the values of the key information (Key sequence Information) 80 can be changed in association with individual host devices 20, the tolerance to the man-in-the-middle attack can be improved. Specifically, which XY data is used for authentication can advantageously be made invisible.

Secondly, even if the key for decrypting the $XY_E$Matrix 81 is leaked from the host device 20 and then the value of XY Matrix 82 is exposed, the key information (Key Sequence Information) 80 is different between the host devices 20. Thus, there is an advantage that the influence of the security protection upon the entire authentication system can be reduced.

Specifically, in other embodiments, each host device 20 has the KEY[i] for decrypting each row of the $XY_E$Matrix, that is, each host device 20 is treated as a global secret. Thus, if one host device 20 is cracked and the key is leaked, all XY values of the rows of the $XY_E$Matrix, which are encrypted by using this key, would be exposed. In preparation for this case, $XY_E$ is encrypted by plural rows and KEYs corresponding to these rows. However, secrecy can only be kept against cracks of host devices of several rows. If the number of several rows is reached, the whole authentication system would be collapsed.

In the eighth embodiment, however, (16*16!)/(16*16−16!) at maximum is secured as the number of combinations, with which the XY Sequence, which is used for authentication, can be selected from elements of (the number of rows x the number of columns). Thus, even if the host device 20 is cracked and the XY Sequence data of this device is exposed, the influence on other host devices can be reduced, and a crack margin up to the collapse of the whole authentication system can be improved.

A more concrete description is given, referring to FIG. 22B which illustrates the relationship between the time and system margin in the cases of the eighth embodiment and the second embodiment. In the case of the second embodiment indicated by a broken line in FIG. 22B, the degree of leakage at a time when the secret information has been leaked L times (e.g. several times) increases linearly. On the other hand, in the eighth embodiment indicated by a solid line, since there is an overlapping component in the secret information between the devices, the degree of leakage is lower than in the second embodiment. In addition, in the second embodiment, the system margin at a time when the secret information has been leaked M times (e.g. about 10 times) corresponds to the case in which all secrets have been leaked, if the upper limit number of rows of secret information in the second embodiment is set at M times. In this case, since secret information, which can be substituted, is deficient, the system is collapsed. On the other hand, in the case of the eighth embodiment indicated by the solid line, even if the secret information has been leaked M times (e.g. about 10 times), the increase in the degree of secret leakage is not linear, and thus a more sufficient system margin can be secured than in the reference example indicated by the broken line, and the tolerance of security of secret of the product can sufficiently be satisfied.

As described above, the present embodiment differs from the foregoing embodiments in that the degree of risk of secret leakage can be dispersed. For example, in the case of the eighth embodiment indicated by the solid line, it should suffice if the product is designed so as to sufficiently meet the degree of leakage of the security for the generation of the product, before a time point t3 (e.g. about 10 years) of the lifetime of the product at which the secret information has been leaked N times (e.g. several-ten times) and the tolerance of the product fails to be satisfied.

Furthermore, the host device (device), which has been cracked by the exposed XY Sequence, can be identified. On the other hand, when the cracked device has become clear, the data record, which is encrypted by the device key possessed by this device, is excluded from the key information (Key Sequence Information) 80. Thereby, the cracked device can be invalidated, and the secrecy of the XY Matrix of the newly manufactured NAND flash memory 10 can be secured. In this manner, by excluding the data record of the exposed secret, secret leakage to the next generation can be prevented, and the secrecy between generations can advantageously be improved.

As has been described above, the eighth embodiment is advantageous in that the tolerance to the man-in-the-middle attack can be improved, the influence at the time when the XY value is exposed can be reduced by individualizing the XY Sequence which can be derived on a device-by-device basis, the cracked host device can be identified, and the cracked host device key can be invalidated.

[Ninth Embodiment]

Next, referring to FIG. 23 to FIG. 27, a description is given of an authenticator/authenticatee and an authentication method according to a ninth embodiment.

<Structure Example (Memory System)>

Figure 23:
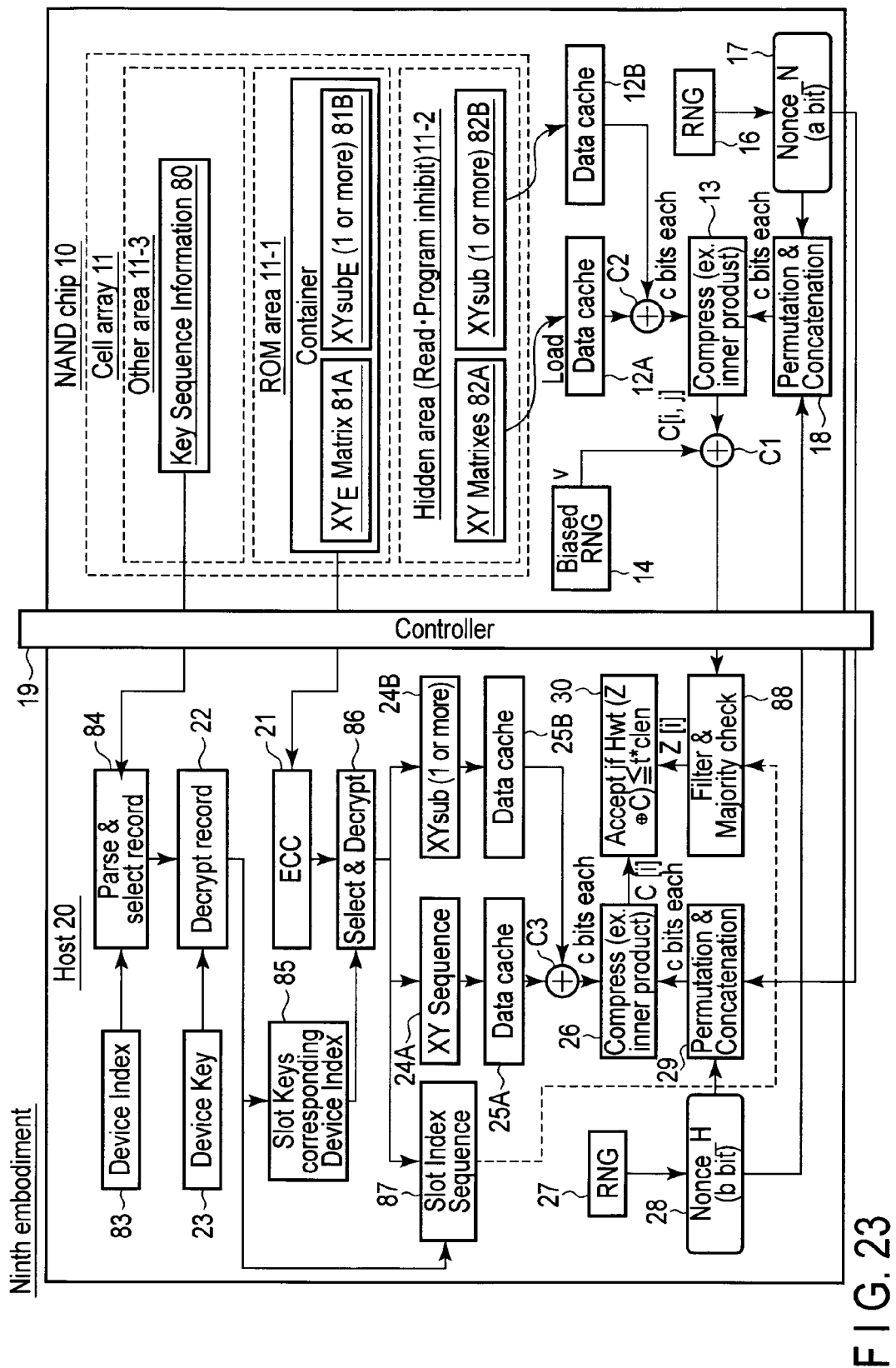
FIG. 23 is a block diagram showing a structure example according to a ninth embodiment.

Referring to FIG. 23, a structure example of the memory system according to the ninth embodiment is described. The ninth embodiment differs from the eighth embodiment in that, like the seventh embodiment, XYsub 82B and $XYsub_E$ 81B are used.

As shown in FIG. 23, the NAND flash memory 10 of the ninth embodiment differs from the NAND flash memory 10 of the eighth embodiment in that the XYsub 82B and $XYsub_E$ 81B are additionally stored. There are cases in which each of the XYsub 82B and $XYsub_E$ 81B is singular or plural. Further, in the case of plural XYsub 82B and $XYsub_E$ 81B, there are cases in which a column structure is adopted and a row/column structure is adopted.

Matrix Data (1) (Case of "Singular")

Figure 24:
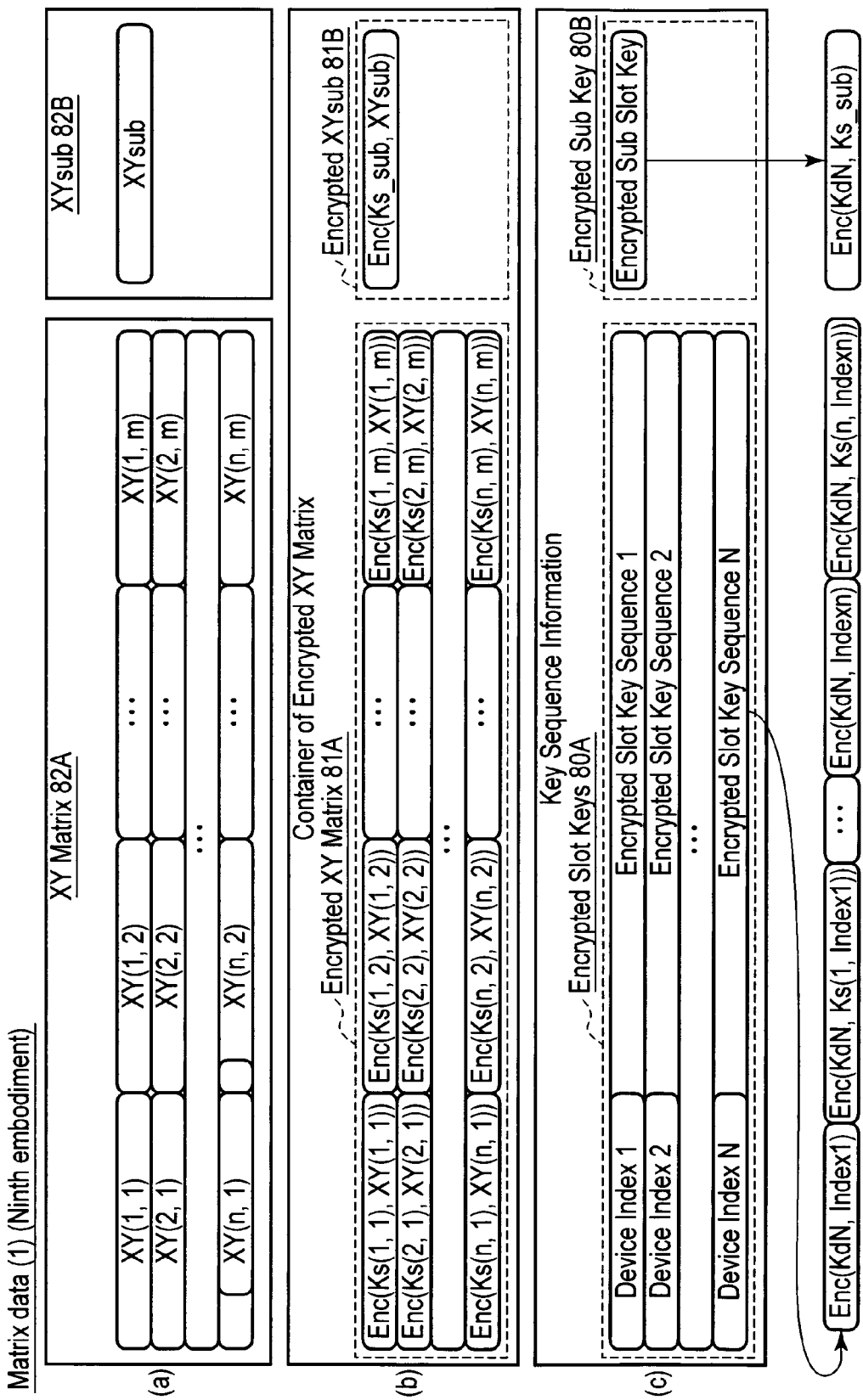
FIG. 24 shows a structure example (1) of matrix data according to the ninth embodiment.

Next, referring to FIG. 24, a description is given of the case in which each of the XYsub 82B and $XYsub_E$ 81B is singular.

As shown in part (a) of FIG. 24, single XYsub 82B is recorded in the hidden area 11-2 for the internal processing in the NAND flash memory 10.

As shown in part (b) of FIG. 24, single $XYsub_E$ (Enc (Ks_sub, XYsub)) 81B, which is created by encrypting the XYsub by the slot key (ks_sub), is recorded in the Container.

As shown in part (c) of FIG. 24, single data (Encrypted Sub Slot Key) 80B, which is obtained by encrypting the slot key (Ks_sub) by the device key, is included in the key information (Key Sequence Information) 80.

Matrix Data (2) (Case of Column Structure)

Next, referring to FIG. 25, a description is given of the case in which a plurality of XYsub having a column structure is used.

As shown in part (a) of FIG. 25, in this example, a plurality of XYsub (XYsub(1), XYsub(2), . . . , XYsub(n)) 82B having a column structure is recorded in the secret area 11-2 for the internal processing in the NAND flash memory 10.

As shown in part (b) of FIG. 25, a plurality of columns of data $XYsub_E$ (Enc(Ks_sub(1), XYsub(1)), . . . , Enc(Ks_sub (n), XYsub(n)), which are obtained by encrypting each XYsub by the slot key (ks_sub), are recorded in the Container 11-1.

As shown in part (c) of FIG. 25, column-structure data (Encrypted Sub Slot Key 1, . . . , Encrypted Sub Slot Key n)

80B, which are obtained by encrypting the slot key (Ks_sub) by the device key, are included in the key information (Key Sequence Information) 80.

Matrix Data (3) (Case of Row/Column Structure)

Figure 26:
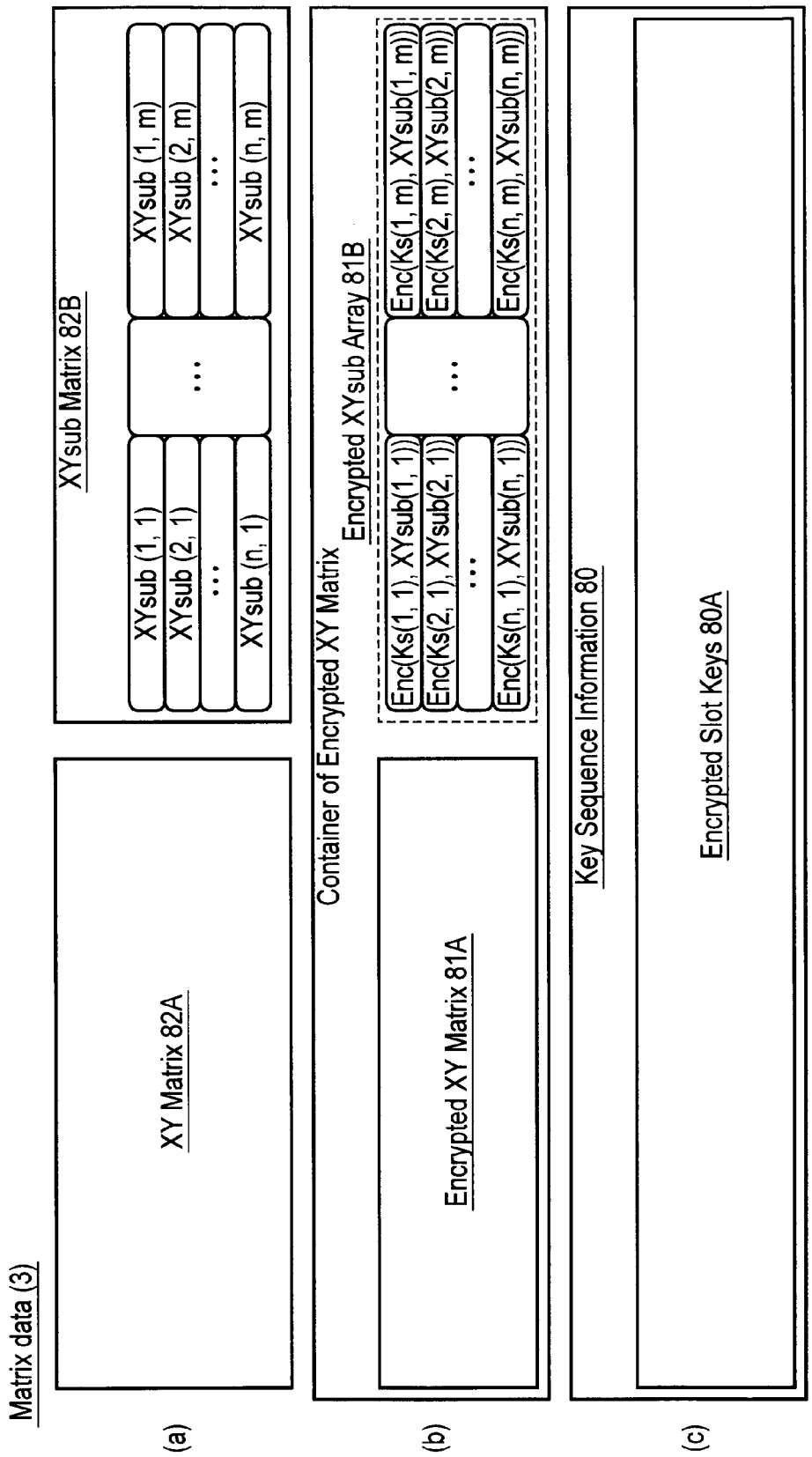
FIG. 26 shows a structure example (3) of matrix data according to the ninth embodiment.

Next, referring to FIG. 26, a description is given of the case of using a plurality of XYsubs having a row/column structure.

As shown in part (a) of FIG. 26, XYsub Matrix 82B is recorded in the hidden area 11-2 for the internal processing in the NAND flash memory 10, in a manner to accompany the XY described in the eighth embodiment.

As shown in part (b) of FIG. 26, row/column-structure data $XYsub_E$ Array (Enc(Ks(1,1), XYsub(1,1), . . . , Enc (Ks(n,m), XYsub(n,m)) 81B, which is obtained by encrypting each XYsub(i,j) by the slot key Ks(i,j) that was used for encryption of XY(i,j), is recorded in the Container 11-1.

As shown in part (c) of FIG. 26, since the key information (Key Sequence Information) 80 includes the slot key Ks(i,j) that was already used for the encryption of the XY(i,j), there is no need to newly include the slot key which is dedicated to the XYsub.

As has been described above, the row/column structure for the case of single XYsub 82B and single $XYsub_E$ 81B or for the case of plural XYsub 82B and plural $XYsub_E$ 81B, for instance, is applicable to the XYsub 82B and $XYsub_E$ 81B.

<Authentication Flow>

Figure 27:
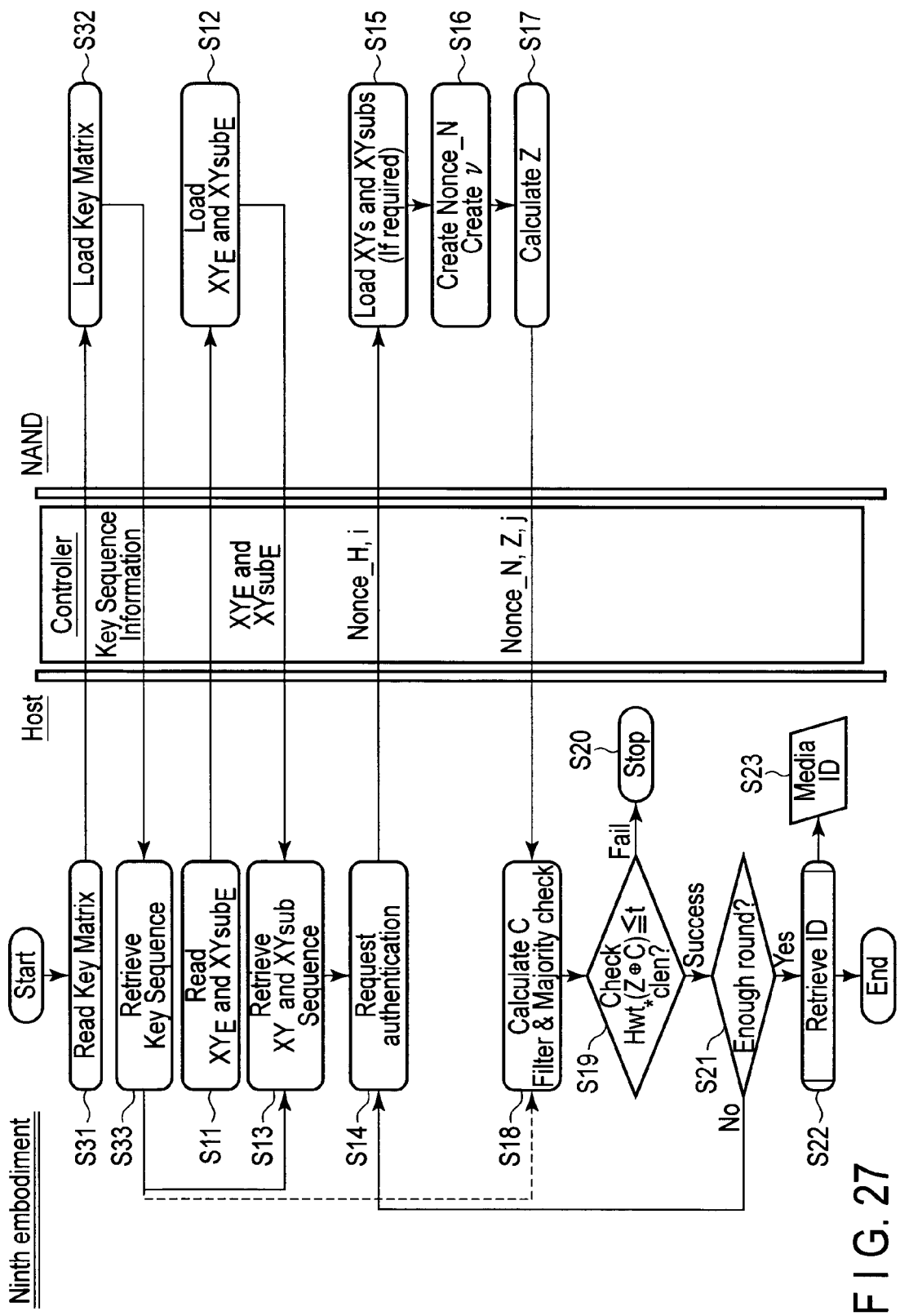
FIG. 27 is a flow chart illustrating an authentication flow according to the ninth embodiment.

Next, referring to FIG. 27, the authentication operation according to the ninth embodiment is described.

In the ninth embodiment, too, in steps S31 to S33, the host device 20 similarly reads out the key information (Key Sequence Information) 80 which is recorded in the NAND flash memory 10, selects the data record corresponding to the own device index (Device Index), and then decrypts this record by the device key (Device Key), thereby obtaining the slot keys (Slot Keys) and slot index (Slot Indexes).

Then, in step S13, the host device 20 reads out $XY_E$Matrix from the NAND flash memory 10, decrypts $XY_E$ elements and $XYsub_E$ elements corresponding to the slot index (Slot Indexes) by the corresponding slot key (Slot Key), and obtains XY Sequence and XYsub.

Subsequently, in step S14, the host device 20 sends an authentication request to the NAND flash memory 10, together with the Index number (i) of the XY Matrix and a random number (Nonce_H).

Then, in steps S15 to S17, the NAND flash memory 10 calculates a plurality of Z's by using the XY and XYsub corresponding to the Index number of the XY Matrix, with use of the XY Matrixes which are recorded in the hidden area 11-2, and sends the Z's, together with a random number (Nonce_N), to the host device 20.

Subsequently, the host device 20 similarly obtains single Z by filtering the read-out data according to the slot index sequence (Slot Index Sequence) which is held by the host device 20 itself, and executes authentication.

<Advantageous Effects>

According to the authenticator/authenticatee and the authentication method relating to the ninth embodiment, the above points (I) to (IV) can be improved, and the same advantageous effects as in the eighth embodiment can be obtained. In addition, there is at least an advantage that the recording time can be shortened.

[Tenth Embodiment]

Figure 28:
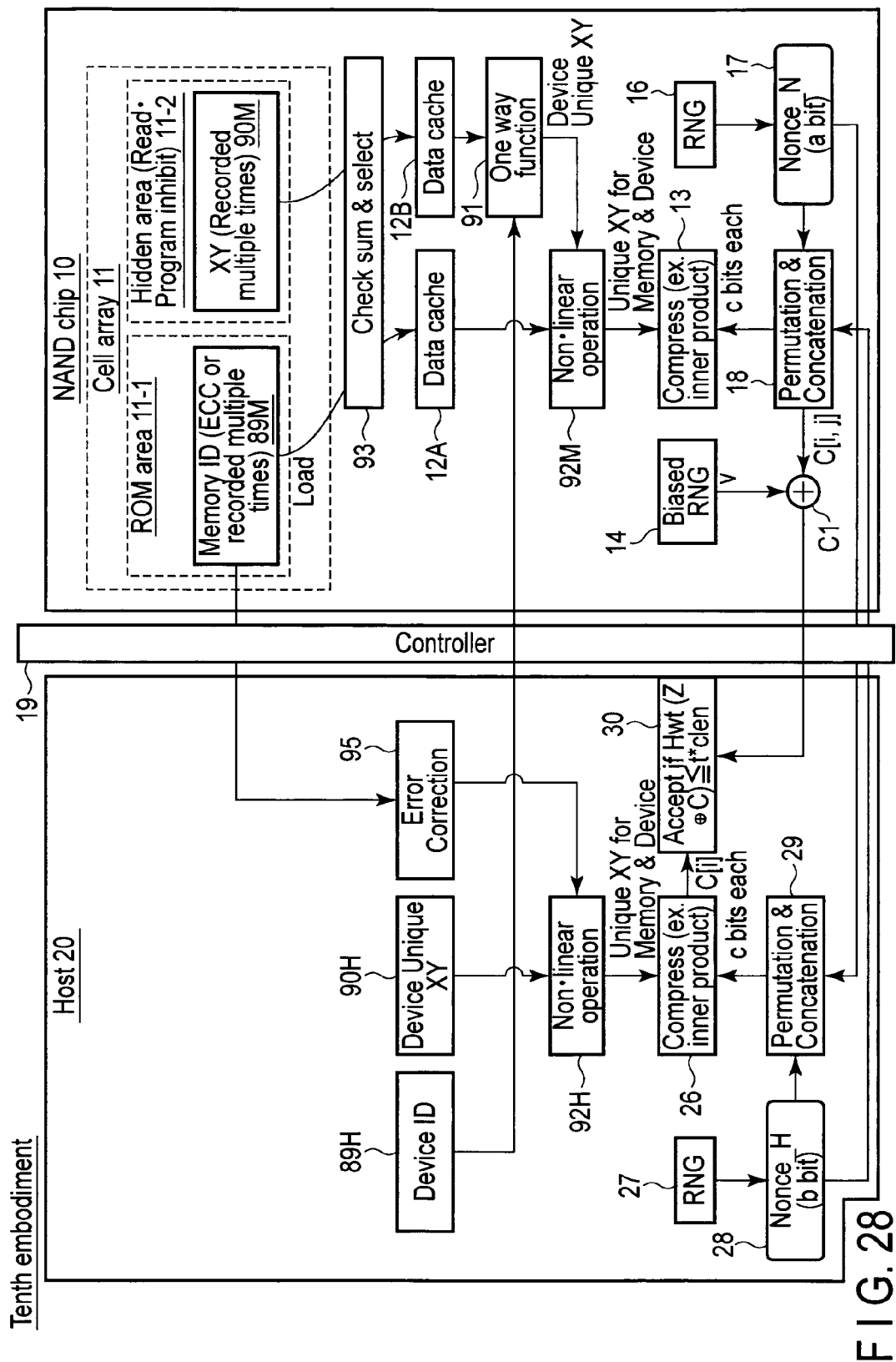
FIG. 28 is a block diagram showing a structure example according to a tenth embodiment.
Figure 31:
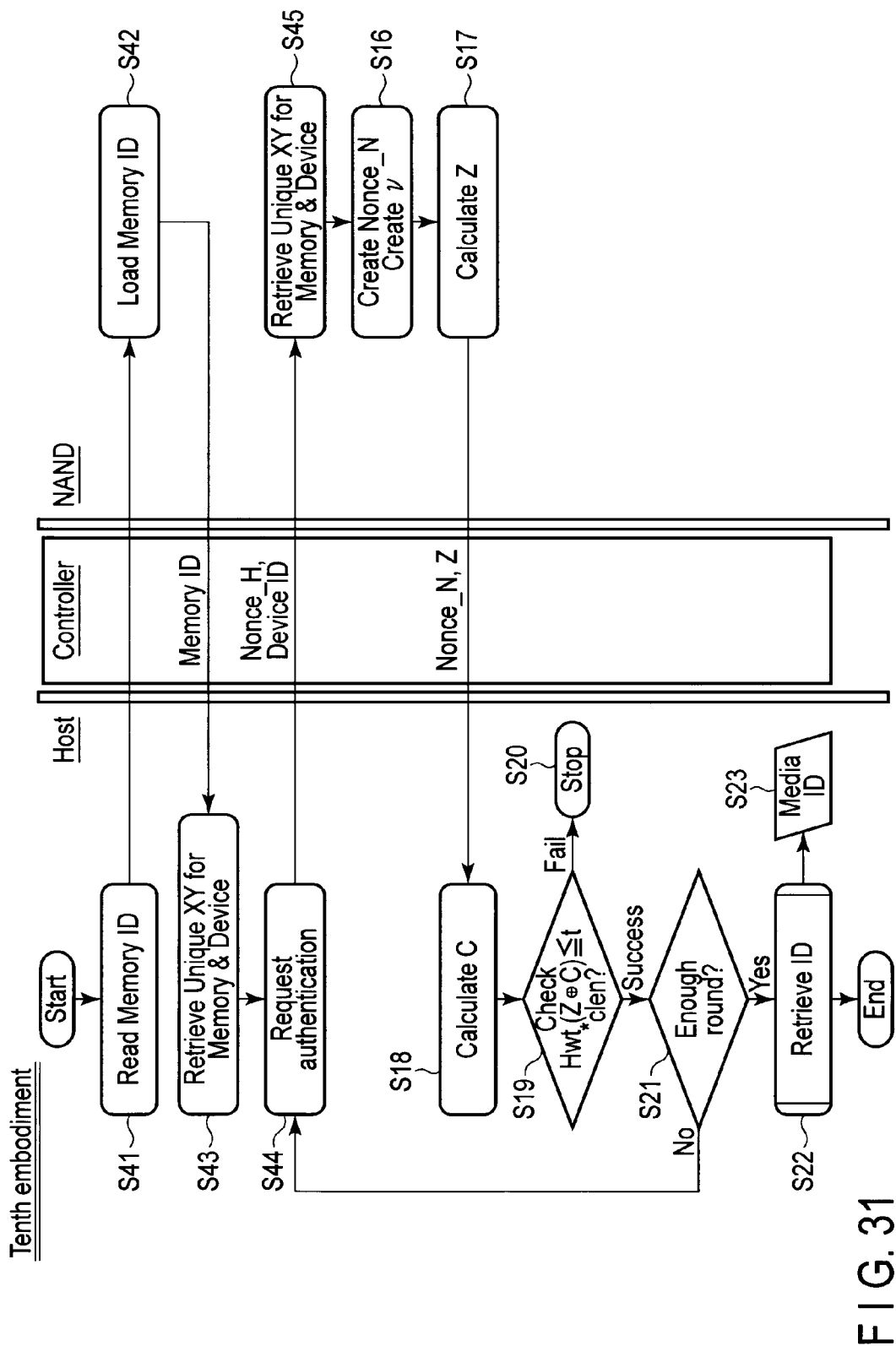
FIG. 31 is a flow chart illustrating an authentication flow according to the tenth embodiment.

Next, referring to FIG. 28 and FIG. 31, a description is given of an authenticator/authenticatee and an authentication method according to a tenth embodiment.

In the foregoing embodiments, the host device 20 includes the device key 23 for obtaining the secret information of the NAND flash memory 10. Thereby, the host device 20 reads out the encrypted secret information $XY_E$ of the NAND flash memory 10, and the secret XY is shared between the NAND flash memory 10 and the host device 20.

By contrast, in the tenth embodiment, the host device 20 receives no secret information from the NAND flash memory 10, and Device Unique XY (90H), which is secret information possessed by the host device 20, varies from host device 20 to host device 20. Thereby, the secret information, which is possessed by the NAND flash memory 10, is not leaked from the host device 20. Further, even if the secret is leaked from the host device 20, the influence of the leakage is limited to the leakage of the Device Unique XY (90H), and other host devices having different Device Unique XYs are not affected. As will be described below, this is because the Device Unique XY (90H) is a calculation result between XY (90M) and Device ID (89H) by a one way function process module 91. Specifically, even if the Device Unique XY (90H) and Device ID (89H) are exposed, a reverse function process for deriving the XY (90M) cannot be executed.

<Structure Example (Memory System)>

To begin with, referring to FIG. 28, a structure example of the memory system according to the tenth embodiment is described. The tenth embodiment differs from the foregoing embodiments with respect to the following respects.

The NAND flash memory 10 includes the one way function process module 91 and a non-linear process module 92M. In addition, Memory ID (89M), which is the unique ID of the NAND flash memory 10, is recorded in the ROM area 11-1. The difference from the foregoing embodiments is that XY value (90M) is recorded in the hidden area 11-1.

The host device 20 of this embodiment differs from that of the foregoing embodiments in that the host device 20 includes Device ID (89H) that is the unique ID of the host device 20, Device Unique XY (90H) that is the unique XY value of the host device 20, an error correction module 95, and a non-linear process module 92H.

In the above-described structure, the host device 20 reads out the Device ID (89H) and sends the read-out Device ID (89H) to the NAND flash memory 10.

In the host device 20, the error correction module 95 executes an error correction process on the Memory ID (ECC or recorded multiple times) (89M) which has been read out of the NAND flash memory 10.

Subsequently, in the host device 20, the non-linear process module 92H executes a non-linear process on the own Device Unique XY (90H) and the read-out, error-corrected Memory ID (89M), thereby obtaining a unique value Unique XY for Memory and Device.

On the other hand, in the NAND flash memory 10, the one way function process module 91 executes a one way function process on the Device ID (89H) which has been received from the host device 20, and the own XY value (90M) which has been read out from the cache 12B. Thereby, the same value as the Device Unique XY, which is possessed by the host device 20, is obtained. Subsequently, the own Memory ID (89M), which has been read out of the cache 12A, and the Device Unique XY are subjected to a non-linear process in the non-linear process module 92M. Thus, the same unique value Unique XY for Memory and Device as that of the host device can be obtained.

Thereafter, both the NAND flash memory 10 and the host device 20 execute the same authentication process by using the Unique XY for Memory and Device.

<Re: One Way Function Process Module (One Way Function) 91>

Next, referring to FIG. 29, the one way function process module (One way function) 91 is described.

As shown in FIG. 29, the one way function process module 91 according to this embodiment includes a Crypto Box 96 and an exclusive-OR circuit C8.

The Crypto Box 96 executes a cryptanalysis of Input by using Key. The exclusive-OR circuit C8 executes an exclusive-OR process between the Input and an output from the Crypto Box 96, and produces Output.

In this case, the Input is target data of the one way function process module 91, and the Output is a process result. It is possible to use the above-described XY value as the Input and the above-described Device ID value as the Key, or to use the above-described Device ID value as the Input and the above-described XY value as the Key.

<Re: Crypto Box 96>

Next, referring to FIG. 30, the Crypto Box 96 is described.

As shown in FIG. 30, the Crypto Box 96 of this embodiment includes a plurality of exclusive-OR circuits C9-0 to C9-6$n$, a plurality of S-Box and Permutation modules 97-1 to 97-$n$, and a plurality of Update process modules 98-1 to 98-$n$.

The plural exclusive-OR circuits C9-0 to C9-$n$ output exclusive-OR values by receiving Input and Key, or Key that is updated by the Update process modules 98-1 to 98-$n$ and an input from the S-Box and Permutation modules 97-1 to 97-$n$.

The S-Box and Permutation modules 97-1 to 97-$n$ execute non-linear processes on the outputs from the exclusive-OR circuits C9-0 to C9-$n$ of the preceding stage. In this case, S-Box is a conversion process of an input value by a data transposition table, and Permutation is a permutation of bits of values after the transposition process.

The Update process modules 98-1 to 98-$n$ update the Key of the preceding stage. The Update corresponds to the additional generation of results of the transposition process and permutation process, or the execution of update calculations with externally input update values. A value generated by a counter may be used as the update value, and an exclusive-OR process may be used for the update calculation.

As described above, the process in the Crypto Box 96 in this embodiment is executed in parallel, and each process is referred to as "1 round". In this case, the output value of each round is used as an input value for the next round. The result of plural rounds of the above-described non-linear process is output as Output. Thus, since even "1 round" relating to the non-linear process is a complex process, the one way function process, which is required for the one way function process module 91, can be executed by updating and executing this process over a plurality of rounds.

In the meantime, since each of the above-described transposition process and permutation process is a non-linear process, either the transposition process or the permutation process, or a combination thereof, may be used as a structural element of the above-described non-linear process module.

<Authentication Flow>

Next, referring to FIG. 31, an authentication process relating to the tenth embodiment is described.

In step S41, the host device 20 requests read-out of the Memory ID (89M) which is recorded in the NAND flash memory 10.

Then, in step S42, responding to the request from the host, the NAND flash memory 10 reads out the Memory ID (89M) which is recorded in the ROM area 11-1, and sends it to the host device 20.

Subsequently, in step S43, the host device 20 executes a non-linear process on the acquired Memory ID (89M) and the own Device Unique ID (90H), and obtains Unique XY for Memory and Device.

Then, in step S44, the host device 20 sends an authentication request to the NAND flash memory 10, together with a host random number (Nonce_H) and Device ID (89H).

Subsequently, in step S45, the NAND flash memory 10 obtains Unique XY for Memory and Device by the above-described process, by using the sent Device ID (89H) and its own XY (90M) and Memory ID (89M).

Thereafter, the same authentication process as described above is executed.

<Advantageous Effects>

According to the authenticator/authenticatee and the authentication method relating to the tenth embodiment, the above points (I) to (IV) can be improved, and the following advantageous effects can be obtained.

In the foregoing embodiments, the host device 20 includes the device key 23 for obtaining the secret information of the NAND flash memory 10. Thereby, the host device 20 reads out the encrypted secret information $XY_E$ of the NAND flash memory 10, and the secret XY is shared between the NAND flash memory 10 and the host device 20.

By contrast, in the tenth embodiment, the host device 20 receives no secret information from the NAND flash memory 10, and Device Unique XY (90H), which is secret information possessed by the host device 20, varies from host device 20 to host device 20. Thereby, the secret information, which is possessed by the NAND flash memory 10, is not leaked from the host device 20. Further, even if the secret is leaked from the host device 20, the influence of the leakage is limited to the leakage of the Device Unique XY (90H), and other host devices having different Device Unique XYs are not affected. As has been described above, this is because the Device Unique XY (90H) is a calculation result between XY (90M) and Device ID (89H) by the one way function process module 91. Specifically, since the one way function process is executed, even if the Device Unique XY (90H) and Device ID (89H) are exposed, the reverse function process for deriving the XY not possible.

In addition, in the present embodiment, in order to obtain the Unique XY for Memory and Device, the non-linear process modules 92M and 92H execute the non-linear process on the Memory ID (89M) and Device Unique XY (90H). Thus, advantageously, there is little concern that a commutative law is established. For example, when an inner product arithmetic operation is adopted as the authentication method, the inner product arithmetic operation is a linear process. Thus, if a linear process is executed on the Memory ID and Device Unique XY in order to obtain the Unique XY for Memory and Device, there is concern that the commutative law is established. In this case, since it is possible that the Memory ID is disguised, it is desirable to provide a non-linear process in at least one of the host device 20 and the NAND flash memory 10. In the present embodiment, the non-linear process is executed in the non-linear process modules 92M and 92H of both the host device 20 and NAND flash memory 10, and therefore it is possible to prevent the commutative law from being established.

Moreover, the information that is used for authentication is Unique XY for Memory and Device, which differs depending on the combination of the NAND flash memory 10 and host device 20, which are to be authenticated. Thus, there is the advantage that the risk of a man-in-the-middle attack can be reduced. Even if Unique XY for Memory and Device is exposed by a man-in-the-middle attack, the environment in which this value can be used is very limited. The reason is that authentication can be disguised for only the host device 20.

As has been described above, the tenth embodiment has such advantageous effects that the tolerance to the man-in-the-middle attack can be improved, the influence at the time when the secret information is exposed can be reduced by making the secret information, which is distributed to devices, unique to the individual devices, the cracked host device can be identified, and the cracked host device key can be invalidated.

[Eleventh Embodiment (Media ID Retrieve Process)]

Next, referring to FIG. 32 to FIG. 35, an eleventh embodiment is described. The eleventh embodiment relates to various processes (Media ID retrieve process) of calculating a media ID (Media ID) in the above-described step S22.

ID Retrieve Process (1)

Figure 32:
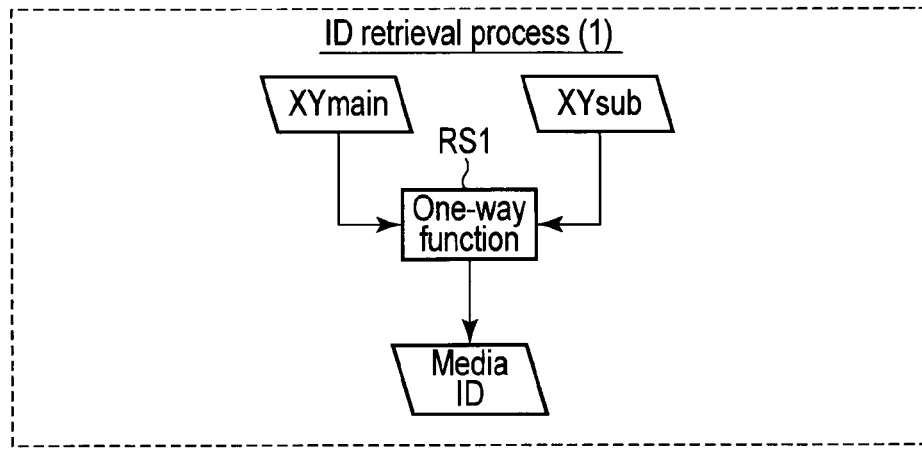
FIG. 32 is a block diagram illustrating an ID retrieval process (1) according to an eleventh embodiment.

ID retrieve process (1) is as shown in FIG. 32. As shown in FIG. 32, in this example (1), in step RS1, a one-way function process (One-way function) is executed on XYmain and XYsub which are used in the above-described authentication. The result of the process is treated as the Media ID.

In this case, as the one-way function process, use can be made of a one-way arithmetic operation based on ciphers such as SHA-1, SHA-256 or AEG-H.

ID Retrieve Process (2)

Figure 33:
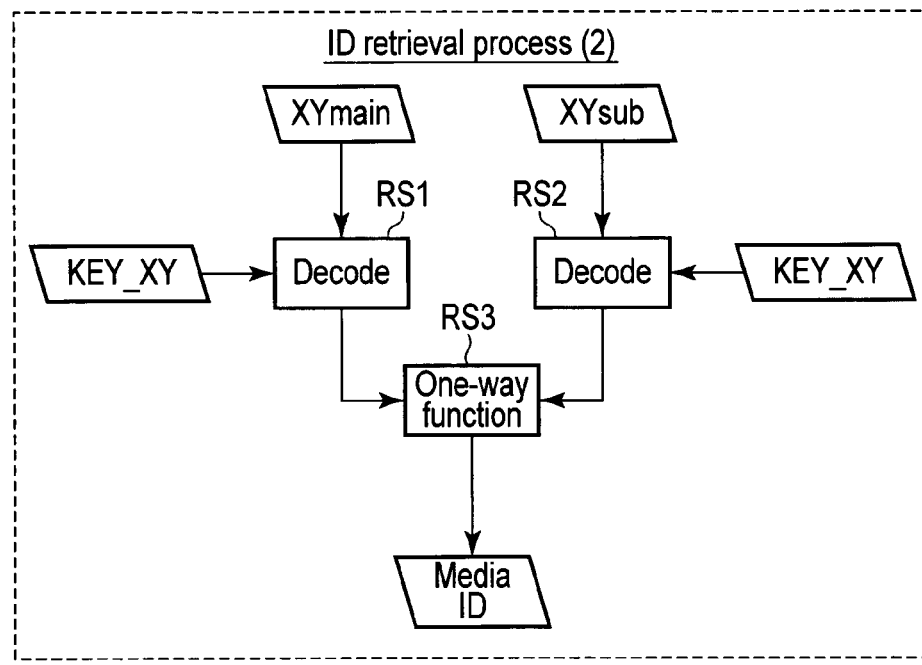
FIG. 33 is a block diagram illustrating an ID retrieval process (2) according to the eleventh embodiment.

ID retrieve process (2) is as shown in FIG. 33. As shown in FIG. 33, in this example (2), in step RS1, RS2, the XYmain and XYsub, which have been used in the above-described authentication, are further subjected to a decoding process (Decode) by using the KEY_XY corresponding to one of the KEY_XYmain and KEY_XYsub which have been used in decryption of KEY_XYmain$_E$ and KEY_XYsub$_E$ in the above-described authentication process.

Subsequently, in step RS3, a similar one-way function process (One-way function) is executed, and the result of the process is treated as the Media ID.

ID Retrieve Process (3)

Figure 34:
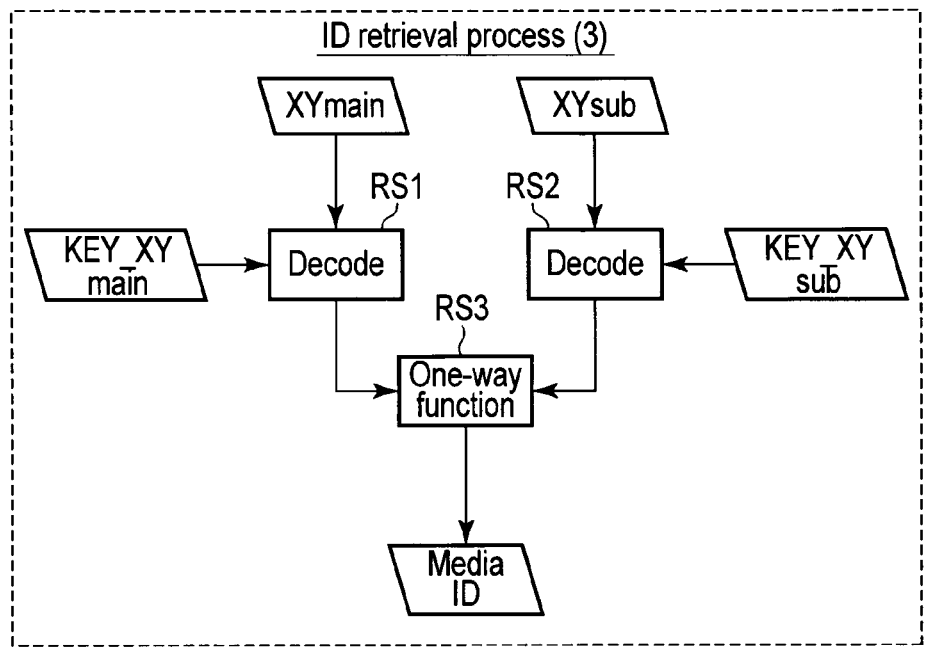
FIG. 34 is a block diagram illustrating an ID retrieval process (3) according to the eleventh embodiment.

ID retrieve process (3) is as shown in FIG. 34. As shown in FIG. 34, in this example (3), in step RS1, RS2, the XYmain and XYsub, which have been used in the above-described authentication, are further subjected to a decoding process (Decode) by using the KEY_XYmain and KEY_XYsub which have been used in decryption of KEY_XYmain$_E$ and KEY_XYsub$_E$ in the above-described authentication process.

Subsequently, in step RS3, a similar one-way function process (One-way function) is executed, and the result of the process is treated as the Media ID.

ID Retrieve Process (4)

Figure 35:
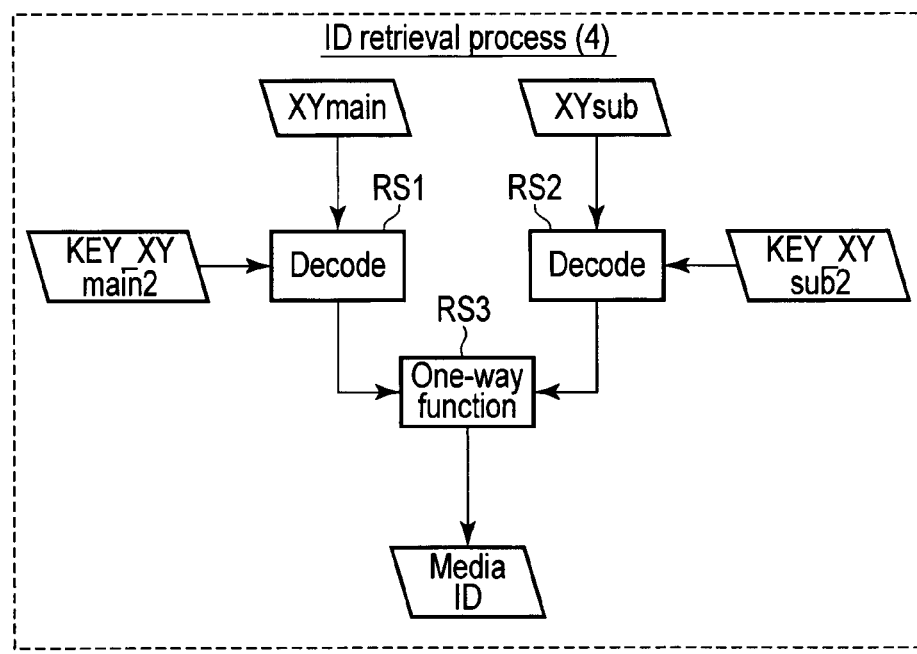
FIG. 35 is a block diagram illustrating an ID retrieval process (4) according to the eleventh embodiment.

ID retrieve process (4) is as shown in FIG. 35. As shown in FIG. 35, in this example (4), in step RS1, RS2, the XYmain and XYsub, which have been used in the above-described authentication, are further subjected to a decoding process (Decode) by using KEY_XYmain2 and KEY_XYsub2 which are different from the KEY_XYmain and KEY_XYsub which have been used in decryption of KEY_XYmain$_E$ and KEY_XYsub$_E$ in the above-described authentication process. In this case, the KEY_XYmain2 and KEY_XYsub2 may have the same value.

Subsequently, in step RS3, a similar one-way function process (One-way function) is executed, and the result of the process is treated as the Media ID.

[Twelfth Embodiment (Media ID Binding Process)]

Next, referring to FIG. 36 and FIG. 37, a twelfth embodiment is described. The twelfth embodiment relates to a use method of Media ID (Media ID binding process).

For example, when commercial moving picture content or the like is recorded on a physical medium and played back, such a method is used that identification information unique to the physical medium is used in an encryption process at a time of content recording, and the content is bound to the physical medium.

At a time of playing back the content, such a method is adopted that a decryption process or a check process based on the identification information is executed, and when the identification information that has been reproduced does not agree with the identification information which was used in the encryption process at the time of recording the content, the playback of the content is stopped. Examples of the physical medium include a removable medium such as an SD card, and an embedded memory which is incorporated in a mobile phone, etc.

In any case, the object of the above-described method is to stop playback of unlawfully duplicated content, when encrypted content, which is recorded on a certain medium, has been unlawfully copied to another medium. As information for this purpose, use is made of the above-described identification information (media ID) which varies from media to media.

ID Binding Process (1)

ID binding process (1) is as shown in FIG. 36. As shown in FIG. 36, in this example (1), a MAC (Message Authentication Code) generation process is executed, and this is used for preventing unlawful duplication.

Specifically, in step BP1, in an example of a method of using Media ID as the above-described identification information, a MAC generation process is executed on Media ID or other information, based on Content Key which is used for content encryption.

Subsequently, in an apparatus which records content in media, the MAC is generated and the generated MAC is recorded on the media. In an apparatus which plays back the content from the media, the recorded MAC is checked, based on the Media ID, or Content Key. When the authenticity has been confirmed, the content is played back. When the authenticity has not been confirmed, such a method is applied that the playback of the content is stopped.

ID Binding Process (2)

ID binding process (2) is as shown in FIG. 37. As shown in FIG. 37, in this example (2), Media ID is used as information for generating Content Key which is used for content encryption.

In step BP1, in an apparatus which records content in media, Media ID and Content Key Precursor are subjected to a one-way function process (One-way function).

In the apparatus which records content in media, the content which has been encrypted by the processed Content Key is recorded.

In an apparatus which plays back the content from the media, the recorded Content Key Precursor and Media ID are subjected to a similar one-way function process, thereby obtaining the Content Key. Thus, the decryption and playback of the content are executed. In the case where the Media ID does not coincide, that is, in the case where the content data has been unlawfully copied to different media, the derived Content Key does not coincide with the Content Key which was used in the content encryption. Thus, the decryption of the content fails, and the playback is stopped.

[13th Embodiment (An Example of a Memory and a Storage/Playback Host)]

Figure 38:
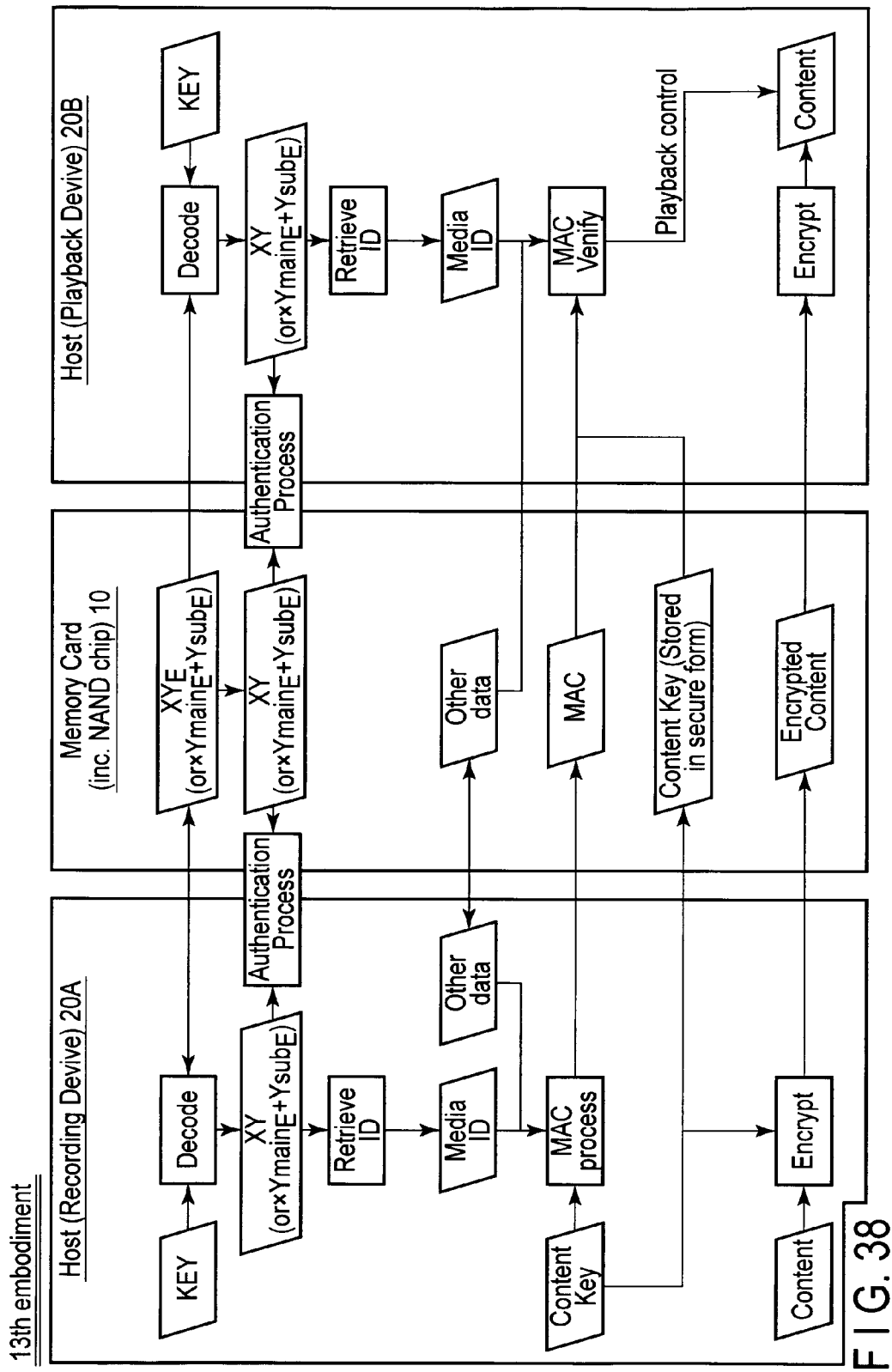
FIG. 38 is a block diagram showing a structure example according to a 13th embodiment.

Next, referring to FIG. 38, a 13th embodiment is described. The 13th embodiment relates to an example in which in a system of a memory card (inc. NAND chip) 10, a recording host (Recording Device) 20A and a playback host (Playback Device) 20B, which is a combination of the structures of the above-described embodiments, the above-described authentication is executed and content is played back in the host 20B by using the above-described media ID.

When the recording host (Recording Device) 20A records content in the memory card (inc. NAND chip) 10, the authentication process in the above embodiments is first executed between the memory card (inc. NAND chip) 10 and the recording host (Recording Device) 20A. After the authentication process has been successfully executed, the ID retrieval process in the above embodiments is executed. Then, the MAC, which has been generated by the ID binding process (1) in the above embodiment, is recorded in the memory card (inc. NAND chip) 10. In addition, content (Encrypted Content) encrypted by the Content Key used in the ID binding process (1) is recorded. Further, the Content Key itself is also recorded in a secure form. The secure form, in this context, may be a form of recording in a recording area in the memory card (inc. NAND chip) 10 which becomes accessible after the authentication is successfully executed between the memory card (inc. NAND chip) 10 and the recording host (Recording Device) 20A. The authentication, in this context, may be the authentication method described in the present application, or may be realized by some other authentication function which is possessed by the memory card (inc. NAND chip) 10. Another example of the secure form may be an encrypted form by a key which is possessed by the memory card (inc. NAND chip) 10 or the recording host (Recording Device) 20A.

When the playback host (Playback Device) 20B reads out the content from the memory card (inc. NAND chip) 10 and plays back the content, the authentication process in the above embodiments is first executed between the memory card (inc. NAND chip) 10 and the playback host (Playback Device) 20B. After the authentication process has been successfully executed, the ID retrieval process in the above embodiments is executed. Then, the MAC, which is recorded in the memory card (inc. NAND chip) 10, is verified by the process corresponding to the ID binding process (1) in the above embodiment. Thereafter, the Content Key is read out from the memory card (inc. NAND chip) 10, and the encrypted content (Encrypted Content) is decrypted, and thereby the content is played back.

[14th Embodiment (Another Example of a Memory and a Storage/Playback Host)]

Next, referring to FIG. 39, a 14th embodiment is described. The 14th embodiment relates to an example in which in a system of a memory card (inc. NAND chip) 10, a recording host (Recording Device) 20A and a playback host (Playback Device) 20B, which is a combination of the structures of the above-described embodiments, the above-described authentication is executed and content is played back in the host 20B by using the above-described media ID.

When the recording host (Recording Device) 20A records content in the memory card (inc. NAND chip) 10, the authentication process in the above embodiments is first executed between the memory card (inc. NAND chip) 10 and the recording host (Recording Device) 20A. After the authentication process has been successfully executed, the ID retrieval process in the above embodiments is executed. Then, the Content Key, which has been generated by the ID binding process (1) in the above embodiment, is recorded in the memory card (inc. NAND chip) 10. In addition, content (Encrypted Content) encrypted by the Content Key, which has been generated by the ID binding process (2), is recorded. Further, the Content Key Precursor itself is also recorded in a secure form.

The secure form, in this context, may be a form of recording in a recording area in the memory card (inc. NAND chip) 10 which becomes accessible after the authentication is successfully executed between the memory card (inc. NAND chip) 10 and the recording host (Recording Device) 20A. The authentication, in this context, may be the authentication method described in the present application, or may be realized by some other authentication function which is possessed by the memory card (inc. NAND chip) 10. Another example of the secure form may be an encrypted form by a key which is possessed by the memory card (inc. NAND chip) 10 or the recording host (Recording Device) 20A.

When the playback host (Playback Device) 20B reads out the content from the memory card (inc. NAND chip) 10 and plays back the content, the authentication process in the above embodiments is first executed between the memory card (inc. NAND chip) 10 and the playback host (Playback Device) 20B. After the authentication process has been successfully executed, the ID retrieval process in the above embodiments is executed. Then, the Content Key is generated from the Content Key Precursor, which is recorded in the memory card (inc. NAND chip) 10, by the process corresponding to the ID binding process (2) in the above embodiment. Thereafter, the encrypted content (Encrypted Content) is decrypted, and thereby the content is played back.

[15th Embodiment (An Example of a Memory, a Controller and a Host)]

Next, referring to FIG. 40, a 15th embodiment is described. The 15th embodiment relates to an example of the NAND flash memory 10, controller 19 and host device 20, which are applicable to the above-described embodiments. In this embodiment, an SD card (trademark) is taken as an example of a memory card.

As shown in FIG. 40, in this embodiment, functional blocks of the host device, which is connected to the memory card, are illustrated. The respective functional blocks can be realized by either hardware or computer software, or by a combination of both. Thus, the respective blocks are described, in general, from the standpoint of their functions, so as to clarify by which of them each block is realized. Whether such functions are executed as hardware or software depends on concrete modes of implementation or on design restrictions imposed on the entire system. A person skilled in the art may realize these functions by various methods in each concrete mode of implementation, but all methods of implementation fall within the scope of the present invention.

The host device 20 includes software 211 such as an application or an operating system. The software 211 is instructed by the user to write data in the memory card, or to read out data from the memory card. The software 211 instructs a file system 212 to write and read data. The file system 212 is a scheme for managing file data which is recorded in a storage medium that is an object of management. The file system 212 records management information in a memory area in the storage medium, and manages the file data by using the management information.

The host device 20 includes an SD interface 213. The SD interface 213 is composed of hardware and software, which are necessary for executing an interface process between the host device 20 and the memory card. The host device 20 communicates with the memory card via the SD interface 213. The SD interface 213 specifies various protocols which are necessary for communication between the host device 20 and the memory card, and includes a set of various commands which are mutually recognizable by an SD interface 31 of the memory card, which will be described later. In addition, the SD interface 213 includes a hardware structure (arrangement of pins, number of pins, etc.) which is connectable to the SD interface 31 of the memory card.

The memory card includes a NAND flash memory 10 and a controller 19 for controlling the memory 10. When the memory card is connected to the host 20, or when the host 20 is turned on in the state in which the memory card is inserted in the host 20 that is in the OFF state, the memory card is supplied with power, executes an initializing process, and executes a process corresponding to the access from the host 20.

The NAND memory 10 stores data in a nonvolatile state, and executes data write and read in a unit called "page" which comprises a plurality of memory cells. A unique physical address is allocated to each page. In addition, the memory 10 executes erase of data in a unit called "block" (erase block) which comprises a plurality of pages. In some cases, a physical address is allocated to a physical block unit.

The controller 19 manages the storage state of data by the memory 10. The management of the storage state includes managing a relationship between a physical address of a page (or a physical block) and a logical address of data which is stored in this page, and managing which physical address is indicative of a page (or a physical block) that is in an erase state (a state in which no data is written or invalid data is stored).

The controller 19 includes an SD interface 31, an MPU 32, a ROM (read only memory) 33, a RAM (random access memory) 34, and a NAND interface 35.

The SD interface 31 is composed of hardware and software, which are necessary for executing an interface process between the host 20 and the controller 19. Like the SD interface 213, the SD interface 31 specifies protocols which enable communication between both, includes a set of various commands, and also includes a hardware structure (arrangement of pins, number of pins, etc.). The memory card (controller 19) communicates with the host 20 via the SD interface 31. The SD interface 31 includes a register 36.

The MPU 32 controls the entire operation of the memory card. For example, when the memory card is supplied with power, the MPU 32 reads out firmware (control program), which is stored in the ROM 33, into the RAM 34, and executes a predetermined process. The MPU 32 creates various tables on the RAM 34 according to the control program, or executes a predetermined process on the memory 10 according to a command which is received from the host 20.

The ROM 33 stores, e.g. a control program which is controlled by the MPU 32. The RAM 34 is used as a working area of the MPU 32, and temporarily stores the control program or various tables. Such tables include a conversion table (logical/physical table) for converting a logical address allocated to data by the file system 12 to a physical address of a page in which the data is actually stored. The NAND interface 35 executes an interface process between the controller 19 and the memory 10.

The memory areas in the NAND flash memory 10 include, for example, a system data area, a secret data area, a protected data area, a user data area, etc., in accordance with the kinds of data which is stored. The system data area is an area which is secured in the memory 10 by the controller 19 in order to store data which is necessary for the operation of the controller 19. The secret data area stores key information for use in encryption, and secret data for use at a time of authentication, and is inaccessible from the host device 20. The protected data area stores important data, secure data, etc. The user data area is freely accessible and usable by the host 20, and stores, for instance, user data such as AV content files and image data. The controller 19 secures a part of the user data area, and stores control data (e.g. logical/physical address conversion table) which is necessary for the operation of the controller 19 itself.

[16th Embodiment]

Next, a 16th embodiment is described as a concrete structure example of the above-described NAND flash memory 10.

<Entire Structure Example>

FIG. 41 shows a concrete entire structure example of the NAND flash memory 10.

As shown in FIG. 41, the NAND flash memory of this embodiment includes a memory cell array 11, a random number generation circuit 16, a control circuit 19, an authentication circuit 51, a bit line control circuit 52, a column decoder 53, a data input/output buffer 54, a data input/output terminal 55, a word line driving circuit 56, a control signal input terminal 58, and a power generation circuit 59.

The memory cell array 11 is composed of a plurality of blocks (BLOCK 1 to BLOCK n). Each of the blocks (BLOCK 1 to BLOCK n) includes a plurality of memory cells which are arranged at intersections between word lines and bit lines. For example, BLOCK 1 is the above-described ROM area 11-1. For example, BLOCK 2 is the hidden area 11-2. The other blocks are, for example, user areas (User area) 11-3, which are accessible from the host device 20.

The ROM area 11-1 is, for example, an OTP (One Time Program) block, and only one-time write is permitted. After data write, a block decoder is controlled by using means such as an electric fuse, a laser fuse or a ROM fuse, thereby prohibiting an erase operation. The hidden area 11-2 is set in such a state that the hidden area 11-2 cannot be selected by, for example, decoding with an external address. The hidden area 11-2 is an area from which data can be read out by only the control circuit 19 in the NAND flash memory.

The authentication circuit 51 includes, for example, the above-described compression arithmetic circuit 13, biased RNG 14, output module 15, random number generator 16, permutation & concatenation circuit 18, and bit-by-bit addition circuit C1. The authentication circuit 51 is controlled by the control circuit 19. For example, a random number, which has been generated by the random number generator 16, is used for the generation of a secret key or challenge data in the authentication process, in accordance with the control of the control circuit 19, and the random number is transmitted, where necessary, to the external host device 20 via the data input/output terminal 55.

The bit line control circuit 52 reads out data of a memory cell in the memory cell array 11 via a bit line, and detects the state of a memory cell in the memory cell array 11 via a bit line. In addition, the bit line control circuit 52 applies a write control voltage to a memory cell in the memory cell array 11 via a bit line, thereby writing data in the memory cell.

In the bit line control circuit 52, a data memory circuit 12, such as a page buffer (not shown), is provided, and this data memory circuit is selected by the column decoder 53. The data of the memory cell, which has been read out to the data memory circuit, is output to the outside from the data input/output terminal 55 via the data input/output buffer 54.

The data input/output terminal 55 is connected to, for example, an external host device. The data input/output terminal 55 has a bus width of, e.g. 8 bits or 16 bits. The NAND flash memory may support a high-speed interface standard such as a toggle mode interface. In the toggle mode interface, for example, data transfer is performed via the data input/output terminal 55, in sync with both the rising and falling edges of a data strobe signal (DQS).

The host device 20 is, for example, a microcomputer, and receives data which is output from the data input/output terminal 55. The host device 20 outputs various commands CMD (write command, read command, erase command, status read command, etc.) for controlling the operation of the NAND flash memory 10, addresses ADD, and data DT. The write data DT, which has been input to the data input/output terminal 55 from the host device, is supplied via the data input/output buffer 54 to the data memory circuit (not shown) which is selected by the column decoder 53. On the other hand, the commands CMD and addresses ADD are supplied to the control circuit 19.

The word line driving circuit 56, under the control of the control circuit 19, selects a word line in the memory cell array 11, and applies to the selected word line the voltage that is necessary for data read, write or erase.

The voltage generation circuit 59, under the control of the control circuit 19, supplies necessary voltages for the operations of the connected structural circuits shown in the Figure. For example, the voltage generation circuit 59 boosts an external voltage which is supplied from the host device, and generates a voltage which is applied to the word line at a time of data read, write or erase.

The control circuit (Controller) 19 delivers necessary control signals and control voltages to the respective connected circuits, thereby to control the operation of the entirety of the NAND flash memory 10. The control circuit 19 is connected to the memory cell array 11, authentication circuit 51, bit line control circuit 52, column decoder 53, data input/output buffer 54, word line driving circuit 56 and voltage generation circuit 59. The connected structural circuits are controlled by the control circuit 19.

The control circuit 19 is connected to the control signal input terminal 58, and is controlled by a combination of control signals, such as a WE (write enable) signal, a RE (read enable) signal, an ALE (address latch enable) signal and a CLE (command latch enable) signal, which are input via the control signal input terminal 58 from the host device.

In terms of functions, the word line driving circuit 56, bit line control circuit 52, column decoder 53 and control circuit 19 constitute a data write circuit, a data read circuit and a data erase circuit. The host device detects whether the NAND flash memory is executing an internal operation, such as a write operation, a read operation or an erase operation, by monitoring an RY/BY (ready/busy) signal output terminal (not shown). The control circuit 19 outputs an RY/BY signal via the RY/BY signal output terminal.

<Structure Example of Block (BLOCK)>

Figure 42:
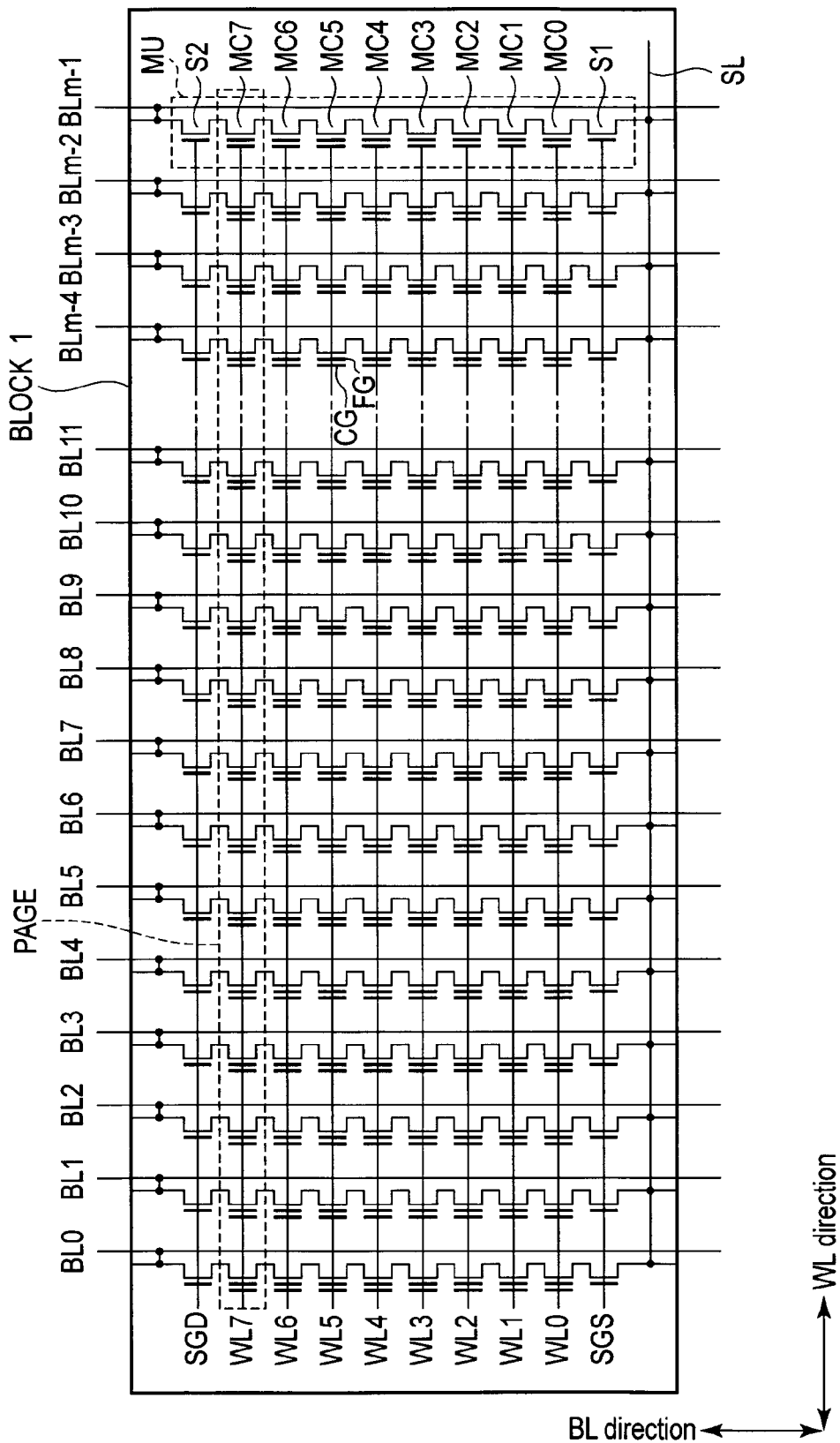
FIG. 42 is an equivalent circuit diagram showing a block (BLOCK) in FIG. 41.

Next, referring to FIG. 42, a structure example of the block (BLOCK), which constitutes the memory cell array, is described. The block BLOCK 1 in FIG. 41 is described by way of example. In this example, since the memory cells in the block BLOCK 1 are erased batchwise, this block is a data erase unit.

The block BLOCK 1 comprises a plurality of memory cell units MU which are arranged in a word line direction (WL direction). The memory cell unit MU comprises a NAND string (memory cell string) which is arranged in a bit line direction (BL direction) crossing the WL direction and is composed of 8 memory cells MC0 to MC7 having current paths connected in series; a source-side select transistor S1 connected to one end of the current path of the NAND string; and a drain-side select transistor S2 connected to the other end of the current path the NAND string.

In the present embodiment, the memory cell unit MU comprises 8 memory cells MC0 to MC7. However, the number of memory cells is not limited to 8, and may be two or more, for example, 56 or 32.

The other end of the current path of the source-side select transistor S1 is connected to a source line SL. The other end of the current path of the drain-side select transistor S2 is connected to a bit line BLm-1 which is provided on an upper side of the memory cell unit MU in association with each memory cell unit MU and extends in the BL direction.

Word lines WL0 to WL7 extend in the WL direction, and are connected commonly to the control electrodes of the plural memory cells in the WL direction. A select gate line SGS extends in the WL direction, and is connected commonly to the plural select transistors S1 in the WL direction. Similarly, a select gate line SGD extends in the WL direction, and is connected commonly to the plural select transistors S2 in the WL direction.

A page (PAGE) is present in association with each of the word lines WL0 to WL7. For example, as indicated by a broken line in FIG. 42, a page 7 (PAGE 7) is present in association with the word line WL7. Since a data read operation and a data write operation, which will be described later, are executed in units of the page (PAGE), the page (PAGE) is a data read unit and a data write unit.

<Threshold Distribution of Single-Level Memory Cell (SLC: Single Level Cell)>

Figure 43:
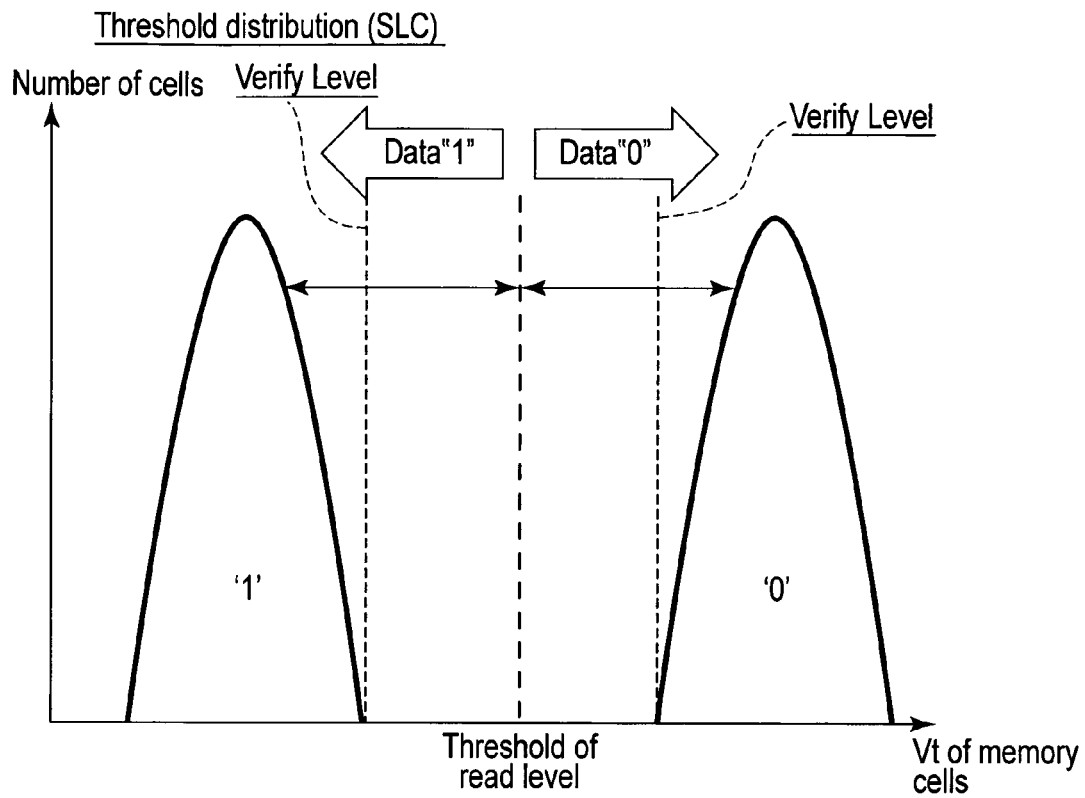
FIG. 43 shows a threshold distribution of a single-level memory cell (SLC)

Next, referring to FIG. 43, a threshold distribution of a single-level memory cell (SLC: Single Level Cell) is described.

In the threshold distribution (Vth distribution) of the single-level memory cell, a distribution of '1', '0', as illustrated in FIG. 43, is exhibited after data is recorded in the memory cell. In this example, '1' is allocated to an erase state (Erase state), and '0' is allocated to a written state (Programmed state).

At a time of a data write operation and a data erase operation, after the application of a write voltage or an erase voltage, a verify (Verify) operation is executed to check the threshold voltage of each memory cell, and to execute once again the data write or to continuously control the data erase operation in the cell in which a target level has not been reached. Thus, a verify level (Verify level) for determining whether the verify operation has been completed is provided in the distributions of '1' and '0'.

In an example of control, in the data write operation, the control circuit (Controller) 19 combinationally increases the voltage that is applied to the control gate, increases the voltage application time, and increases the number of times of voltage application, thereby setting the threshold voltage of each memory cell to the target level. Also in the data erase operation, the control circuit (Controller) 19 combinationally increases the voltage that is applied to the p well (Pwell) in the semiconductor substrate, increases the voltage application time, and increases the number of times of voltage application, thereby setting the threshold voltage of each memory cell to the target level. In this manner, the programmed data has predetermined distribution widths of '1' and '0', as shown in FIG. 43.

In the data read, a read voltage (Threshold of read level) is set at a middle point between the '0' distribution and '1' distribution. Thereby, it is determined which data is held by each memory cell. Specifically, when the read voltage is applied to the control gate CG, '1' is determined if the memory cell MC is set in the ON state, and '0' is determined if the memory cell MC remains in the OFF state.

The threshold distribution becomes narrower in the case where the verify operation has been executed, than in the case where the verify operation has not been executed. The reason for this is that the amount of electrons, which are injected by one-time application of write voltage, varies between memory cells, and there are a memory cell which is programmed earlier and a memory cell which is programmed later. Thus, the threshold voltage of each memory cell is checked at each time of write voltage application. In the memory cell which has reached the verify level, subsequent electron injection is prohibited (suppressed). In the memory cell which has not reached the verify level, write voltage is applied once again, and electron injection is continued. As a result, the threshold distribution becomes narrower than in the case in which the verify operation is not executed.

<Threshold Distribution of Multilevel Memory Cell (MLC: Multi Level Cell)>

Figure 44:
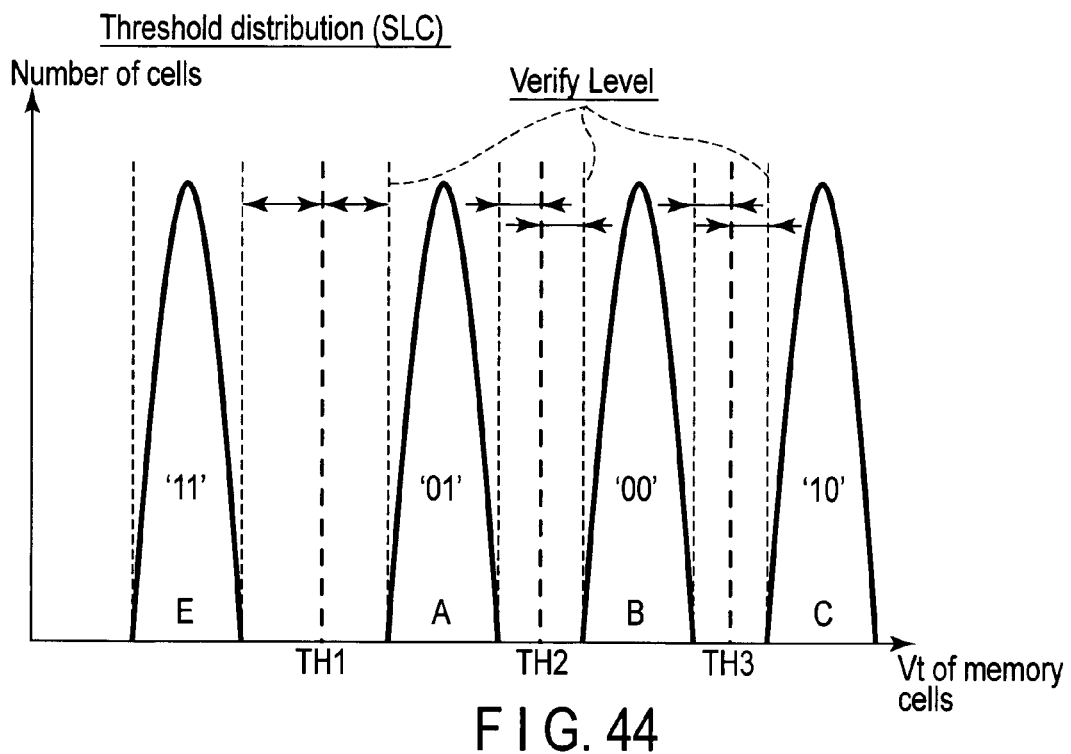
FIG. 44 shows a threshold distribution of a multilevel memory cell (MLC).

Next, referring to FIG. 44, a threshold distribution of a multilevel memory cell (MLC: Multi Level Cell) is described.

In the multilevel memory cell, the injection amount of electrons in the programmed state (Programmed state) is finely controlled. Thereby, for example, when two bits are stored in one memory cell, four threshold distributions are formed. When three bits are stored in one memory cell, eight threshold distributions are formed.

In the example illustrated, two-bit data is recorded in one memory cell in the threshold distribution (Vth distribution) of the multilevel memory cell. Thus, '11', '01', '00' and '10', as shown in FIG. 44, are allocated to four threshold distributions, in the order from the lower threshold voltage side. For the purpose of convenience, in some cases, the four threshold distributions are referred to as 'E' level, 'A' level, 'B' level and 'C' level in the order from the lower threshold voltage side.

Also in the case of the data write of the multilevel memory cell, like the case of data write of the single-level memory cell, the write operation is properly controlled in a manner to reach the target threshold voltage. In addition, a verify level (Verify level) is similarly provided in each of the '11', '01', '00' and '10' distributions.

At the time of data read in the multilevel memory cell, read voltages TH1, TH2 and TH3 are set at middle points between the respective distributions. Thereby, it is determined which data of '11', '01', '00' and '10' is stored in each memory cell.

In many cases, a bit which is distinguishable according to whether the bit is TH2 or more, that is, the MSB bit in the Figure, and a bit which is distinguishable according to whether the bit is TH1 or more and TH3 or less, that is, the LSB bit in the Figure, are assigned to different pages, and these pages are called, for example, "Lower page" and "Upper page". Specifically, one page is read, not by using TH1, TH2 and TH3 at the same time. When Lower page is read, TH2 is used, and when Upper page is read, TH1 and TH3 are used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An authentication method between an authenticatee device having a first memory which stores key information having a data structure composed of encrypted slot key sequences, secret information of a matrix form, and encrypted secret information which is created by encrypting the secret information, and an authenticator device having a second memory which authenticates the authenticatee device, comprising:

receiving, by the authenticator device, the encrypted secret information and the key information;

selecting an encrypted slot key sequence corresponding to a device index stored in the second memory of the authenticator device from the encrypted slot key sequences in the key information received from the authenticatee device, the device index corresponding to the authenticator device;

decrypting the encrypted slot key sequence by a device key stored in the second memory, to produce a sequence of a slot index and a slot key;

selecting, by the authenticator device, an element corresponding to the slot index from the encrypted secret information;

executing, by the authenticator device, a decryption process on the element of the encrypted secret information by using the slot key to produce an element of the secret information;

using a compression arithmetic circuit in the authenticatee device to perform an arithmetic operation on the element and produce an authentication value; and authenticating the authenticatee device using the authentication value.

2. The method of claim 1, further comprising:

receiving, by the authenticatee device, a random number B which is generated by the authenticator;

generating, by the authenticatee device, a random number A and data v;

generating, by the authenticatee device, a random number D which is composed of at least a part of both of the generated random number A and the received random number B; and generating, by the authenticatee device, data C by executing a compression operation using the random number D and the secret information.

3. The method of claim 2, further comprising:

transmitting a calculated result Z, which is obtained from the data C and the data v, to the authenticator device;

generating, by the authenticator device, a random number D which is composed of at least a part of both of the generated random number A and the received random number B;

generating, by the authenticator device, data C by executing a compression operation using the random number D and the secret information; and executing, by the authenticator device, a determination process by using the received calculated result Z and the generated data C.

4. An authenticatee device comprising:
a memory configured to store key information having a data structure composed of encrypted slot key sequences which are created by encrypting sequences of a slot index and a slot key, secret information of a matrix form corresponding to the slot index, and encrypted secret information which is created by encrypting the secret information based on the slot key;
circuitry configured to
generate a random number A; and
generate a random number D which is composed of at least a part of both of the generated random number A and a random number B which is received;
a compression arithmetic circuit configured to generate data C by executing a compression operation with respect to the random number D and the secret information loaded from the memory;
the circuitry being further configured to generate data v; and
an addition circuit configured to generate a value Z from the data v and the data C.

5. The authenticatee device of claim 4, wherein the secret information having the data structure of the matrix form is composed of first and second secret information, and
the encrypted secret information having the data structure of the matrix form is composed of encrypted first secret information and encrypted second secret information (data size: the second secret information <the first secret information, and the encrypted second secret information <the encrypted first secret information).

6. The authenticatee device of claim 5, wherein the first secret information is identical in a group comprising a plurality of authenticatee devices, and
the second secret information is different between the authenticatee devices.

7. An authenticator device which authenticates an authenticatee device and includes a memory which stores key information having a data structure composed of encrypted slot key sequences, secret information of a matrix form, and encrypted secret information which is created by encrypting the secret information, the authenticator device comprising:
processing circuitry configured to:
select an encrypted slot key sequence corresponding to a device index of the authenticator from the encrypted slot key sequences which is received from the authenticatee device;
decrypt the encrypted slot key sequence by a device key, thereby producing a sequence of a slot index and a slot key;
select an element of corresponding to the slot index from the encrypted secret information which is received from the authenticatee device;
execute a decryption process on the element of the encrypted secret information, by using the slot key, to produce an element of the secret information;
generate a random number B;
generate a random number D which is composed of at least a part of both of the generated random number B and a random number A which is received from the authenticatee device;
generate data C by executing a compression operation using the random number D and the secret information;
select, from calculated results received from the authenticatee device, a calculated result Z corresponding to the slot index; and
execute a determination process by using the generated data C and the selected calculated result Z.

8. The authenticator device of claim 7, wherein the secret information having the data structure of the matrix form is composed of first and second secret information, and
the encrypted secret information having the data structure of the matrix form is composed of encrypted first secret information and encrypted second secret information (data size: the second secret information <the first secret information, and the encrypted second secret information <the encrypted first secret information).

9. The authenticator device of claim 8, wherein the first secret information is identical in a group comprising a plurality of authenticatee devices, and
the second secret information is different between the authenticatee devices.

10. An authentication method between an authenticatee device having a first memory which stores an authenticatee ID and secret information and an authenticator device having a second memory which stores an authenticator ID and unique secret information, comprising:
transmitting, by the authenticatee device, the authenticatee ID, which is requested, to the authenticator device;
executing, by the authenticator device, a non-linear process on the authenticatee ID, which has been acquired, and the unique secret information possessed by the authenticator device, thereby obtaining a unique value; and
executing, by the authenticatee device, a one-way function process on the authenticator ID, which has been transmitted, and the secret information possessed by the authenticatee device, thereby sharing the unique secret information;
receiving, by the authenticatee device, a random number B which is generated by the authenticator;
generating, by the authenticatee device, a random number A and data v;
generating, by the authenticatee device, a random number D using the generated random number A and the received random number B;
generating, by the authenticatee device, data C by executing a compression operation using the random number D and the unique value;
transmitting a calculated result Z, which is obtained from the data C and the data v, to the authenticator device;
generating, by the authenticator device, a random number D using the generated random number A and the received random number B;
generating, by the authenticator device, data C by executing a compression operation using the random number D and the unique value; and
executing, by the authenticator device, a determination process by using the received calculated result Z and the generated data C.

11. An authentication method between an authenticatee device having a first memory which stores a plurality of encrypted slot keys, secret information composed of a plurality of elements, and encrypted secret information which is created by encrypting the elements, and an authenticator device having a second memory which authenticates the authenticatee device, comprising:

selecting, by the authenticator device, an encrypted slot key corresponding to a device index of the authenticator from the plurality of the encrypted slot keys, and decrypting the encrypted slot key by a device key, to produce a slot key;

executing, by the authenticator device, a decryption process on the encrypted secret information by using the slot key to produce an element of the secret information;

using a compression arithmetic circuit to perform an arithmetic operation on the element and produce an authentication value; and authenticating, in the authenticator device, the authenticatee device using the authentication value.

12. An authenticator device which perforins an authentication process on an authenticatee device having a first memory which stores key information having a data structure composed of encrypted slot key sequences, secret information of a matrix form, and encrypted secret information which is created by encrypting the secret information, and an authenticator device having a second memory, comprising:

processing circuitry configured to:
receive the encrypted secret information and the key information from the authenticate device;
select an encrypted slot key sequence corresponding to a device index stored in the second memory of the authenticator device from the encrypted slot key sequences in the key information received from the authenticatee device, the device index corresponding to the authenticator device;
decrypt the encrypted slot key sequence by a device key stored in the second memory, to produce a sequence of a slot index and a slot key;
select an element corresponding to the slot index from the encrypted secret information; and
execute a decryption process on the element of the encrypted secret information by using the slot key to produce an element of the secret information; and
a compression arithmetic circuit configured to perform an arithmetic operation on the element and produce an authentication value, wherein the processing circuitry is further configured to authenticate the authenticatee device using the authentication value.

* * * * *